(12) United States Patent
Kidani et al.

(10) Patent No.: US 7,365,865 B2
(45) Date of Patent: Apr. 29, 2008

(54) PRINTING APPARATUS AND CONTROL METHOD THEREFOR

(75) Inventors: Hideyuki Kidani, Kanagawa (JP); Hironobu Kitabatake, Tokyo (JP); Yuichi Hosoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 10/368,593

(22) Filed: Feb. 20, 2003

(65) Prior Publication Data

US 2003/0164971 A1    Sep. 4, 2003

(30) Foreign Application Priority Data

Feb. 20, 2002  (JP)  .............................. 2002-043330
Feb. 20, 2002  (JP)  .............................. 2002-043331
Feb. 20, 2002  (JP)  .............................. 2002-043568
Apr. 30, 2002  (JP)  .............................. 2002-128437

(51) Int. Cl.
*G06F 3/12* (2006.01)
*G06F 15/00* (2006.01)
*G06K 1/00* (2006.01)

(52) U.S. Cl. ...................... 358/1.13; 358/1.1; 358/1.9; 358/1.15; 347/115; 347/172

(58) Field of Classification Search ................ 358/1.1, 358/1.9, 1.13, 1.15; 347/115, 172
See application file for complete search history.

(56) References Cited

U.S. PATENT DOCUMENTS 5,884,120 A     3/1999   Ito et al. ....................... 399/54
6,029,023 A     2/2000   Munemori et al. ........... 399/66
6,912,057 B1 *  6/2005   Idehara ....................... 358/1.1

FOREIGN PATENT DOCUMENTS

| JP | 09-052390 A    | 2/1997  |
|----|----------------|---------|
| JP | 11-034438      | 2/1999  |
| JP | 11-167238      | 6/1999  |
| JP | 2000-029266    | 1/2000  |
| JP | 2000-250731 A  | 9/2000  |
| JP | 2001-235920    | 8/2001  |
| JP | 2001-253146 A  | 9/2001  |
| JP | 2001-305822 A  | 11/2001 |

* cited by examiner

*Primary Examiner*—Twyler Lamb Haskins
*Assistant Examiner*—Yixing Qin
(74) *Attorney, Agent, or Firm*—Fitzpatrick, Cella, Harper & Scinto

(57) ABSTRACT

In a printing apparatus having full-color and monochrome print processes and a method therefor, whether a page to be printed is color or monochrome is checked. The presence of an immediately preceding page which is successively printed before a page to be printed that is determined to be monochrome, and the attribute of the immediately preceding page are determined. The presence of a succeeding page which is successively printed after the page to be printed, and the attribute of the succeeding page are determined. The number of pages corresponding to the determination results is set. The print process of the page to be printed is decided on the basis of the presence of succeeding pages corresponding to the number of pages and their attributes.

18 Claims, 40 Drawing Sheets

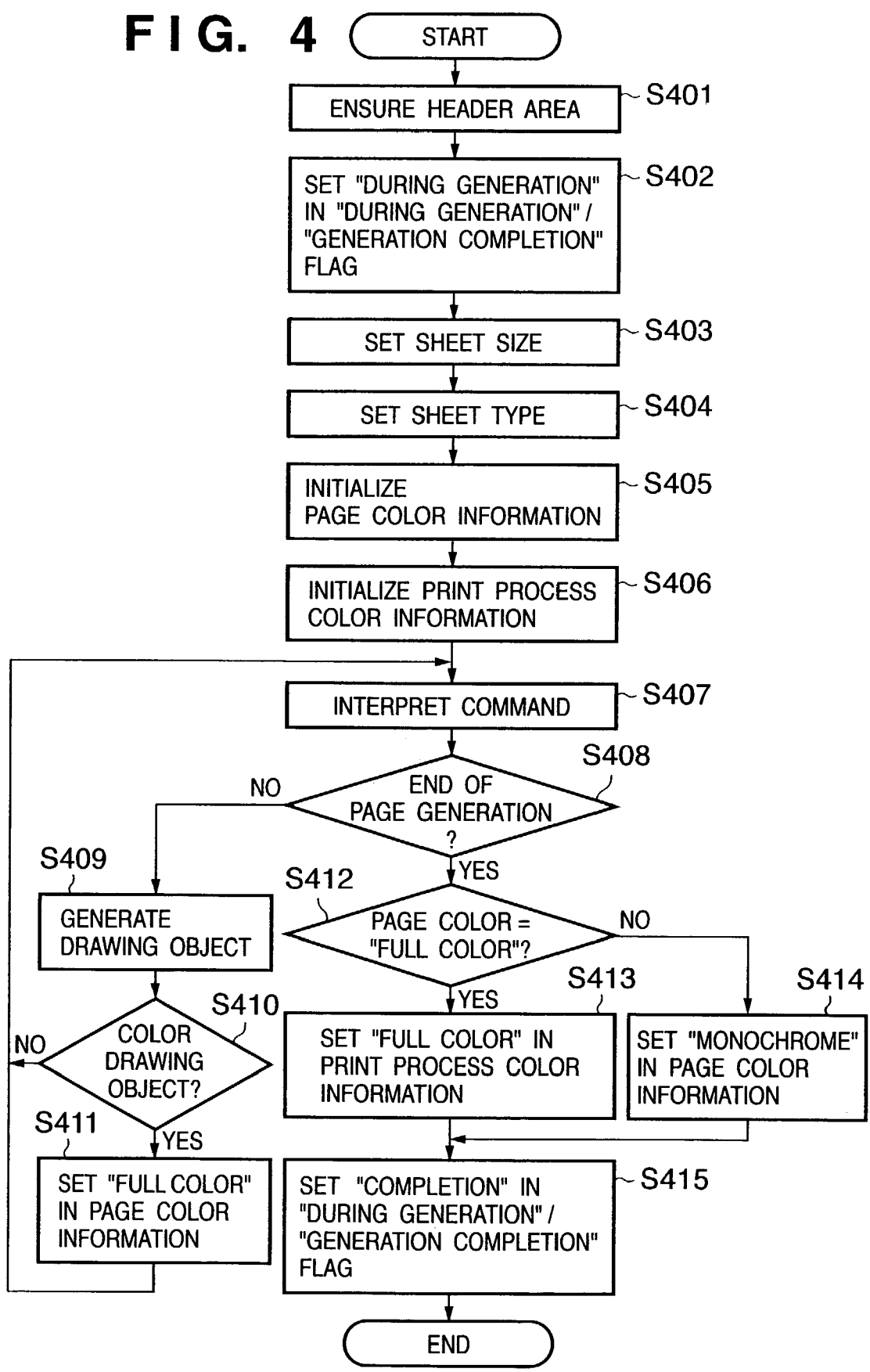

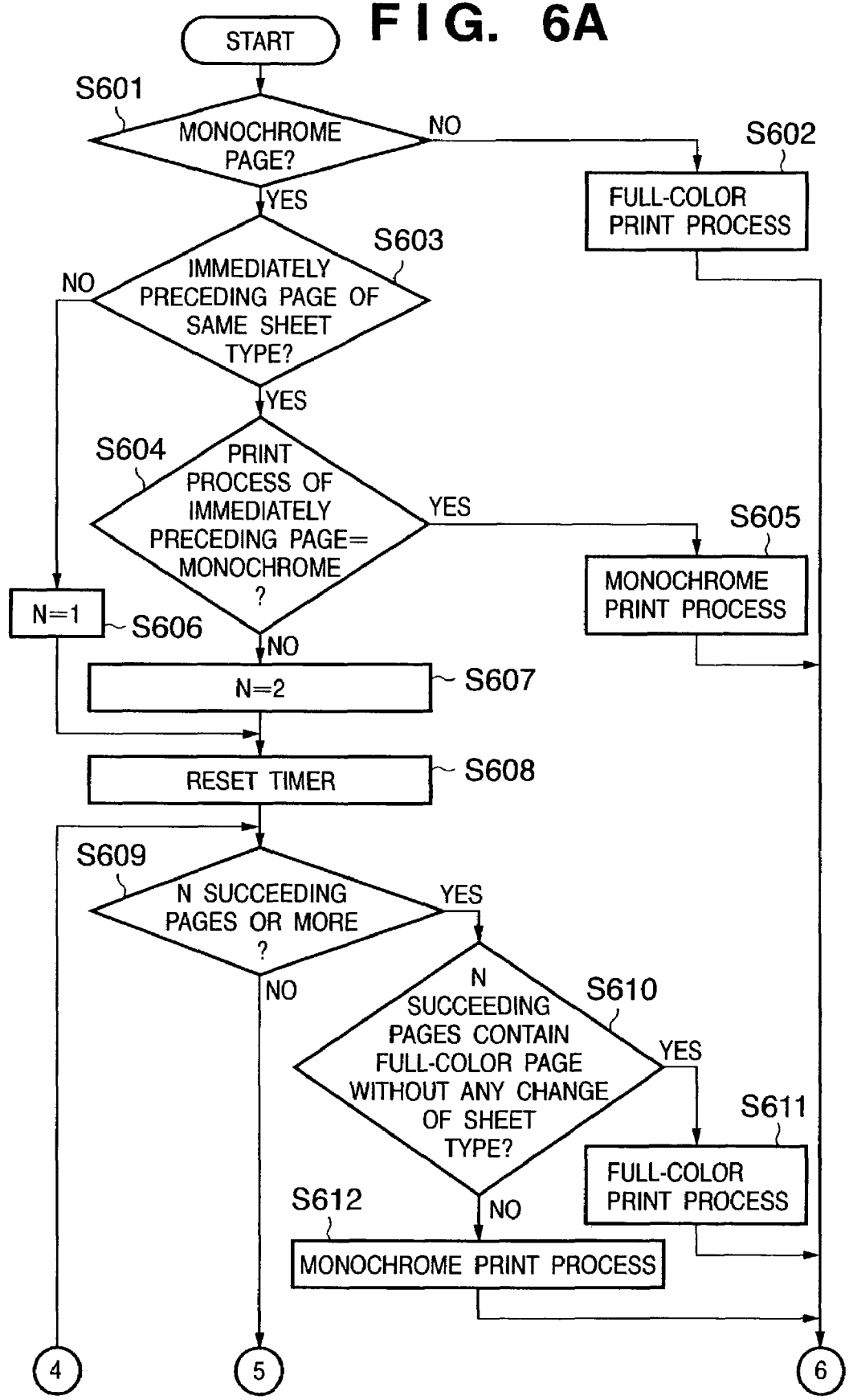

FIG. 32
- EXAMPLE OF DOUBLE-SIDED SEQUENCE PATTERN
▶ EXAMPLE 1: 4-PAGE TYPE DOUBLE-SIDED SEQUENCE
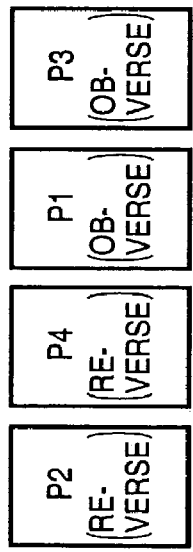
▶ EXAMPLE 2: 2-PAGE TYPE DOUBLE-SIDED SEQUENCE
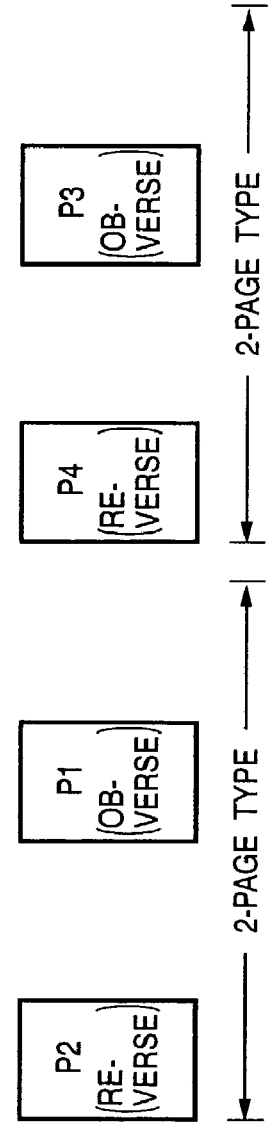

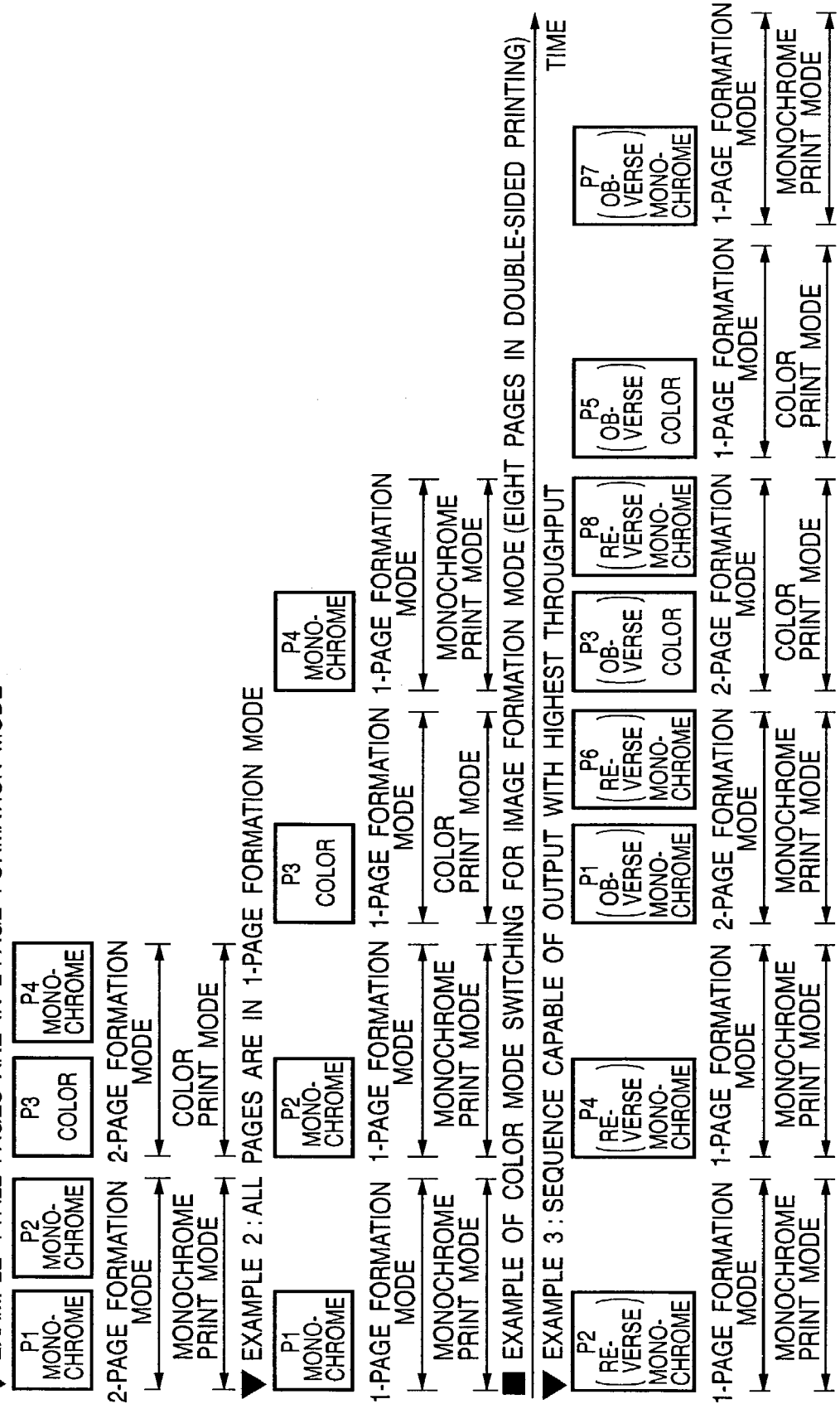

FIG. 40

STORAGE MEDIUM SUCH AS FD, CD-ROM, etc.

| DIRECTORY INFORMATION |
|---|
| FIRST DATA PROCESSING PROGRAM<br>PROGRAM CODES CORRESPONDING TO STEPS OF FLOW CHART SHOWN IN FIG. 31 |
| SECOND DATA PROCESSING PROGRAM<br>PROGRAM CODES CORRESPONDING TO STEPS OF FLOW CHART SHOWN IN FIG. 38 |
| THIRD DATA PROCESSING PROGRAM<br>PROGRAM CODES CORRESPONDING TO STEPS OF FLOW CHART SHOWN IN FIGS. 34 & 35 |
| FOURTH DATA PROCESSING PROGRAM<br>PROGRAM CODES CORRESPONDING TO STEPS OF FLOW CHART SHOWN IN FIGS. 36 & 37 |
| |

MEMORY MAP OF STORAGE MEDIUM

PRINTING APPARATUS AND CONTROL METHOD THEREFOR

FIELD OF THE INVENTION

The present invention relates to a printing apparatus capable of printing monochrome and full-color images and a control method therefor and, more particularly, to a color printing apparatus capable of switching between monochrome and color print modes on the basis of supplied print data, and a control method therefor.

The present invention also relates to a printing system which is constituted by a full-color printer having monochrome and full-color print processes and its printer driver, and a control method therefor.

BACKGROUND OF THE INVENTION

As office automation progresses for deskwork, data transfer from a host computer to a printing apparatus and printing documents, drawings, and the like increases more and more. In recent years, it becomes popular to create documents and drawings in color. Printing apparatuses capable of high-speed printing and printing apparatuses capable of color printing are being introduced more and more.

A color printing apparatus is not used to print only color documents though its principal object is to print color documents, and is often used to print monochrome documents. Such a color printing apparatus is utilized to print a document containing color and monochrome pages or to perform printing based on instructions from a plurality of users in a network. The trend of coexistence of color and monochrome documents is growing.

A conventional full-color page printer has both monochrome and full-color print processes. The page printer generally prints a monochrome page by the monochrome print process and a full-color page by the full-color print process for the purpose of high-speed output of monochrome pages, power saving, and reduction in the wear of a full-color printing mechanism by adopting a print process for monochrome printing and printing a monochrome page in the monochrome print process.

In general, a color image forming apparatus such as a printing apparatus, color printer, or color copying machine has an engine for printing (image transfer) by assembling (unitizing) developing units for a total of four toners: K (black) toner used to print characters and the like, and Y (Yellow) toner, M (Magenta: red dye) toner, and C (Cyan: greenish blue) toner, which are three primary colors in subtractive color mixture.

In image transfer, the respective color units are operated to multi-transfer the respective color toners onto a print sheet on the basis of pixel information mapped in frame memories for the respective colors.

In this color printer, a document to be printed (image transfer) is not limited to a color document. In practice, the color printer is used to print both color and monochrome documents.

Generally, a monochrome document can be printed using only a K toner process unit (to be referred to as a monochrome process unit hereinafter: the remaining process units will be referred to as a color process unit hereinafter).

In order to prevent degradation of the process unit by toner consumption, friction, and the like, some color printers have a function of, when a print document is monochrome, separating the color process unit so as not to operate it, and operating only the monochrome process unit, thus preventing consumption of the color process unit.

Note that "operating the process unit" includes a state in which the process unit runs idle without any substantial printing, like the color process unit during monochrome printing in a printer not equipped with the above function.

If the above-mentioned printer can suppress the wear and power consumption of the full-color printing mechanism to reduce the printing cost of a monochrome page in a full-color printer close to the printing cost in a monochrome printer in printing a monochrome page, the user neither installs both monochrome and full-color printers nor selects the type of printer in accordance with each document to be printed.

The prior art of using the monochrome and full-color print processes and switching the print process, as needed is therefore indispensable for spreading full-color page printers.

An example of the color printer which switches the print process is a tandem color printer which adopts one of typical processes of a color image forming apparatus. The tandem color printer comprises drums for respective color components, and realizes high-speed print processing by arranging these drums parallel to each other on the convey path and performing transfer of all colors by one process.

More specifically, the tandem color printer has a mechanism which comprises four photosensitive drums (photosensitive drums corresponding to four colors: cyan, magenta, yellow, and black) in order to increase the color printing speed, and transfers an image onto a transfer medium by four developing units.

Some tandem printing apparatuses have a mechanism which operates yellow, cyan, and magenta units not used for printing (e.g., idly operates photosensitive drums). Idle operation of photosensitive drums excessively shortens the service life of units such as yellow, cyan, and magenta photosensitive drums.

In order to reduce toner consumption and the wear of each unit, a color printing apparatus of this type switches the operation between color print processing and monochrome print processing. In printing a monochrome document, the color printing apparatus controls to move yellow, cyan, and magenta developing units except a black developing unit apart from the electrostatic convey belt so as not to print in colors except black.

That is, there has been proposed a color printing apparatus which switches between color print operation and monochrome print operation of retracting the yellow, cyan, and magenta developing units in accordance with supplied data contents so as not to shorten the service life of the yellow, cyan, and magenta units. If the supplied data is only monochrome data, printing is done by automatically switching the operation to monochrome print operation.

As described above, the conventional full-color page printer realizes high-speed output, power saving, and protection of the full-color printing mechanism in printing a monochrome page by switching between the monochrome and full-color page print processes. In general, print process switching operation requires a predetermined processing time, consuming power. In addition, print process switching operation loads the printing mechanism, and frequent switching of the print process shortens the service life of the printing mechanism.

For example, in printing a document in which color and monochrome pages appear almost alternately, or in a use environment where a plurality of users frequently print a document of 1 or 2 pages, monochrome and full-color pages are printed at random, and the print process will be frequently switched. In this case, even if the monochrome print process is higher in speed and lower in power consumption than the full-color print process, the processing time and power consumption in monochrome printing increase owing to the processing time of print process switching operation, power consumption, and print process switching operation. Printing all pages in the full-color print process may become more preferable in terms of the printing speed, power consumption, and load on the printing mechanism.

Shift from monochrome print operation to color print operation or opposite shift requires an operation such as retraction/return of the developing unit due to the difference between monochrome and color print operations. If print operation shifts, data cannot be kept printed, requiring a switching time.

For example, the above-described tandem color printer takes a switching time between color and monochrome print operations. To prevent this, there has been proposed a method of printing monochrome data in color to increase the throughput without switching print operation under a predetermined condition when printing a document containing both color and monochrome pages.

For example, Japanese Patent Laid-Open Nos. 11-34438 and 2000-29266 disclose a method of printing a monochrome page as a target page in the full-color print process under a given condition when an immediately preceding page is printed in the full-color print process.

In Japanese Patent Laid-Open No. 11-34438, print operation is switched in terms of the throughput. That is, there is proposed a printing apparatus in which, when a monochrome image is received as an image to be printed next during the color print mode, the printing time of printing the monochrome image in the color print mode and the printing time of switching to the monochrome print mode and then printing the image are compared, and if the printing time in the color print mode is shorter, the image is printed in the color print mode. According to this method, an engine which takes a very long time for switching from the color print mode to the monochrome print mode and always prints data at a high speed in the color print mode without switching it keeps printing monochrome data in the color print mode once monochrome data is printed in the color print mode. This greatly shortens the service life of a unit such as a photosensitive drum in the tandem printing apparatus or the like.

To the contrary, in the method proposed in Japanese Patent Laid-Open No. 2000-29266, the print mode is switched in terms of toner waste and the service life of each component. This method adopts an approach of calculating a disadvantage generated when monochrome data is printed in the color print mode and a disadvantage generated when the mode is switched to the monochrome print mode, and comparing these disadvantages to decide whether to switch the mode. However, it is difficult to accurately calculate the disadvantage, and when a print mode selected on the basis of the disadvantage is determined to be switched, the throughput may decrease.

These methods are based on switching to the monochrome print process when it is confirmed by referring to the attributes of pages subsequent to a target page that monochrome pages succeed to a given extent, i.e., when switching to the monochrome print process is determined to be advantageous. The attributes of a predetermined number of succeeding pages must be referred to.

Particularly when these methods are applied to a printing mechanism in which the print process switching time is relatively long with respect to the difference in the printing time of one page between the monochrome and full-color print processes, the next target page cannot be printed until the page attributes of many pages are decided. For example, attention is paid to the printing time, and these methods are applied to a printing mechanism in which the monochrome printing speed is 2 sec/page, the full-color printing speed is 3 sec/page, and the time taken to switch the print process is about 10 sec. In this case, when the print process is switched from the full-color print process to the monochrome print process and returns to the full-color print process again, printing upon switching to the monochrome print process does not provide any merit from the viewpoint of the printing time unless the number of successive pages to be printed in the monochrome print process is at least 20 or more.

This means that a target page may not be printed unless 20 or more succeeding pages are accumulated. To accumulate succeeding pages, the printing mechanism may be kept idle.

These references define operation when a page immediately preceding a target page is a full-color page. If no immediately preceding page exists, i.e., print data starting from a monochrome page is to be processed while no print processing is done, the print process may not be optimum depending on the condition.

Switching of the print process based on whether a document is color or monochrome is achieved by separating each process unit from a sheet by mechanical operation. The print mode cannot be switched until the sheet is completely discharged.

One switching operation takes a very long time of about 10 to 30 sec. For this reason, every printing of color and monochrome pages by one job requires a switching time, which impairs high-speed operation which is a merit of the tandem printing apparatus.

This is not limited to a printing apparatus having the tandem printing engine. Also in the use of a single-head apparatus or intermediate transfer member, the print mode is switched by separating each process unit from a sheet by mechanical operation. A long time is similarly taken, and the printing speed decreases in the coexistence of monochrome and color pages.

SUMMARY OF THE INVENTION

The present invention has been made in consideration of the conventional situation, and has as its object to provide a printing apparatus which more efficiently decides the print process of a monochrome page to prevent a print processing delay and the wear of a device, and a control method therefor.

It is another object of the present invention to provide a printing apparatus capable of optimizing decision of the print process by determining the print process of a monochrome page depending on not whether a page to be printed is monochrome or full-color but the presence/absence of immediately preceding and succeeding pages and their attributes, and a control method therefor.

It is still another object of the present invention to allow the user to set a desired print mode in which data is printed in the full-color print process regardless of whether an object to be printed is monochrome or full-color, and easily realize optimization of a print process corresponding to a print job.

It is still another object of the present invention to realize print mode switching processing which properly satisfies the service life of a unit and the print processing throughput.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a flow chart showing the processing procedures of intermediate data generation processing according to the embodiment of the present invention;

FIGS. 6A and 6B are flow charts showing the processing procedures of print process selection processing for a monochrome page according to the second embodiment of the present invention;

FIG. 32 is a view showing an example of a double-sided printing sequence pattern in the printer according to the 11th embodiment;

FIG. 39 is a view for explaining a print mode switching sequence state according to, the 12th embodiment; and FIG. 40 is a view for explaining the memory map of a storage medium which stores various data processing programs readable by the printer according to the 11th embodiment.

DETAILED DESCRIPTION OF THE PREFERRED EMBODIMENTS

Preferred embodiments of the present invention will now be described in detail in accordance with the accompanying drawings.

First Embodiment

The first embodiment will be described in detail below with reference to the accompanying drawings by applying this embodiment to a laser beam printer (to be simply referred to as an LBP hereinafter).

Figure 1:
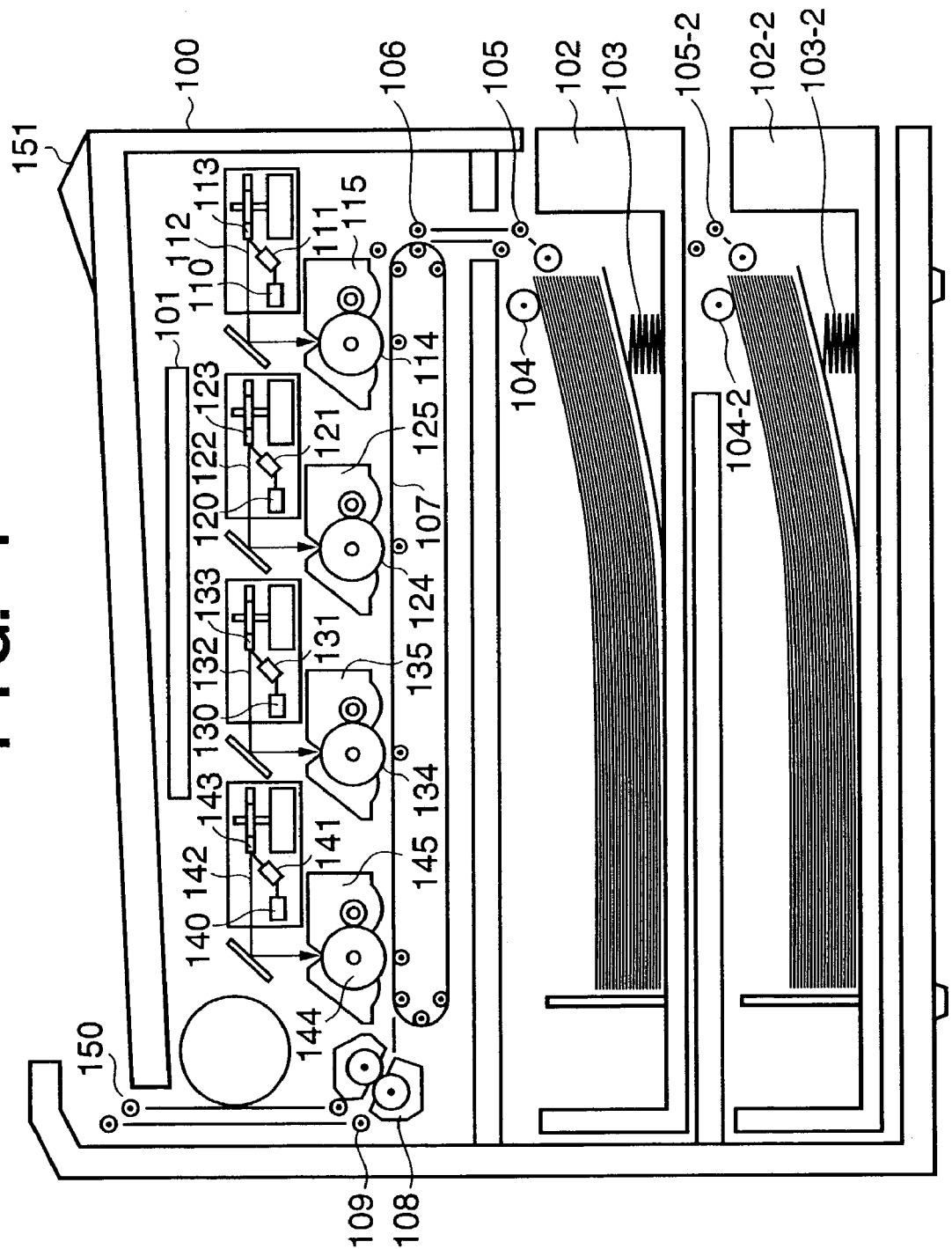
FIG. 1 is a sectional view showing the arrangement of an LBP according to an embodiment of the present invention.

FIG. 1 is a sectional view showing the internal structure of the LBP according to the first embodiment of the present invention.

In FIG. 1, reference numeral 100 denotes an LBP main body. The LBP 100 creates character patterns, graphic patterns, images, and the like in accordance with character print instructions, various graphic drawing instructions, image drawing instructions, color designation instructions, and the like supplied from a terminal computer 201 (FIG. 2) connected to a LAN 214 (FIG. 2), and forms an image on a print sheet serving as a print medium. Reference numeral 151 denotes an operation panel on which switches for user operation, an LED display for displaying the state of the LBP 100, an LCD display, and the like are arranged; and 101, a printer controller which controls the operation of the whole LBP 100 and analyzes a character print instruction and the like supplied from the terminal computer 201.

The LBP 100 according to the first embodiment comprises image forming/developing mechanisms for forming M (Magenta), C (Cyan), Y (Yellow), and K (blacK) images in order to convert pieces of R, G, and B color information into pieces of M, C, Y, and K color information and parallel-form/develop images corresponding to the pieces of color information. The printer controller 101 generates M, C, Y, and K print images, generates video signals corresponding to the print images, and outputs the signals to M, C, Y, and K laser drivers 110, 120, 130, and 140.

The M (Magenta) laser driver 110 is a driver circuit for driving a semiconductor laser 111, and ON/OFF-switches a laser beam 112 emitted by the semiconductor laser 111 in accordance with an input video signal. The laser beam 112 is oscillated right and left by a rotary polygon mirror 113 to scan the surface of an electrostatic drum 114. As a result, the electrostatic latent image of a character or graphic pattern is formed on the electrostatic drum 114. The electrostatic latent image is developed on the drum 114 by a developing unit (toner cartridge) 115 arranged around the electrostatic drum 114, and the toner image is transferred from the drum onto a print sheet.

As for C (Cyan), Y (Yellow), and K (blacK), identical image forming/developing mechanisms are employed. The C (Cyan) image forming/developing mechanism comprises the laser driver 120, a semiconductor laser 121, a laser beam 122, a rotary polygon mirror 123, an electrostatic drum 124, and a developing unit 125. The Y (Yellow) image forming/developing mechanism comprises the laser driver 130, a semiconductor laser 131, a laser beam 132, a rotary polygon mirror 133, an electrostatic drum 134, and a developing unit 135. The K (blacK) image forming/developing mechanism comprises the laser driver 140, a semiconductor laser 141, a laser beam 142, a rotary polygon mirror 143, an electrostatic drum 144, and a developing unit 145. Each image forming function is the same as the M (Magenta) image forming/developing mechanism, and a description thereof will be omitted.

The LBP 100 has two modes: monochrome and full-color print processes. The K (blacK) electrostatic drum 144 is fixed, whereas the M (Magenta), C (Cyan), and Y (Yellow) electrostatic drums 114, 124, and 134 are vertically movable in FIG. 1. In the monochrome print process, the electrostatic drums 114, 124, and 134 are retracted to positions slightly apart from a sheet convey belt 107 in order to avoid the wear between the sheet convey belt 107 and the electrostatic drums 114, 124, and 134. Retraction and return operations take about 5 sec each, and printing of a succeeding sheet delays in switching from the color print process to the monochrome print process and vice versa.

The print sheet is a cut sheet. A plurality of cut sheets are stored in a sheet cassette 102 mounted in the LBP 100, and held at a predetermined level within the cassette 102 by a spring 103. A sheet is fed from the sheet cassette 102 into the apparatus by rotation of a pickup roller 104 and convey rollers 105 and 106, set on the sheet convey belt 107, and passes through the M, C, Y, and K image forming/developing mechanisms, transferring images corresponding to the respective colors. Reference numeral 102-2 denotes a second sheet cassette; 103-2, a spring accessory to the second sheet cassette 102-2; 104-2, a pickup roller; and 105-2, a convey roller. The arrangement of the second sheet cassette 102-2 is completely the same as that of the sheet cassette 102.

M, C, Y, and K toners (ink powders) transferred onto the print sheet are fixed onto the print sheet by the heat and pressure of a fixing unit 108. The print sheet on which the image is transferred, printed, and fixed is discharged to the upper portion of the apparatus main body of the LBP 100 by convey rollers 109 and 150.

Figure 2:
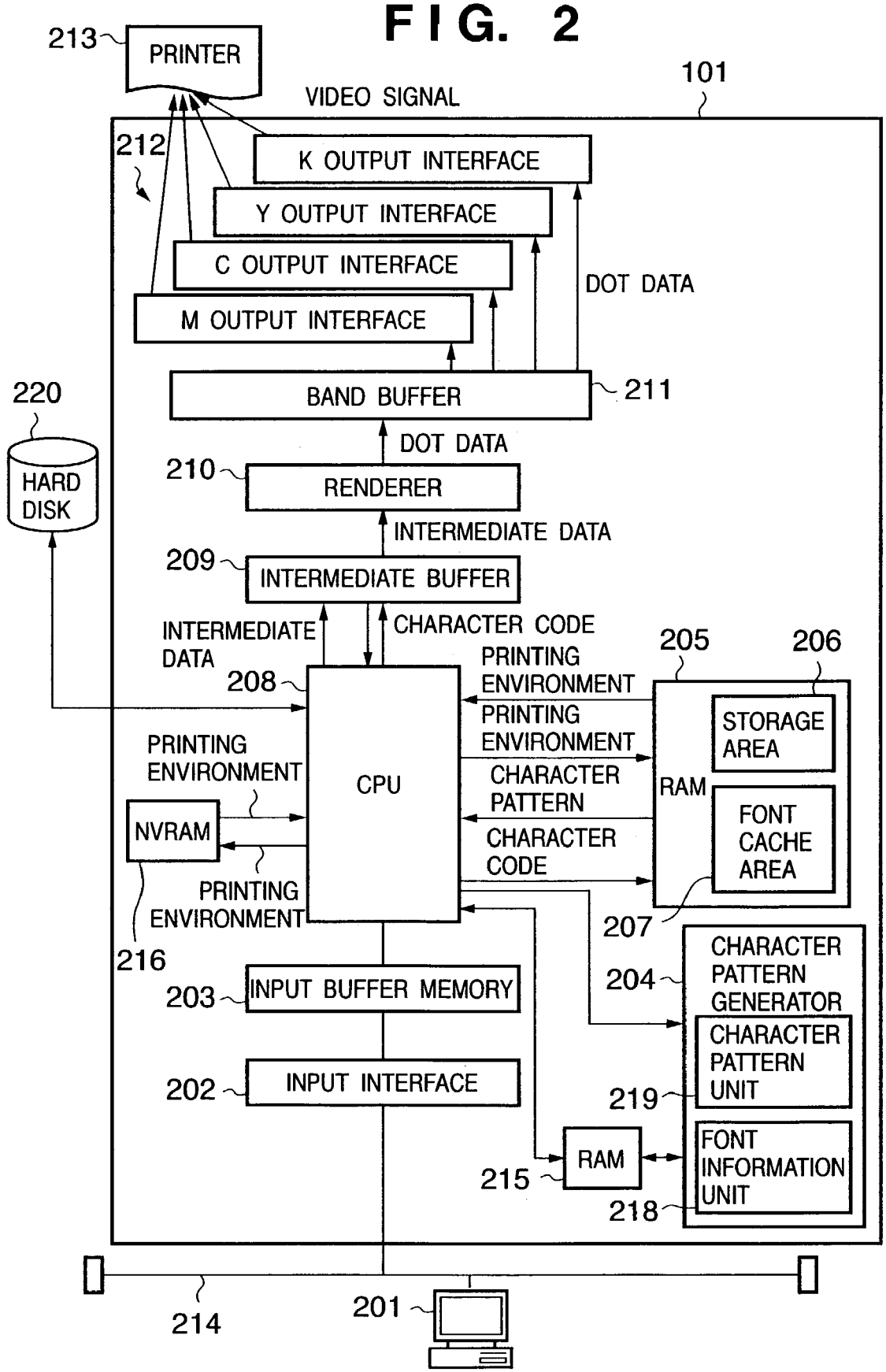
FIG. 2 is a block diagram for explaining the control arrangement of the LBP according to the embodiment of the present invention.

FIG. 2 is a block diagram showing the schematic arrangement of the controller 101 of the LBP according to the first embodiment.

The controller 101 of the LBP receives data containing character, graphic, and image drawing instructions, color information, and the like sent from the terminal computer 201 via the LAN 214, and prints document information and the like for each page. Reference numeral 202 denotes an I/O interface which exchanges various pieces of information with the terminal computer 201; 203, an input buffer which temporarily stores various pieces of information input via the I/O interface 202; and 204, a character pattern generator which comprises a font information unit 218 for storing attributes such as a character width and height and the address of an actual character pattern, a character pattern unit 219 for storing character patterns, and a read control program. The read control program is stored in a ROM 215, and has a code conversion function of, when receiving a character code, calculating the address of a character pattern corresponding to the character code.

Reference numeral 205 denotes a RAM which contains a font cache area 207 for storing a character pattern output from the character pattern generator 204, and a storage area 206 for storing an external character font, current printing environment, and the like sent from the terminal computer 201. In this manner, pattern information temporarily mapped into a character pattern is stored in the font cache area 207 serving as a font cache. This eliminates the need for decoding the same character again and mapping it into a pattern when printing the same character. The mapping speed to a character pattern increases.

A CPU 208 controls the overall printer controller, and controls the whole operation of the LBP 100 in accordance with the control program of the CPU 208 that is stored in the ROM 215. Reference numeral 209 denotes an intermediate buffer which holds a group of internal intermediate data generated based on input data. After data of one page are received, converted into simpler intermediate data, and stored in the intermediate buffer 209, the intermediate data are rendered by a renderer 210 for each band, and output as a print image to a band buffer 211. The band buffer 211 can store print images of at least eight bands. A print image output to the band buffer 211 is converted into a video signal by an output interface 212, and output to a printer 213. The printer 213 is the printing mechanism of a page printer which prints image information based on a video signal from the output interface 212.

The LBP of the first embodiment described above with reference to FIG. 1 parallel-executes formation and development of M, C, Y, and K images. For this purpose, the output interface 212 comprises four interfaces: M, C, Y, and K output interfaces. These interfaces independently read out dot data from the band buffer 211, convert them into video signals, and output the signals to the laser drivers 110, 120, 130, and 140 of the respective planes.

The intermediate buffer 209 can store intermediate data of a plurality of pages. Processing subsequent to read and rendering is performed in synchronism with the operation of the printer 213 serving as the printing mechanism.

Reference numeral 216 denotes a nonvolatile memory formed from a general EEPROM or the like, and will be referred to as an NVRAM (Non Volatile RAM) hereinafter. The NVRAM 216 stores, e.g., panel setting values designated on the operation panel 151.

The ROM 215 includes analysis of data input from the terminal computer 201, generation of intermediate data, the control program of the printer 213, and a color conversion table from an RGB color space into an MCYK color space. Reference numeral 220 denotes a hard disk which can store arbitrary information and does not loose information even upon power-off.

The structure of intermediate data generated by the intermediate buffer 209 in the first embodiment will be explained with reference to FIG. 3.

Figure 3:
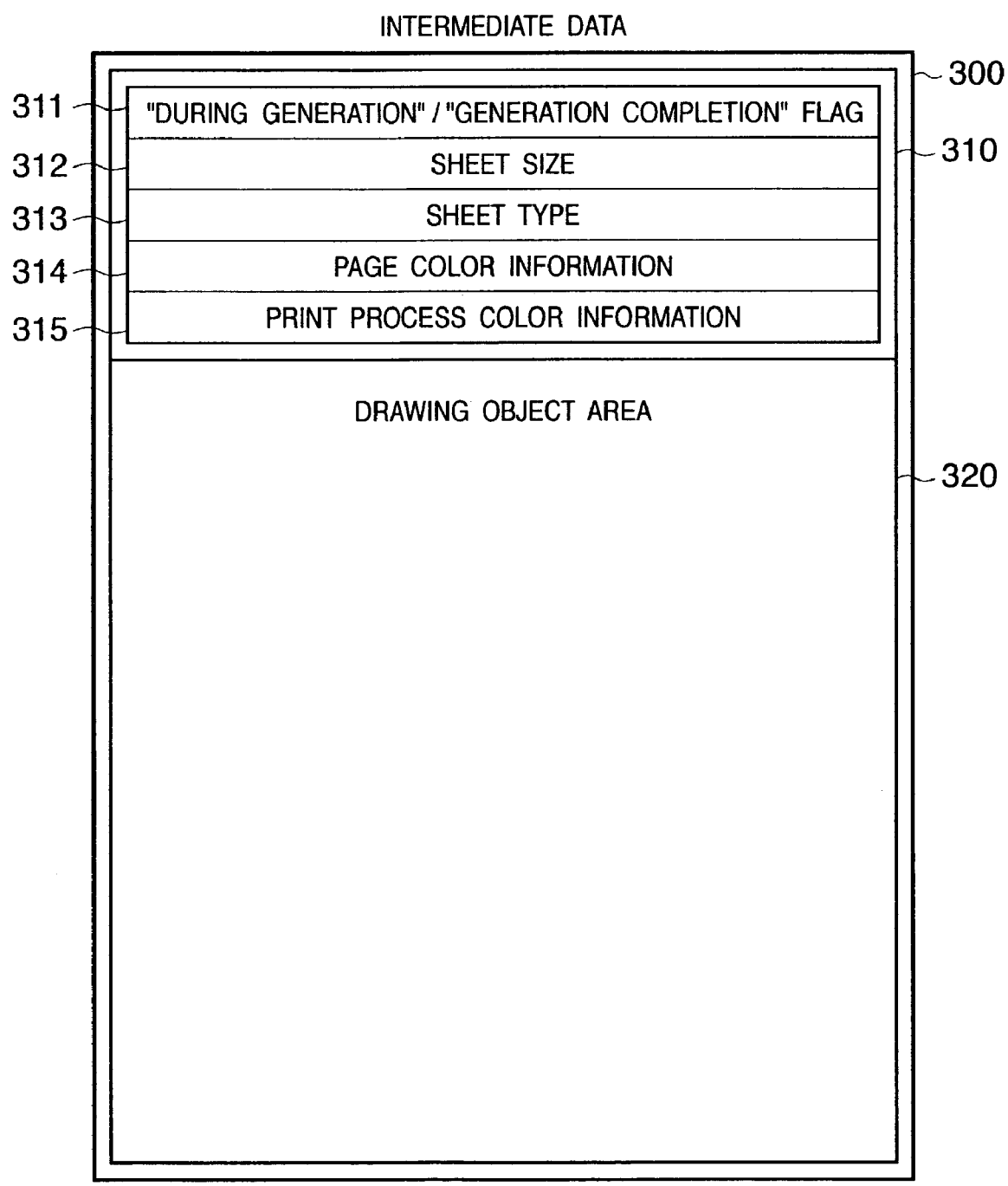
FIG. 3 is a view showing the structure of intermediate data according to the embodiment of the present invention.

FIG. 3 shows a data format representing the data structure of intermediate data.

In FIG. 3, intermediate data 300 represents intermediate data of one page generated within the intermediate buffer 209, and contains a header 310 and drawing object area 320. At the start of generating intermediate data of a page, only the header 310 is acquired, and no drawing object area 320 exists. The drawing object area 320 is a variable-length area which is extended every time a drawing object is added.

An area 311 of the header 310 is a flag area representing whether the page is being generated or has been generated. "0" meaning "during generation" is set in the flag area in the initial state, and "1" meaning "completion of generation" is set upon the completion of generating intermediate data of a page. An area 312 represents a sheet size, and information representing a sheet size such as "A3" or "A4" is set. An area 313 is a sheet type information area representing the type of paper, and sheet type information such as "plain paper", "thick paper", or "OHP" is set. An area 314 is a page color information area representing whether the page is a monochrome page or full-color page. "0" meaning "undefined" is set in the area 314 in the initial state. Every time a drawing object is added to the drawing object area 320, "1" meaning "full color" is set when the object is a full-color drawing object. If the value of the area 314 is kept "0" ("undefined") upon the completion of generating intermediate data of the page, "2" meaning "monochrome" is set. An area 315 is a print process color information area representing a print process when printing a page. "0" meaning "undefined" is set in the area 315 in the initial state. If the area 314 holds "1" meaning "full color" upon the completion of generating intermediate data of the page, "1" representing "full-color print process" is also set in the area 315. If the page is a monochrome page, i.e., "2" representing "monochrome" is set in the area 314, no print process is decided upon the completion of generating intermediate data, and "0" meaning "undefined" is kept set in the print process color information area 315.

The processing procedures of intermediate data generation processing will be described in more detail with reference to the flow chart of FIG. 4.

FIG. 4 is a flow chart showing intermediate data generation processing in the LBP 100 according to the first embodiment. A program which executes this processing is stored in the ROM 215.

After generation of intermediate data 300 of a given page starts, the header area 310 is ensured in step S401. The flow shifts to step S402 to set, in the area 311, "0" meaning that the intermediate data is being generated. In steps S403 and S404, a sheet size and sheet type designated by commands are set. Note that the sheet size and sheet type have already been decided at the start of generating intermediate data of the page.

In steps S405 and S406, "undefined" is set in the page color information area 314 and print process color information area 315. By these processes, initial setting of the header 310 is completed, and the flow shifts to drawing command processing.

One command is interpreted in step S407, and the flow advances to step S408 to check whether the command is a page end command or a drawing command for a general character, graphic, image, or the like. For the drawing command, the flow shifts to step S409 to process the drawing command and add the drawing object to the drawing object area 320. Note that the drawing object area 320 is extended, as needed. After the drawing object is added, the flow shifts to step S410 to check whether the drawing object is a color drawing object. If YES in step S410, the flow shifts to step S411 to set "full color" in the page color information area 314, and returns to step S407 to process the next command. If NO in step S410, the flow directly returns to step S407.

If the command is a page end command in step S408, the flow advances to step S412 to check whether "full color" has been set in the page color information area 314. If YES in step S412, the flow advances to step S413 to set "full color" also in the print process color information area 315. If NO in step S412, the flow shifts to step S414 to change the page color information area 314 to "monochrome". After step S413 or S414 is executed, the flow shifts to step S415 to set, in the area 311, "1" meaning the completion of generating intermediate data, and intermediate data generation processing ends.

After intermediate data of one page has been generated, intermediate data of the next page is subsequently generated. Intermediate data of a plurality of pages are stored in the intermediate buffer 209.

After intermediate data of at least one page is stored in the intermediate buffer 209, the page can be printed. A sheet size, sheet type, and print process type (monochrome/full color) are designated with respect to the printer (printing mechanism) 213, and a print request is issued. When the printer 213 becomes ready, intermediate data in the intermediate buffer 209 is rendered for each band in synchronism with sheet convey in the printer 213. Dot data is converted into a video signal, which is transferred to the printer 213.

Whether to select the monochrome print process or full-color print process complies with the print process color information 315. For monochrome page printing, which of the print processes is to be selected is not determined on the intermediate data generation stage, and is decided immediately before issuing a print request to the printer 213.

Features according to the first embodiment will be briefly explained prior to a detailed description of processing in the first embodiment.

(1) For monochrome page printing, decision of the print process depends on the presence/absence of an immediately preceding page, or temporal continuity with the immediately preceding page, and the print process of the immediately preceding page. For example, when the immediately preceding page is printed in the monochrome print process and a target page is to be successively printed, the monochrome print process is kept selected without switching the print process. When no immediately preceding page exists, the immediately preceding page and target page are not successive, or the immediately preceding page is printed in the full-color print process, the print process of the target page is not decided from only the above-mentioned determination information.

(2) The print process is determined based on the number of succeeding pages and attributes representing whether these pages are monochrome or full-color pages. These pieces of information are used when the print process of monochrome printing cannot be decided from the determination information described in (1). For example, if no full-color page appears among N pages subsequent to a target page, the target page is printed in the monochrome print process. Note that N is an integer of 1 or more, and this value may be an optimal one corresponding to the printing mechanism or set in advance on the operation unit 151. If no succeeding page is generated, whether a succeeding page is being generated is checked, and if so, the start of printing a target page may be delayed within a given range.

(3) The print process is determined based on the difference in sheet size or sheet type between an immediately preceding page and a target page. This is because a general printing apparatus takes a longer interval than a general print processing interval when switching the sheet size or sheet type. For example, in a general laser beam printer, the print process for a thick sheet or OHP sheet becomes slower than that for a plain sheet in order to increase the fixation of toner (powder ink). To switch the process speed, the next sheet is not fed until an immediately preceding sheet is completely discharged outside the apparatus. In this case, switching between the full-color and monochrome print processes hardly decreases the speed. Thus, the print process is decided in consideration of determination information (3) in addition to (1) and (2) described above. For example, if an immediately preceding page is printed in the full-color print process, a target page is a monochrome page, and no subsequent page exists, the target page is printed in the full-color print process in consideration of only determination information (1) or (2). However, by taking determination information (3) into consideration, the monochrome print process is selected even when an immediately preceding page is printed on, e.g., an OHP sheet, a target page is printed on a plain sheet, and the color print process is determined based on condition (1) or (2).

In this fashion, the first embodiment aims to minimize a decrease in printing speed caused by switching of the print process, and at the same time realize power saving and reduction in load on the printing mechanism by intelligently deciding the print process of a monochrome page.

Print process selection processing for a monochrome page as a feature of the first embodiment will be explained.

As described above, the LBP 100 according to the first embodiment has monochrome and full-color print processes. The monochrome print process advantageously has higher speed, lower power, and a smaller load on the printing mechanism in comparison with the full-color print process.

However, a loss time of about 5 sec is generated for retracting the above-mentioned drum in switching the print process from the monochrome print process to the full-color print process and vice versa. Note that no print process switching time is generated when printing starts from a print process OFF state or a target page is not successively printed with a printing time interval from an immediately preceding page due to any reason, because switching, of the print process is completed until a cut sheet is fed from the sheet cassette 102 and reaches the image forming/developing mechanism.

The printing speed is 30 pages/min for the monochrome print process and 20 pages/min for the full-color print process.

The processing procedures of print process selection processing for a monochrome page will be described with reference to FIGS. 5A and 5B under these conditions.

Figure 5A:
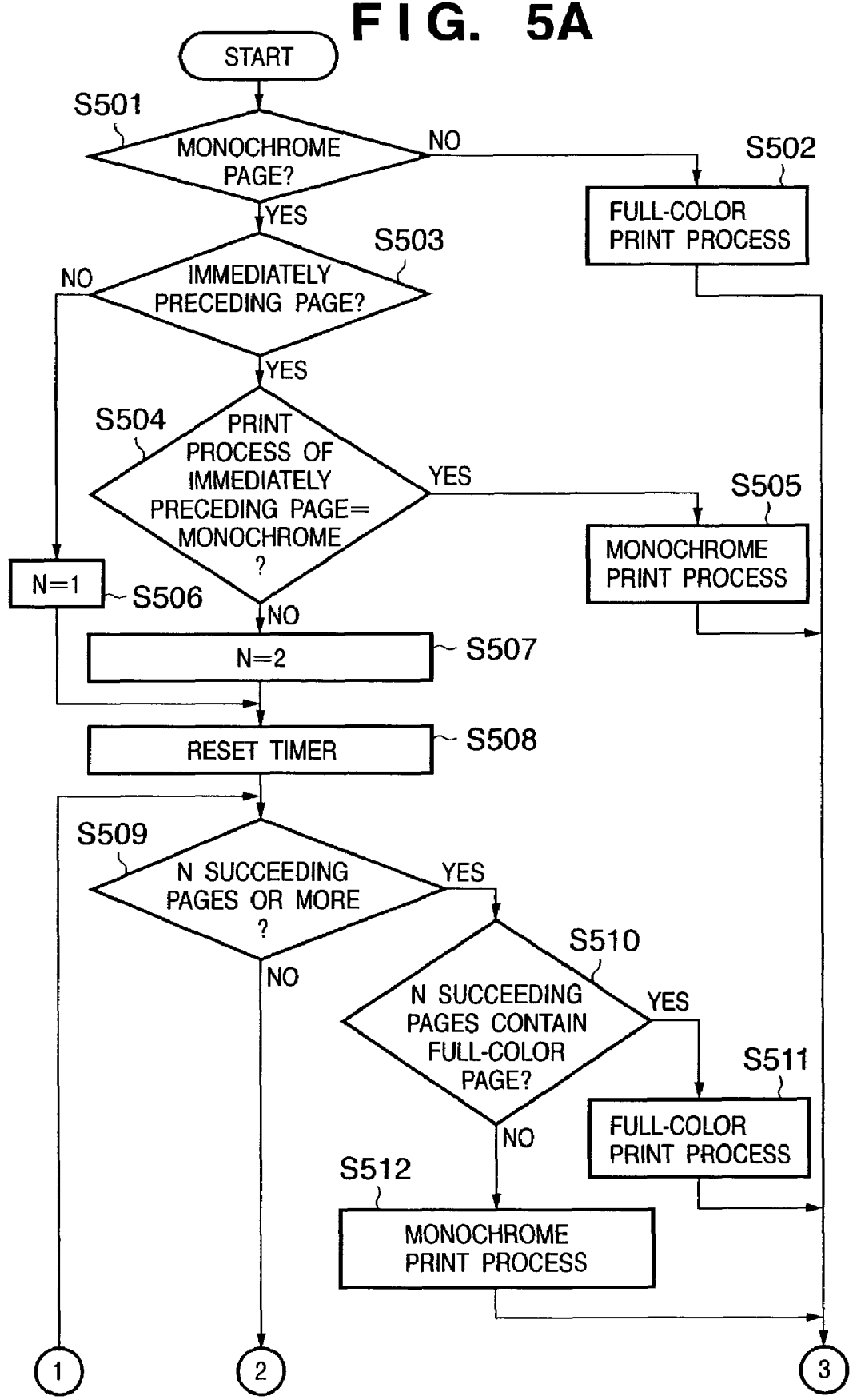
FIGS. 5A and 5B are flow charts showing the processing procedures of print process selection processing for a monochrome page according to the first embodiment of the present invention.
Figure 5B:
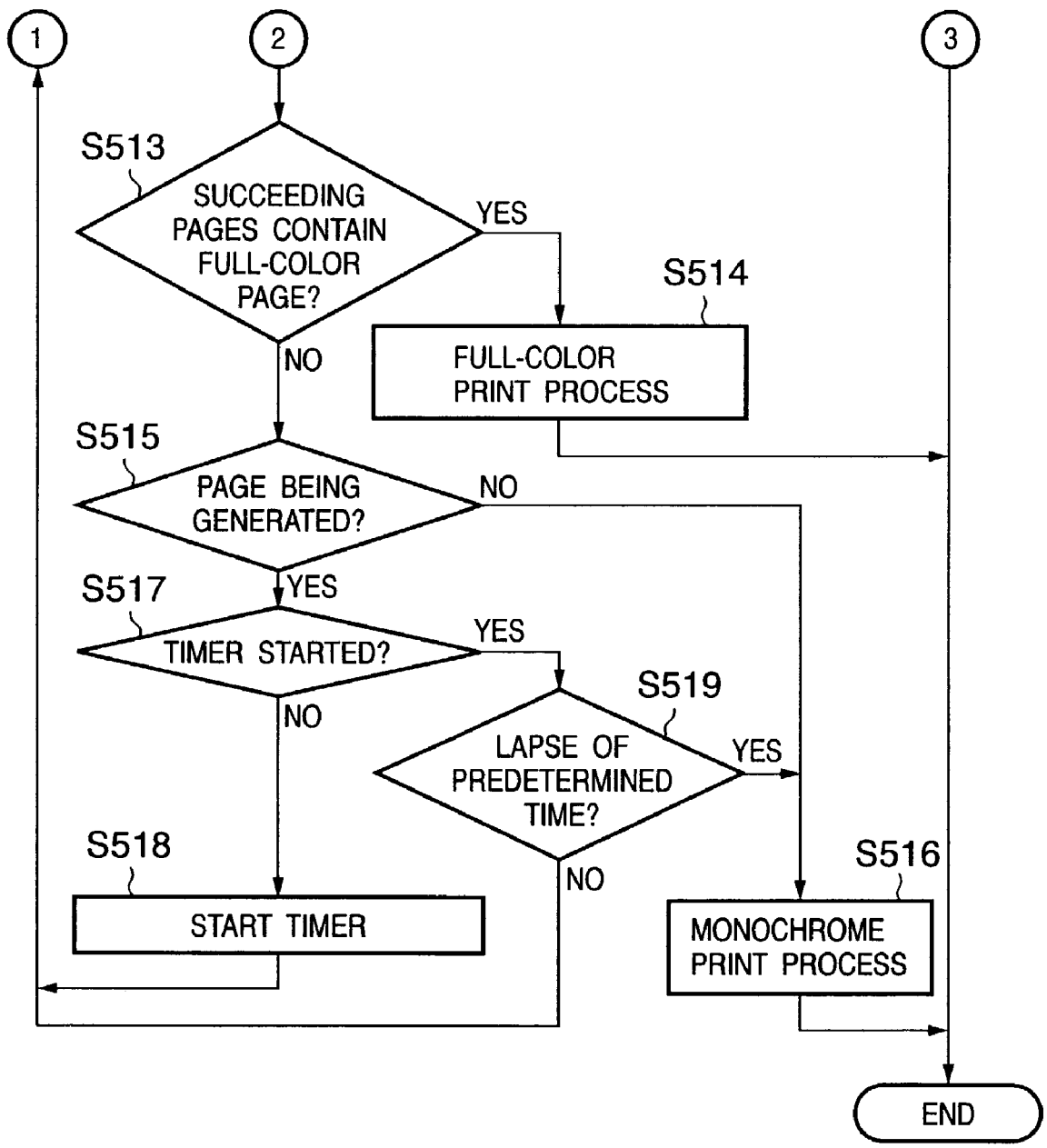

FIGS. 5A and 5B are flow charts for mainly explaining the print process of a monochrome page in the LBP 100 according to the first embodiment.

In step S501, whether a page to be printed is monochrome or full-color is checked. This can be determined by referring to the page color information 314. For a full-color page, the flow shifts to step S502 to select the full-color print process, and print process selection processing for the target page ends. In this case, "full color" is set in the print process color information 315 during generation of intermediate data, and "full color" need not be set again in the print process color information 315.

If the page is a monochrome page in step S501, the flow advances to step S503 to check whether an immediately preceding page exists. Intermediate data of a given page is deleted when printing of the page is completed, i.e., when the page is printed and a page-printed sheet is discharged outside the apparatus. Before this, the contents of the intermediate buffer for this page are held. Thus, the presence/absence of an immediately preceding page can be determined from the presence/absence of intermediate data of the immediately preceding page. If YES in step S503, the flow advances to step S504 to check whether the print process of the page is the monochrome print process. The print process of the immediately preceding page has been determined at this time, and set in the print process color information 315 of the intermediate data. If the print process of the immediately preceding page is the monochrome print process, the flow shifts to step S505 to select the monochrome print process, and then processing ends. At this time, "monochrome" is set in the print process color information 315.

If no immediately preceding page exists in step S503, or if the print process of the immediately preceding page is determined in step S504 to be the full-color print process, the print process of the target page is decided using the presence/absence of a succeeding page and the page color information 314 as pieces of determination information. In the first embodiment, the number of succeeding pages to be referred to is "1" or "2". The number of pages to be referred to will be represented by N.

If NO in step S503, the flow shifts to step S506 to set "1" as the number N of succeeding pages to be referred to, and shifts to step S508. If the print process of the immediately preceding page is determined in step S504 to be "full color", the flow advances to step S507 to set "2" as the number N of succeeding pages to be referred to, and shifts to step S508. This means that a larger number of succeeding pages are referred to in the presence of an immediately preceding page whose print process is "full color" than in the absence of any immediately preceding page. In this case, the print process is controlled not to be switched to the monochrome print process unless a larger number of monochrome pages continue. This is because in the presence of an immediately preceding page whose print process is "full color", switching to the monochrome print process requires a loss time of about 5 sec owing to movement of the drum or the like as described.

After the number N of pages to be referred to is decided in step S506 or S507, the flow shifts to step S508 to reset the timer. In the first embodiment, the flow waits for generation of a succeeding page if the print process of a target page cannot be decided owing to a small number of succeeding pages. The timer controls to prevent the standby time from exceeding a predetermined time.

The flow shifts to step S509 to check whether N or more succeeding pages exist. This can be determined from the number of intermediate data stored in the intermediate buffer 209. If YES in step S509, the flow shifts to step S510 to check whether the N succeeding pages contain a full-color page. If YES in step S510, the flow advances to step S511 to select the full-color print process, and then processing ends. At this time, "full color" is set in the print process color information 315. If NO in step S510, the flow shifts to step S512 to select the monochrome print process, and then processing ends.

If NO in step S509, the flow advances to step S513 to check whether a full-color page appears among succeeding pages. If YES in step S513, the flow advances to step S514 to select the full-color print process, and then processing ends. At this time, "full color" is set in the print process color information 315. If NO in step S513, the flow advances to step S515.

In step S515, the presence of a page which is being generated is checked. This can be determined by referring to the header 310 of the newest intermediate data in the intermediate buffer 209 and checking whether "during generation" is set in the area 311. If NO in step S515, the flow shifts to step S516 to select the monochrome print process, and then processing ends.

If YES in step S513, the flow shifts to step S517 to check whether the timer has started. If NO in step S517, the flow shifts to step S518 to start the timer, and returns to step S509 to check again whether N or more succeeding pages exist. If YES in step S517, the flow shifts to step S519 to check whether a predetermined time has elapsed. In the first embodiment, the predetermined time is 2 sec at maximum. If YES in step S519, the flow shifts to step S516 to select the monochrome print process, and then processing ends. If NO in step S519, the flow returns to step S509 to check again whether N or more succeeding pages exist.

The above-described print process selection processing for a monochrome page in the first embodiment can realize switching to an optimal print process in accordance with the presence/absence of pages before and after a page to be printed, the print processes of preceding and succeeding pages, and whether preceding and succeeding pages are color/monochrome pages.

Second Embodiment

In the first embodiment, the print process of a page to be printed is decided by giving attention to the presence/absence of pages before and after the page to be printed, the print processes of preceding and succeeding pages, and whether preceding and succeeding pages are color/monochrome pages. In the second embodiment, a more efficient print process is selected in consideration of switching of the sheet size or sheet type. As an example of changing the print process depending on the sheet size or sheet type, when data is printed on a thick sheet or OHP sheet, the sheet convey speed is decreased and the heating time by the fixing unit is prolonged for higher toner fixation.

An LBP 100 according to the second embodiment can print data on a plain sheet, thick sheet, or OHP sheet, and can be applied to an LBP with a printing mechanism having different convey speeds.

The internal structure of the LBP 100 and the arrangement of the controller in the second embodiment are the same as those described in the first embodiment with reference to FIGS. 1 and 2, and a description thereof will be omitted. The structure of intermediate data generated in an intermediate buffer 209 and the processing procedures of generation processing are also the same as those described in the first embodiment with reference to FIGS. 3 and 4, and a description thereof will be omitted.

In switching the sheet convey speed, an LBP of this type generally discharges all sheets during conveyance outside the apparatus, and then switches the rotational speeds of various sheet convey rollers and rotary polygon mirrors. To print a monochrome page on a plain sheet subsequently to printing of an OHP sheet in the full-color print process, a plain sheet cannot be fed until the immediately preceding page is discharged outside the apparatus. Hence, even if a monochrome page is printed by switching from the full-color print process to the monochrome print process, the necessary time does not surface.

The processing procedures of print process selection processing for a monochrome page in consideration of the characteristics of the printing mechanism will be described with reference to FIGS. 6A and 6B.

Figure 6B:
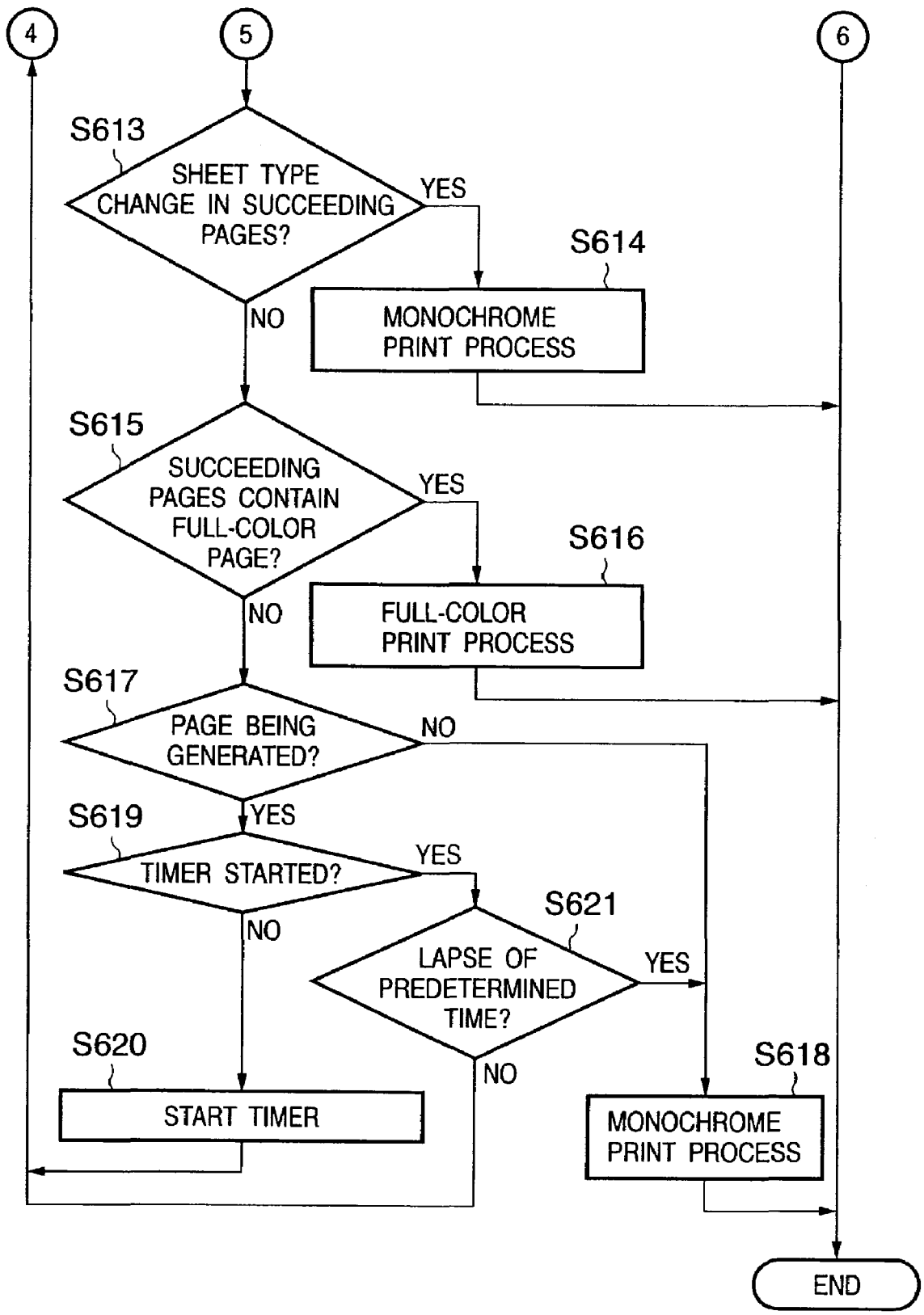

FIGS. 6A and 6B are flow charts showing the processing procedures of print process selection processing for a monochrome page in the LBP 100 according to the second embodiment of the present invention.

In step S601, whether a page to be printed is monochrome or full-color is checked. This can be determined by referring to page color information 314 of intermediate data. For a full-color page, the flow shifts to step S602 to select the full-color print process, and print process selection processing for the page to be printed ends. In this case, "full color" is set in print process color information 315 during generation of intermediate data, and need not be set again in the print process color information 315.

If the page is a monochrome page in step S601, the flow advances to step S603 to check whether an immediately preceding page exists and the page is of the same sheet type as the page to be printed. Since intermediate data is deleted when printing of a page is completed, the presence/absence of an immediately preceding page can be determined from the presence/absence of intermediate data of the immediately preceding page. The sheet type can be determined from sheet type information set in a sheet type area 313 of a header 310 of intermediate data. Note that different sheet types mean different print processes, like an OHP sheet and plain sheet.

If the immediately preceding page exists in step S603 and the page is to be printed on a sheet of the same type as the page to be printed, the flow advances to step S604 to check whether the print process of the page is the monochrome print process. The print process of the immediately preceding page has been determined at this time, and set in the print process color information 315 of the intermediate data of the immediately preceding page. If the print process of the immediately preceding page is determined to be the monochrome print process by referring to the print process color information 315, the flow shifts to step S605 to select the monochrome print process, and then processing ends. At this time, "monochrome" is set in the print process color information 315.

If no immediately preceding page exists in step S603, if the print process of the immediately preceding page is the full-color print process in step S604, or if the sheet type is different in step S603, the print process of a monochrome page to be printed is decided using the presence/absence of a succeeding page, the page color information 314, and the sheet type information 313 as pieces of determination information. In the second embodiment, the number of succeeding pages to be referred to is "1" or "2". The number of pages to be referred to will be represented by N.

If no immediately preceding page exists in step S603 or the sheet type is different, the flow shifts to step S606 to set "1" as the number N of succeeding pages to be referred to, and shifts to step S608. If the print process of the immediately preceding page is determined in step S604 to be "full color", the flow advances to step S607 to set "2" as the number N of succeeding pages to be referred to, and shifts to step S608. This means that a larger number of succeeding pages are referred to in the presence of an immediately preceding page whose print process is "full color" than in the absence of any immediately preceding page or when the sheet type is different and the target page cannot be fed until the immediately preceding page is discharged outside the apparatus. When an immediately preceding page whose print process is "full color" exists, the print process is controlled not to be switched to the monochrome print process unless a larger number of monochrome pages continue. This is because in the presence of an immediately preceding page whose print process is "full color", switching to the monochrome print process requires a loss time of about 5 sec, as described.

After the number N of pages to be referred to is decided in step S606 or S607, the flow shifts to step S608 to reset the timer. In the second embodiment, the flow waits for generation of a succeeding page if the print process of a monochrome page to be printed cannot be decided owing to a small number of succeeding pages. The timer controls to prevent the standby time from exceeding a predetermined time.

The flow shifts to step S609 to check whether N or more succeeding pages exist. This can be determined from the number of intermediate data stored in the intermediate buffer 209. If YES in step S609, the flow shifts to step S610 to check whether the N succeeding pages contain a full-color page and whether the sheet type changes. If the N succeeding pages contain a full-color page and the sheet type does not change, the flow advances to step S611 to select the full-color print process, and then processing ends. At this time, "full color" is set in the print process color information 315.

If the N succeeding pages do not contain a full-color page or the sheet type changes in step S610, the flow shifts to step S612 to select the monochrome print process, and then processing ends.

If NO in step S609, the flow advances to step S613 to check whether the sheet type changes. If YES in step S613, the flow advances to step S614 to select the monochrome print process, and then processing ends.

If NO in step S613, the flow shifts to step S615 to check whether a full-color page appears among succeeding pages. If YES in step S615, the flow advances to step S616 to select the full-color print process, and then processing ends. At this time, "full color" is set in the print process color information 315.

If NO in step S615, the flow advances to step S617 to check the presence of a page which is being generated. This can be determined by referring to the header 310 of the newest intermediate data in the intermediate buffer 209 and checking whether "during generation" is set in the area 311. If NO in step S617, the flow shifts to step S618 to select the monochrome print process, and then processing ends.

If YES in step S617, the flow shifts to step S619 to check whether the timer has started. If NO in step S619, the flow shifts to step S620 to start the timer, and returns to step S609 to check again whether N or more succeeding pages exist. If YES in step S619, the flow shifts to step S621 to check whether the timer has counted a predetermined time. In the second embodiment, the predetermined time is 2 sec at maximum. If YES in step S621, the flow shifts to step S618 to select the monochrome print process, and then processing ends. If NO in step S621, the flow returns to step S609 to check again whether N or more succeeding pages exist and execute the same processing as that described above.

The above-described print process selection processing for a monochrome page in the second embodiment can realize switching to an optimal print process corresponding to the characteristics of the printing mechanism in consideration of the presence/absence of pages before and after a page to be printed, the print processes of these pages, the color/monochrome attribute, and switching of the sheet type.

The second embodiment adopts the sheet type as a sheet attribute. For a printing mechanism which cannot perform continuous printing due to switching of the sheet size, a print process may be selected by referring to the sheet size in addition to the sheet type.

The number (N) of succeeding pages to be referred to may be designated from an operation panel 151 or a printer driver (not shown).

As described above, according to the first and second embodiments, an optimal print process can be selected in consideration of whether an immediately preceding page exists, in addition to the conventional method of deciding a print process for printing a monochrome page in consideration of whether immediately preceding and succeeding pages are monochrome or full-color.

For a printing mechanism in which the time taken to switch between the monochrome and full-color print processes does not surface when the sheet attribute such as the sheet type or sheet size is switched, an optimal print process can be selected in consideration of the characteristics of the printing mechanism.

As described above, the present invention can more efficiently decide the print process of a monochrome page, and prevent a print processing delay and the wear of a device.

Also, the present invention can further optimize decision of the print process by determining the print process of a monochrome page on the basis of not whether a page to be printed is monochrome or full-color, but the presence/absence of immediately preceding and succeeding pages and their attributes.

Third Embodiment

The third embodiment provides a means for realizing optimization of the print process by user operation when two print processes are different in processing speed and a predetermined time is required to switch the print process in a printing system which is constituted by a full-color printer having monochrome and full-color print processes and its printer driver.

The internal structure of an LBP 100 and the arrangement of the controller in the third embodiment are the same as those described in the first embodiment with reference to FIGS. 1 and 2, and a description thereof will be omitted. The structure of intermediate data generated in an intermediate buffer 209 is also the same as that described in the first embodiment with reference to FIG. 3, and a description thereof will be omitted.

In the full-color print process, an image can be formed by all C, M, Y, and K drums. To print monochrome data in this print process, an image is actually formed by only a K electrostatic drum 144. In the monochrome print process, three drums corresponding to C, M, and Y move to retract positions. While a print sheet passes through these three drums, the print sheet is conveyed at a higher speed than in general image formation.

In the third embodiment, an area 315 is a print process color information area representing a print process when printing a page. "0" meaning "undefined" is set in the area 315 in the initial state. If an area 314 holds "1" meaning "full color" upon the completion of generating intermediate data of the page, "1" representing "full-color print process" is also set in the area 315. If the page is a monochrome page, i.e., "2" representing "monochrome" is set in the area 314, "1" representing "full-color print process" or "2" representing "monochrome print process" is set in accordance with print mode information (set by the user as will be described later) added to a print job.

Figure 7A:
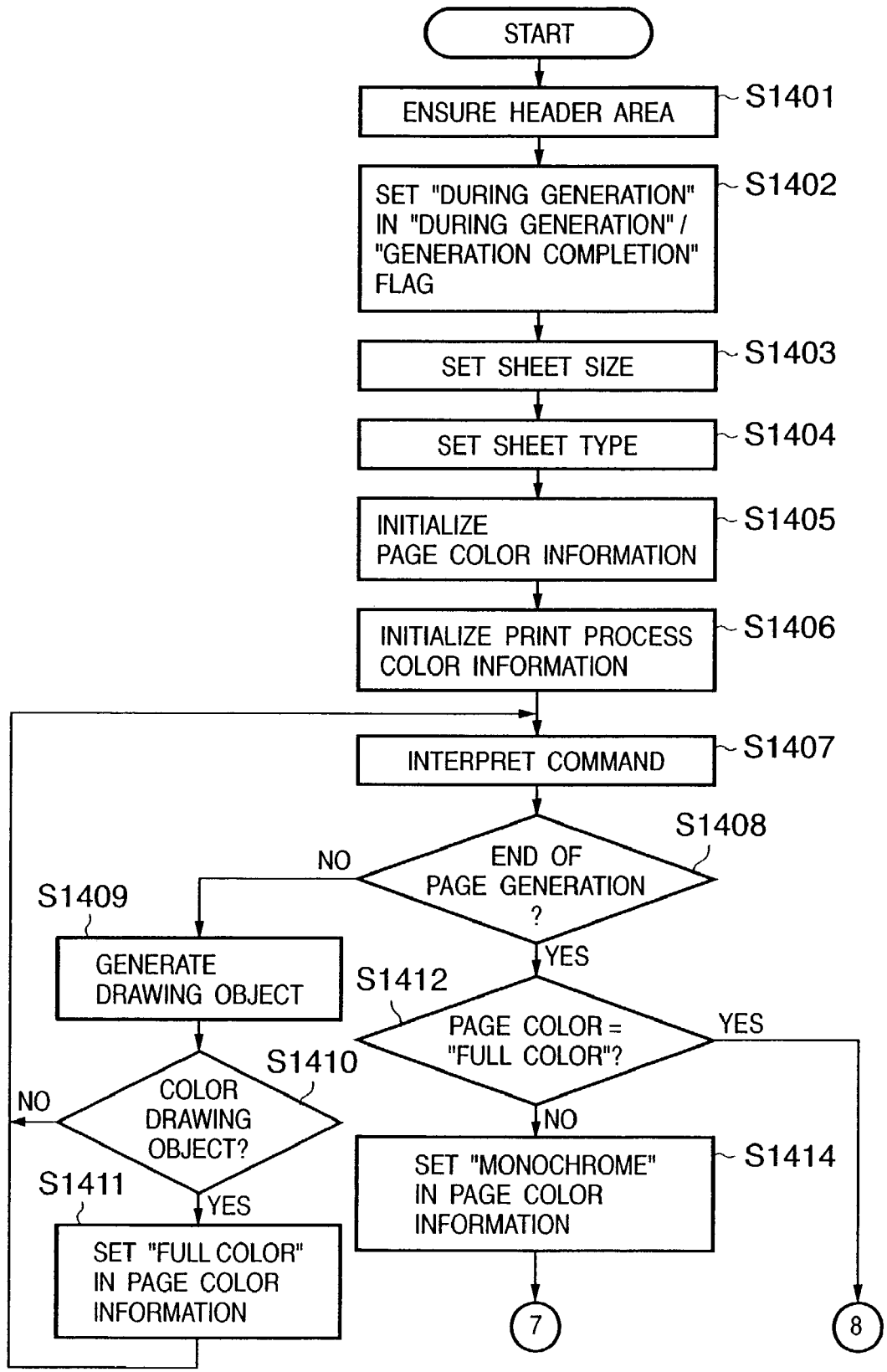
FIGS. 7A and 7B are flow charts showing the processing procedures of intermediate data generation processing according to the third and fourth embodiments.
Figure 7B:
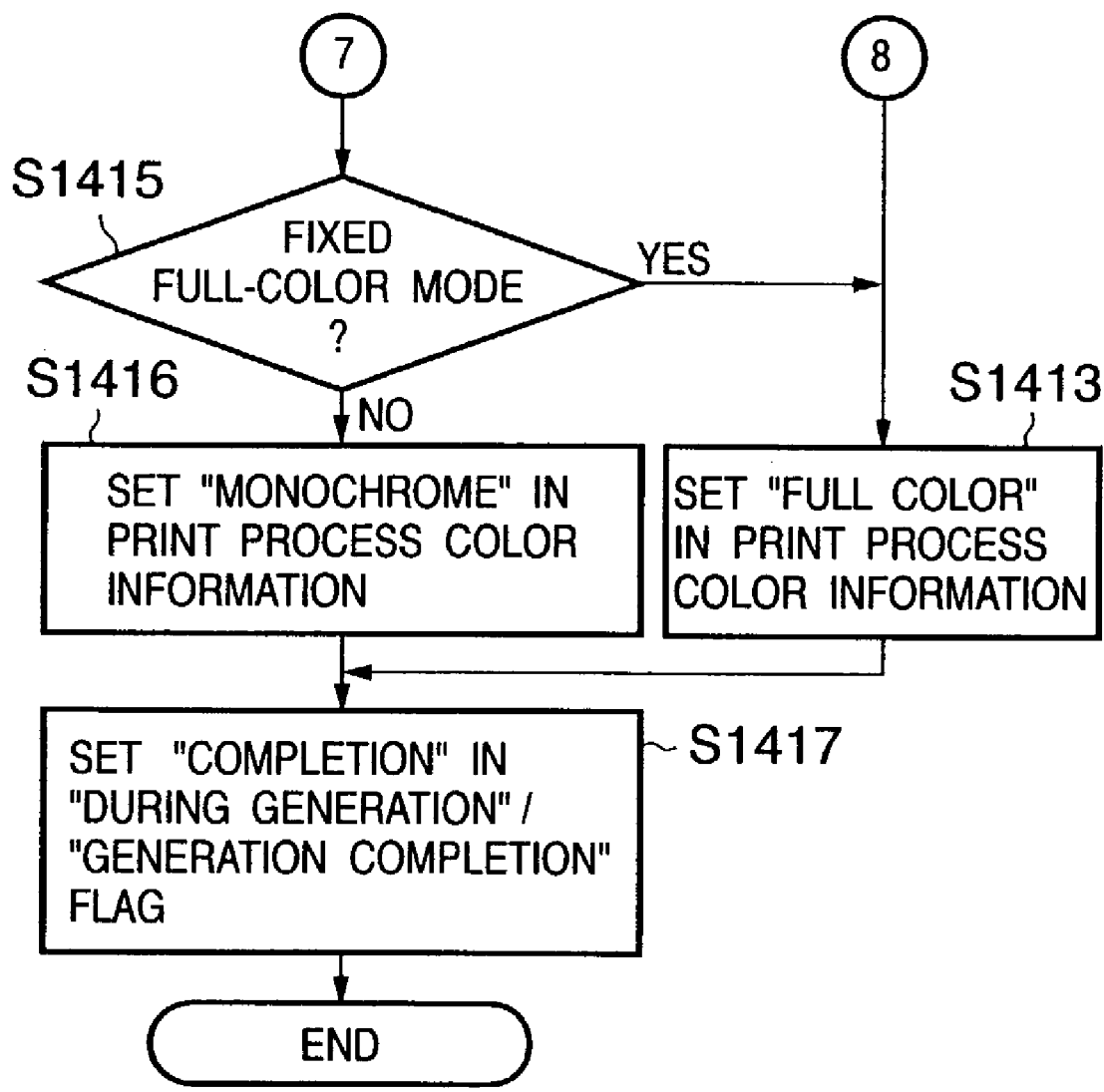

The processing procedures of intermediate data generation processing will be described in more detail with reference to the flow charts of FIGS. 7A and 7B.

After generation of intermediate data 300 of a given page starts, a header area 310 is ensured in step S1401, and "0" meaning that the intermediate data is being generated is set in an area 311 in step S1402. In steps S1403 and S1404, a sheet size and sheet type designated by commands are set. Note that the sheet size and sheet type have already been decided at the start of generating intermediate data of the page. In steps S1405 and S1406, "undefined" is set in the page color information area 314 and print process color information area 315.

By these processes, initial setting of the header 310 is completed, and the flow shifts to drawing command processing.

One command is interpreted in step S1407, and whether the command is a page end command or a drawing command for a general character, graphic, image, or the like is checked in step S1408.

For the drawing command, the flow shifts to step S1409 to process the drawing command and add the drawing object to a drawing object area 320. Note that the drawing object area 320 is extended, as needed. After the drawing object is added, the flow shifts to step S1410 to check whether the drawing object is a color drawing object. If YES in step S1410, "full color" ("1") is set in the page color information area 314 in step S1411. The flow returns to step S1407 to process the next command. If NO in step S1410, the flow directly returns to step S1407.

If the command is a page end command, the flow advances from step S1408 to step S1412 to check whether "full color" has been set in the page color information area 314. If YES in step S1412, the flow advances to step S1413 to set "full color" ("1") also in the print process color information area 315.

If NO in step S1412, the flow shifts to step S1414 to change the page color information area 314 to "monochrome" ("2"). In step S1415, print mode information added to the start of print data of a print job is read out, and whether the print mode information represents "monochrome/full-color switching mode" or "fixed full-color mode" is determined.

To select "monochrome/full-color switching mode",

PROCESS–COLOR=AUTO is designated at the start of print data of a print job. To select "fixed full-color mode",

PROCESS–COLOR=FULLCOLOR is designated. If no print mode information is designated at the start of a print job, "monochrome/full-color switching mode" is set.

For "fixed full-color mode", the flow advances from step S1415 to step S1413 to set "full color" in the print process color information area 315. For "monochrome/full-color switching mode", the flow shifts from step S1415 to step S1416 to set "monochrome" in the print process color information area 315.

"1" meaning the completion of generating intermediate data is set in the area 311 in step S1417, and intermediate data generation processing ends.

After intermediate data of one page has been generated, intermediate data of the next page is subsequently generated. Intermediate data of a plurality of pages are stored in the intermediate buffer 209.

After intermediate data of at least one page is stored in the intermediate buffer 209, the page can be printed. A sheet size, sheet type, and print process type (monochrome/full color) are designated with respect to a printing mechanism 213, and a print request is issued. When the printing mechanism 213 becomes ready, intermediate data in the intermediate buffer 209 is rendered for each band in synchronism with sheet convey at the printing mechanism 213. Dot data is converted into a video signal, which is transferred to the printing mechanism 213. Whether to select the monochrome print process or full-color print process complies with the print process color information 315.

Figure 8:
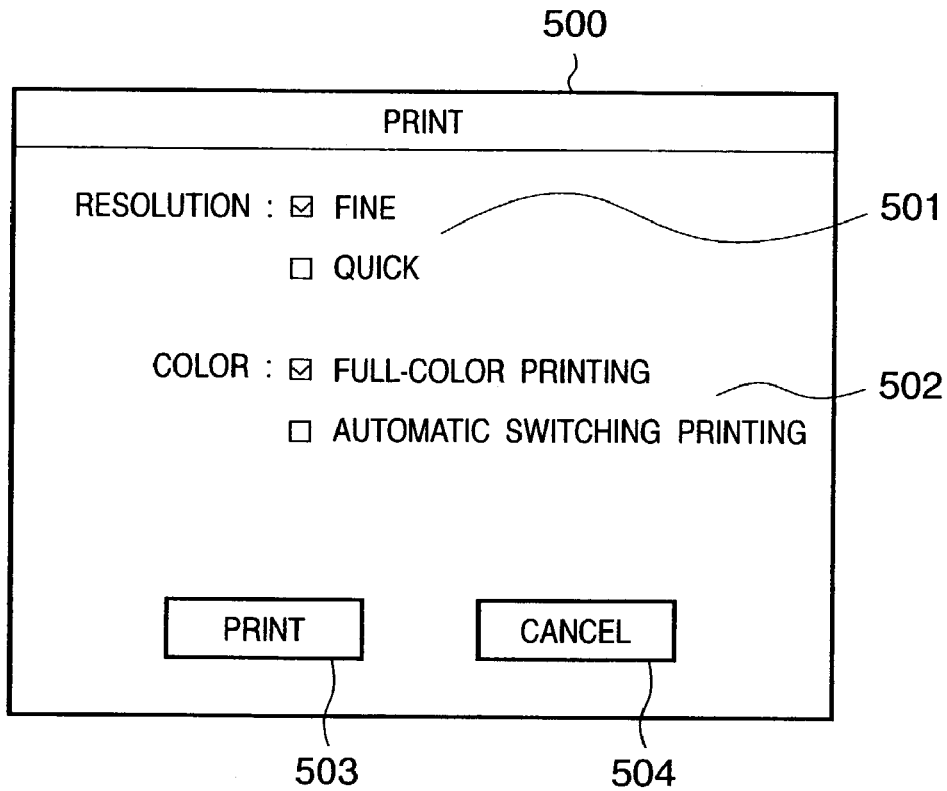
FIG. 8 is a view showing the print execution instruction window of a printer driver according to the third embodiment.

The printing execution window of the printer driver and a selected print mode will be described with reference to FIG. 8.

Reference numeral 500 denotes a printing execution instruction window by the printer driver. A field 501 is used to designate a processing resolution in printing a document, and "fine" or "quick" is exclusively selected. Note that print processing is done at 600 dpi for "fine" and 300 dpi for "quick". In FIG. 8, "fine" is selected.

A field 502 is used to designate whether to print a document in full color or monochrome, and "full-color printing" or "automatic switching printing" is exclusively selected. In FIG. 8, "full-color printing" is selected.

Set values designated in the fields 501 and 502 are transmitted as additional information of print data to the LBP 100 by clicking a printing execution button 503.

Header information added to print data is parenthesized between "{ec}%-HEADER" and "{ec}%-END". For example, when "resolution=fine" and "color=full-color printing" are set, header information:
{ec}%-HEADER
RESOLUTION=FINE
PROCESS–COLOR=FULLCOLOR
{ec}%-END is added. Note that {ec} represents hexadecimal 1B.

In this case, #PROCESS–COLOR=FULLCOLOR means "fixed full-color mode".

When "automatic switching printing" is selected in the field 502, header information:

PROCESS-COLOR=AUTO is added, which means "monochrome/full-color switching mode". In this case, a monochrome page is printed in the monochrome print process, and a full-color page is printed in the full-color print process.

By clicking a cancel button 504, the printing window 500 is closed without executing printing.

According to the above-described print process selection processing in the third embodiment, a print mode in which printing is performed in the full-color print process can be selected regardless of whether a page to be printed is monochrome or full-color. When this print mode is selected, frequent switching of the print process can be prevented even for a print job in which full-color and monochrome pages alternately exist. As a result, high-speed print processing with low power consumption can be realized.

Fourth Embodiment

In full-color printing according to the third embodiment, all pages are printed in the full-color print process. For a document in which many monochrome pages successively appear, this may be disadvantageous in terms of the printing speed, the load on the printing mechanism, and power consumption in comparison with a case wherein a monochrome page is printed by switching the print process to the monochrome print process. A typical example is a document in which only the first page is full-color and several ten remaining pages are monochrome.

To avoid this, the printing execution instruction window of the third embodiment is modified to allow the user to select a setting suitable for printing of a document containing many monochrome pages.

The internal structure of an LBP and the arrangement of the controller in the fourth embodiment are the same as those described in the first embodiment with reference to FIGS. 1 and 2, and a description thereof will be omitted. The structure of intermediate data generated in an intermediate buffer 209 and the processing procedures of generation processing are also the same as those described in the third embodiment with reference to FIG. 3 and FIGS. 7A and 7B, and a description thereof will be omitted.

Figure 9:
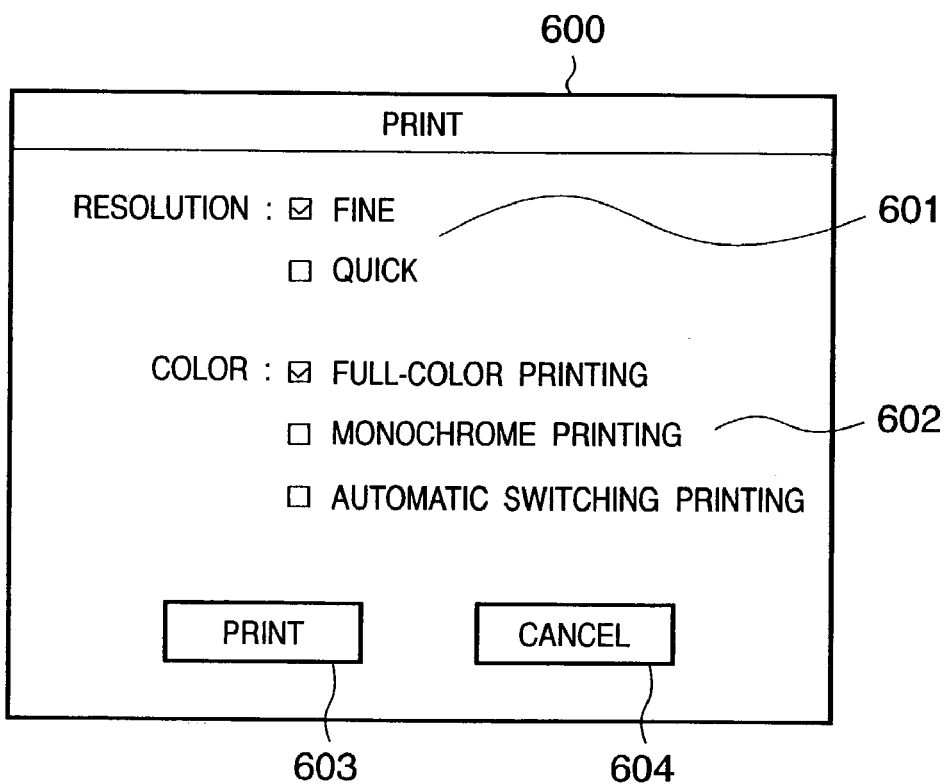
FIG. 9 is a view showing the print execution instruction window of a printer driver according to the fourth embodiment.

The printing execution window of the printer driver and a selected print mode will be described with reference to FIG. 9.

Reference numeral 600 denotes a printing execution instruction window by the printer driver. A field 601 is used to designate a processing resolution in printing a document, similar to the field 501 of the third embodiment.

A field 602 is used to designate whether to print a document in full color or monochrome, and "full-color printing", "monochrome printing", or "automatic switching printing" is exclusively selected. In FIG. 9, "full-color printing" is selected.

Set values designated in the fields 601 and 602 are transmitted as additional information of print data to an LBP 100 by clicking a printing execution button 603. The structure of header information added to print data is the same as that in the third embodiment except designation of "#PROCESS-COLOR" in the field 602.

When "full-color printing" is selected in the field 602, header information:

PROCESS-COLOR=FULLCOLOR is added, which means the above-mentioned "fixed full-color mode". Since all pages are printed in the full-color print process, this mode is suitable for outputting a document containing not so many monochrome pages.

When "monochrome printing" is selected in the field 602, header information:

PROCESS-COLOR=AUTO is added, which means "monochrome/full-color switching mode". Since the printer driver generates monochrome print data regardless of whether original data is color or monochrome, all pages are printed in the monochrome print process.

When "automatic switching printing" is selected in the field 602, header information:

PROCESS-COLOR=AUTO is added, which means "monochrome/full-color switching mode". This mode is suitable for outputting a document containing many monochrome pages because a monochrome page is printed in the monochrome print process and a full-color page is printed in the full-color print process.

By clicking a cancel button 604, the printing window 600 is closed without executing printing.

According to the above-described print process selection processing in the fourth embodiment, it can be set to print all pages in the full-color print process when printing a document having a relatively small number of monochrome pages. It can also be set to print all pages in the monochrome print process when printing a document having many monochrome pages. That is, the user can freely select a print mode suitable for the feature of a document.

As described above, according to each of the above embodiments, all pages can be set to be printed in the full-color print process. If this mode is set for a full-color print job containing a relatively small number of monochrome pages, the switching time, power consumption, and load on the printing mechanism by print process switching operation can be reduced.

A print process for printing a monochrome page is decided in accordance with the printing condition of the printer driver UI. The printer need not wait for generation of intermediate data of a succeeding page, and can start printing at the same time as generation of intermediate data of a target page.

Note that the print process decision method (method of deciding a color or monochrome process) described in the first and second embodiments may be applied to "automatic switching printing" in the third and fourth embodiments.

As described above, the present invention allows the user to set a desired print mode in which data is printed in the full-color print process regardless of whether an object to be printed is monochrome or full-color, and can easily realize optimization of a print process corresponding to a print job.

Fifth Embodiment

An arrangement of a color laser beam printer will be described as an example of an output apparatus according to the fifth embodiment.

Figure 10:
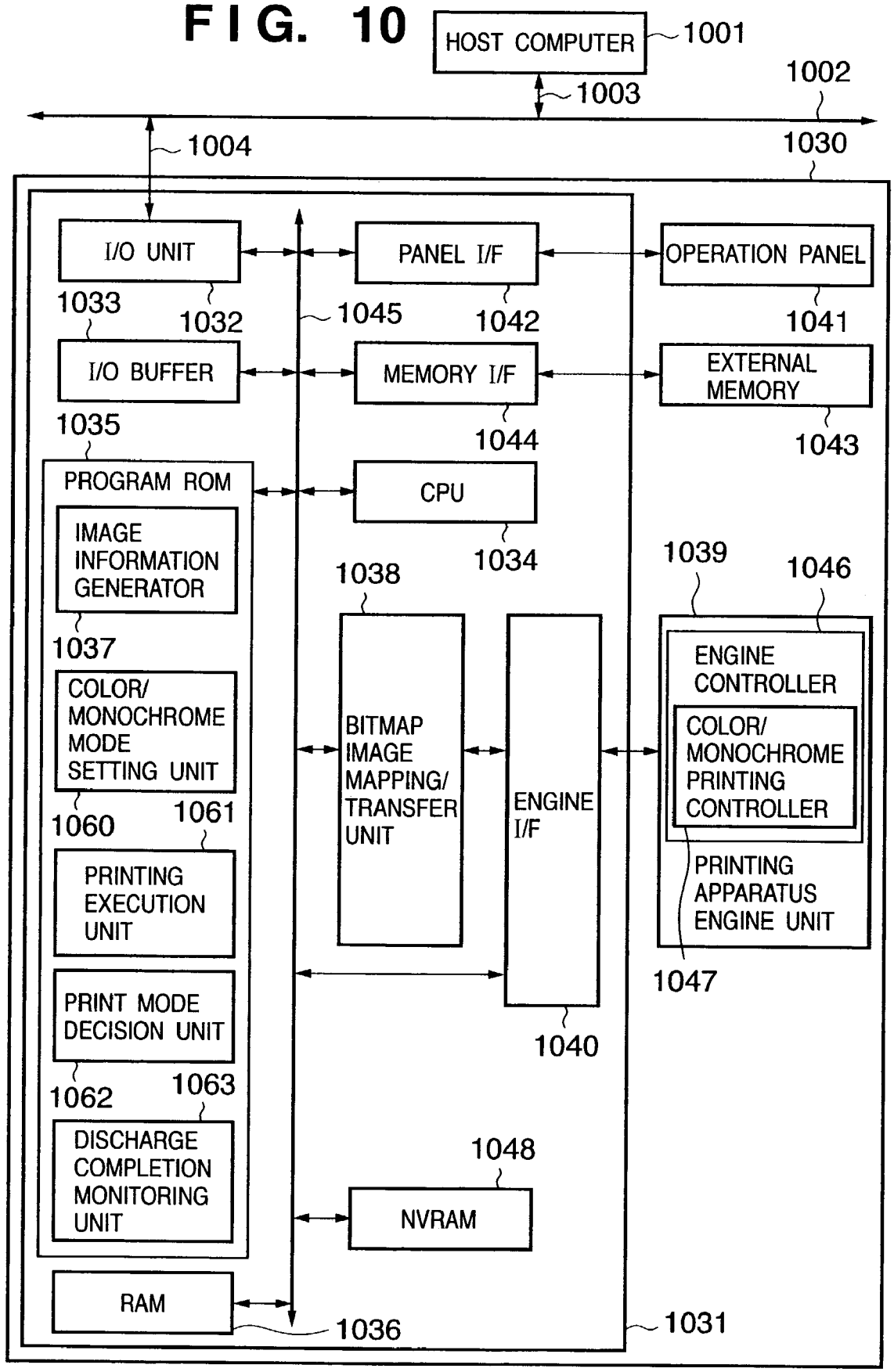
FIG. 10 is a block diagram showing the system configuration of a color laser beam printer according to the fifth embodiment.

FIG. 10 is a block diagram showing a printing system to which the fifth embodiment is applied, i.e., showing a system configuration constituted by a host computer 1001, a color laser beam printer 1030, a network 1002 connected to these devices, and communication lines 1003 and 1004 for connection to the network 1002.

In the color laser beam printer 1030, reference numeral 1031 denotes a laser beam printer controller (to be referred to as a controller hereinafter) which controls the whole operation of the printer 1030.

In the controller 1031, reference numeral 1032 denotes an I/O unit which has a function of inputting/outputting data via the communication line 1004 connected to the network 1002. Communication with each terminal device is done via the I/O unit 1032, communication line 1004, and network 1002. Reference numeral 1033 denotes an I/O buffer used to transmit/receive printing control codes, control codes for registering various pieces of information in a server terminal, and data from each communication means; 1034, a CPU which controls the overall operation of the controller; 1035, a program ROM which stores a program describing the operation of the CPU 1034; 1036, a RAM used as a work memory for performing analysis of control codes and data, calculation necessary for printing, and processing of print data; and 1048, a nonvolatile RAM (NVRAM) which stores data that must be held even upon power-off of the printing apparatus.

The program ROM 1035 stores programs for an image information generator 1037, color/monochrome mode setting unit 1060, printing execution unit 1061, print mode decision unit 1062, and discharge completion monitoring unit 1063. The image information generator 1037 generates various image objects in accordance with settings of data received from the host computer 1001. The color/monochrome mode setting unit 1060 designates switching of color/monochrome printing in accordance with color information and print settings of the pages of color and monochrome documents sent from the host computer 1001. The printing execution unit 1061 executes processing of sending a generated printable image object to an engine unit. The print mode decision unit 1062 decides in accordance with the situation whether to instruct the engine of a color or monochrome print mode for a page to be printed. The discharge completion monitoring unit 1063 monitors whether a sheet bearing a printed page has been discharged without any error such as jam.

Reference numeral 1038 denotes a bitmap image mapping/transfer unit which maps data into a bitmap image and transfers the mapped bitmap image to a printing apparatus engine unit 1039; 1040, an engine I/F which connects the controller 1031 and the printing apparatus engine unit 1039 for actually printing on a sheet; 1042, a panel I/F which connects the controller 1031 and an operation panel 1041; 1044, a memory I/F which connects an external memory 1043 and the controller 1031; and 1045, a system bus which connects units within the above-mentioned controller 1031.

The operation panel 1041 allows operating the printing apparatus. The external memory 1043 is used to save print data and various pieces of information about the printing apparatus.

The printing apparatus engine unit (to be referred to as an engine unit hereinafter) 1039 actually prints on a print sheet. The engine unit 1039 comprises an engine controller 1046 which controls printing from sheet feed to data printing and discharge, and a color/monochrome printing controller 1047 which switches between a color print mode in which color print processing is performed using Y (Yellow), M (Magenta), C (Cyan), and K (blacK), and a monochrome print mode in which monochrome print processing is performed using only K.

Results of determining from data contents whether to print a generated image in color or monochrome upon image information generation will be called color and monochrome modes. In the fifth embodiment, the color mode targets a page containing a color image object (i.e., color page), and the monochrome mode targets a page containing no color image object (i.e., monochrome page). A mode in which color printing operation is actually performed by the engine controller 1046 using Y, M, C, and K mechanisms will be called a color print mode. A mode in which monochrome printing operation is done using only K will be called a monochrome print mode.

Figure 11:
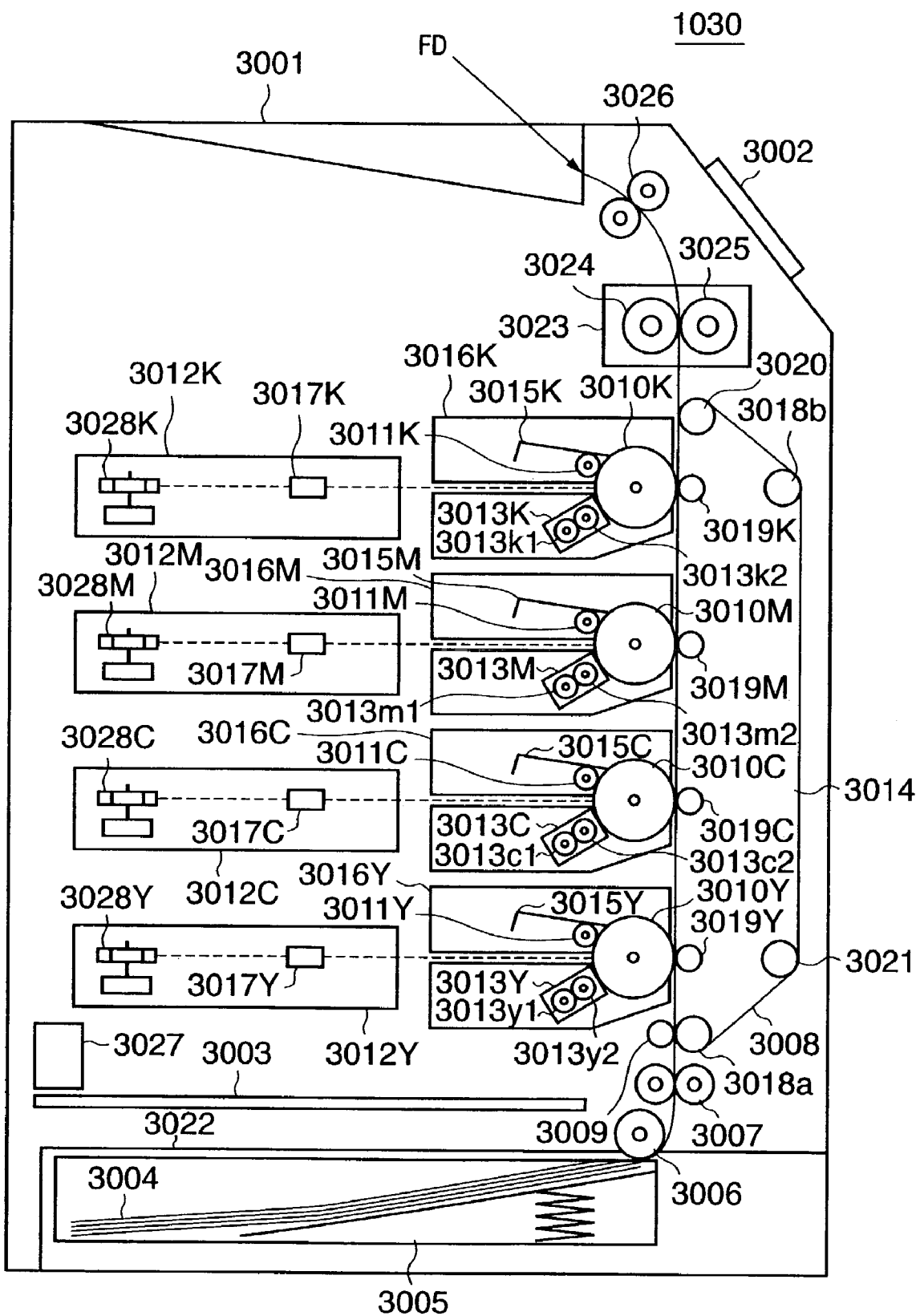
FIG. 11 is a sectional view for explaining the engine unit of the color laser beam printer according to the fifth embodiment.

FIG. 11 is a sectional view showing the arrangement of the engine unit 1039 of the color laser beam printer 1030. As shown in FIG. 11, the color laser beam printer 1030 comprises a housing 3001. The housing 3001 incorporates mechanisms for constituting the engine unit 1039, and a control board storage unit 3003 which stores the engine controller 1046 and printer controller 1031 (shown in FIG. 10) for controlling each print process processing by each mechanism.

The color laser beam printer 1030 comprises four photosensitive drums 3010 (3010K, 3010M, 3010C, and 3010Y) serving as image carriers which are arranged vertically. The photosensitive drums 3010 are rotated and driven counterclockwise in FIG. 10 by a driving means (not shown). The photosensitive drums 3010 are surrounded in the rotational direction by charging devices 3011 (3011K, 3011M, 3011C, and 3011Y) which uniformly charge the surfaces of the photosensitive drums 3010, scanners 3012 (3012K, 3012M, 3012C, and 3012Y) which emit laser beams on the basis of image information to form electrostatic latent images on the photosensitive drums 3010, developing devices 3013 (3013K, 3013M, 3013C, and 3013Y) which apply toner to electrostatic latent images to develop the images as toner images, an electrostatic convey/transfer device 3014 which transfers toner images on the photosensitive drums 3010 onto a transfer medium, and cleaning devices 3015 (3015K, 3015M, 3015C, and 3015Y) which remove toner left on the surfaces of the photosensitive drums 3010 after transfer. Note that the photosensitive drums 3010, charging devices 3011, developing devices 3013, and cleaning devices 3015 are integrated into cartridges, forming drum-integrated process cartridges 3016 (3016K, 3016M, 3016C, and 3016Y). These process cartridges 3016 are detachable from the housing 3001.

The arrangements of the respective units will be sequentially explained. Each photosensitive drum 3010 is constituted using an organic photoconductive layer (OPC photosensitive member). The photosensitive drum 3010 is freely rotatably supported by support members at two ends. A driving force from a driving motor (not shown) is transmitted to one end, rotating and driving the photosensitive drum 3010 counterclockwise in FIG. 11.

Each charging device 3011 is a conductive roller formed into a roller shape. This roller is brought into contact with the surface of the photosensitive drum 3010. A charging bias voltage is applied from a power supply (not shown) to the roller, uniformly charging the surface of the photosensitive drum 3010.

The scanners 3012 are horizontally arranged beside the photosensitive drums 3010. Image beams corresponding to image signals from laser diodes (not shown) irradiate polygon mirrors 3028 (3028K, 3028M, 3028C, and 3028Y)

rotated at a high speed by a scanner motor. The image beams reflected by the polygon mirrors selectively illuminate the surfaces of the charged photosensitive drums 3010 via imaging lenses 3017 (3017K, 3017M, 3017C, and 3017Y), forming electrostatic latent images.

The developing devices 3013 (3013K, 3013M, 3013C, and 3013Y) are formed from developing units which respectively contain yellow, cyan, magenta, and black toners sequentially from the upstream of the transfer medium convey direction (lower portion in FIG. 11). In developing electrostatic latent images on the photosensitive drums 3010, toners in the containers of the corresponding developing units are supplied to spreading rollers 3013$k$1, 3013$m$1, 3013$c$1, and 3013$y$1 by supply mechanisms. The toners are applied as thin layers to the outer surfaces of rotating developing rollers 3013$k$2, 3013$m$2, 3013$c$2, and 3013$y$2. At the same time, the toners are charged (triboelectrification). By applying a developing bias between the developing rollers and the photosensitive drums 3010 bearing the electrostatic latent images, the toners are deposited onto the electrostatic latent images to develop the images as toner images.

Each cleaning device 3015 removes so-called residual toner which is not transferred and remains on the surface of the photosensitive drum 3010 after toner deposited on the photosensitive drum 3010 by the developing device 3013 is transferred onto a transfer medium.

An electrostatic convey belt 3008 serving as a belt member is so disposed as to face all the photosensitive drums 3010K, 3010M, 3010C, and 3010Y and circulate in contact with them. The electrostatic convey belt 3008 is vertically supported by rollers with four shafts. The electrostatic convey belt 3008 circulates such that a transfer medium is electrostatically chucked by the outer surface on the left side in FIG. 11, and brought into contact with the photosensitive drums 3010. An attraction roller 3009 is in contact with the electrostatic convey belt 3008 on the upstream of the transfer medium convey direction (lower portion in FIG. 11). In conveying a transfer medium, a bias voltage is applied to the attraction roller 3009 to form an electric field between the attraction roller 3009 and a grounded roller 3018$a$. Dielectric polarization is generated between the electrostatic convey belt 3008 and the transfer medium to generate an electrostatic chuck force between them.

Accordingly, the transfer medium is conveyed to transfer positions by the electrostatic convey belt 3008, and toner images on the photosensitive drums 3010 are sequentially transferred. Transfer rollers 3019 (3019K, 3019M, 3019C, and 3039Y) are arranged as transfer members in contact with the inner surface (back surface) of the electrostatic convey belt 3008 in correspondence with the four photosensitive drums 3010K, 3010M, 3010C, and 3010Y. The transfer rollers 3019 are connected to a transfer bias power supply (not shown). The transfer rollers 3019 face the corresponding photosensitive drums 3010, and form transfer portions. Positive charges are applied from the transfer rollers 3019 to the transfer medium via the electrostatic convey belt 3008. Electric fields by the charges transfer negatively charged toner images on the photosensitive drum 3010 to the transfer medium in contact with the photosensitive drum 3010.

The electrostatic convey belt 3008 is looped by four rollers: a driving roller 3020, driven rollers 3018$a$ and 3018$b$, and tension roller 3021. The electrostatic convey belt 3008 rotates clockwise in FIG. 11. While the electrostatic convey belt 3008 circulates to transfer a transfer medium from the driven roller 3018$a$ to the driving roller 3020, toner images on the photosensitive drums are transferred.

A feed unit 3022 feeds a transfer medium to an image forming portion, and a plurality of transfer media 3004 are stored in a feed cassette 3005. In image formation, a pickup roller (semilunar roller) 3006 and a pair of registration rollers 3007 are driven and rotated in accordance with image formation operation, and separately feed transfer media in the feed cassette 3005 one by one. The leading end of each transfer medium runs into the pair of registration rollers 3007, temporarily stops, forms a loop, and then is fed again to the electrostatic convey belt 3008.

A fixing unit 3023 fixes a plurality of toner images transferred to a transfer medium. The fixing unit 3023 is made up of a heating roller 3024 which is driven and rotated, and a press roller 3025 which is in press contact with the heating roller 3024 and applies heat and pressure to a transfer medium.

More specifically, a transfer medium to which toner images on the photosensitive drums 3010 are transferred is conveyed by a pair of fixing rollers when passing through the fixing unit 3023, and receives heat and pressure from the pair of fixing rollers 3024 and 3025. As a result, toner images in a plurality of colors are fixed onto the surface of the transfer medium.

The yellow, magenta, and cyan process cartridges 3016Y, 3016M, and 3016C are constituted such that the photosensitive drums 3010Y, 3010M, and 3010C move left by an elevating mechanism (not shown) from states in contact with the electrostatic convey belt 3008 to positions spaced apart from the electrostatic convey belt 3008. The elevating mechanism operates in accordance with a selected print mode. That is, when the color print mode is designated by the color/monochrome printing controller 1047 in the engine controller 1046, the photosensitive drums 3010Y, 3010M, and 3010C come into contact with the electrostatic convey belt 3008. Toner images on the photosensitive drums 3010 are transferred sequentially from yellow, magenta, cyan, and black by voltage application from the transfer rollers 3019Y, 3019M, 3019C, and 3019K.

When the monochrome print mode is designated, the elevating mechanism moves the photosensitive drums 3010Y, 3010M, and 3010C apart from the electrostatic convey belt 3008. Only the photosensitive drum 3010K is in contact with the electrostatic convey belt 3008, and a toner image on the photosensitive drum 3010K is transferred in only black by voltage application from the transfer roller 3019K. In the color print mode, a color document is not always printed. A monochrome document can be printed in the color print mode by the same operation except that a toner image is formed in only black. In the monochrome print mode, a transfer medium may pass through C, M, and Y drum positions at a high speed, realizing high-speed processing.

In this manner, the transfer medium 3004 bearing a toner image is separated from the electrostatic convey belt 3008 by the driving roller 3020, and reaches the fixing unit 3023. The toner image is thermally fixed onto the transfer medium 3004, and the transfer medium 3004 is discharged to a discharge portion FD by a pair of discharge rollers 3026.

An operation panel 3002 which constitutes the operation panel 1041 is attached to the housing 3001. The operation panel 3002 has switches for inputting instructions, an LED display for displaying information, and an LCD display. The operation panel 3002 also has an external memory 3027 for implementing the external memory 1043 used by the printer controller to store print data or the like.

As described above, the color laser beam printer 1030 operates even in the monochrome print mode. In this case, the yellow, cyan, and magenta photosensitive drums are spaced apart from the electrostatic convey belt. This reduces contact with the convey belt, prolonging the service lives of the yellow, cyan, and magenta photosensitive drums. In addition, the toner consumption amount can be suppressed. However, rotating the motor wears a contact portion. When monochrome printing is done in the color print mode, the operation is the same as that in the color print mode, and the yellow, cyan, and magenta photosensitive drums rotate (idle rotation) without any printing. For this reason, the yellow, cyan, and magenta photosensitive drums wear along with idle rotation owing to friction between the developing device and the contact portion, wasteful toner removal, and the like.

The operation of the printer controller having the above-described system configuration will be explained.

If the user instructs the host computer 1001 to execute printing, a control code and data are sent via the network 1002 and communication line 1003 to a printing apparatus (in this case, the color laser beam printer 1030) designated by the instruction. The printer 1030 receives data sent from the I/O unit 1032, temporarily stores it in the I/O buffer 1033, and then accumulates the received data in the RAM 1036.

The CPU 1034 processes the received data in accordance with a program described in the program ROM 1035. That is, the image information generator 1037 processes data, generating image information on each (image object) of graphic, character, and image data. After pieces of image information on all image objects in one page to be printed are generated, the color/monochrome mode setting unit 1060 sets either a color mode or monochrome mode for the page on the basis of designation of the color mode from the host computer and determination of whether a color image object exists. At the end of generation for one page, pieces of image information are transferred to processing of the printing execution unit 1061.

The printing execution unit 1061 monitors a page generated by the image information generator 1037 and color/monochrome mode setting unit 1060, and checks whether the page can be printed. If so, the print mode decision unit 1062 is activated to decide, on the basis of setting contents by the color/monochrome mode setting unit 1060 and the printing state of the printer 1030, whether to actually operate the engine unit 1039 in the color or monochrome print mode. The decision content of the print mode decision unit 1062 is set in the color/monochrome printing controller 1047 within the engine controller 1046 via the engine I/F 1040.

Image information to be printed is supplied from the printing execution unit 1061 to the bitmap image mapping/transfer unit 1038 where the image information is mapped into a bitmap image. The bitmap image is sent to the printing apparatus engine unit 1039 via the engine I/F 1040. The printing apparatus engine unit 1039 prints the supplied bitmap image on a transfer medium in the designated print mode. The transfer medium is discharged from a designated discharge port.

Processing in the image information generator 1037, color/monochrome mode setting unit 1060, printing execution unit 1061, and print mode decision unit 1062 will be explained in more detail.

Figure 12:
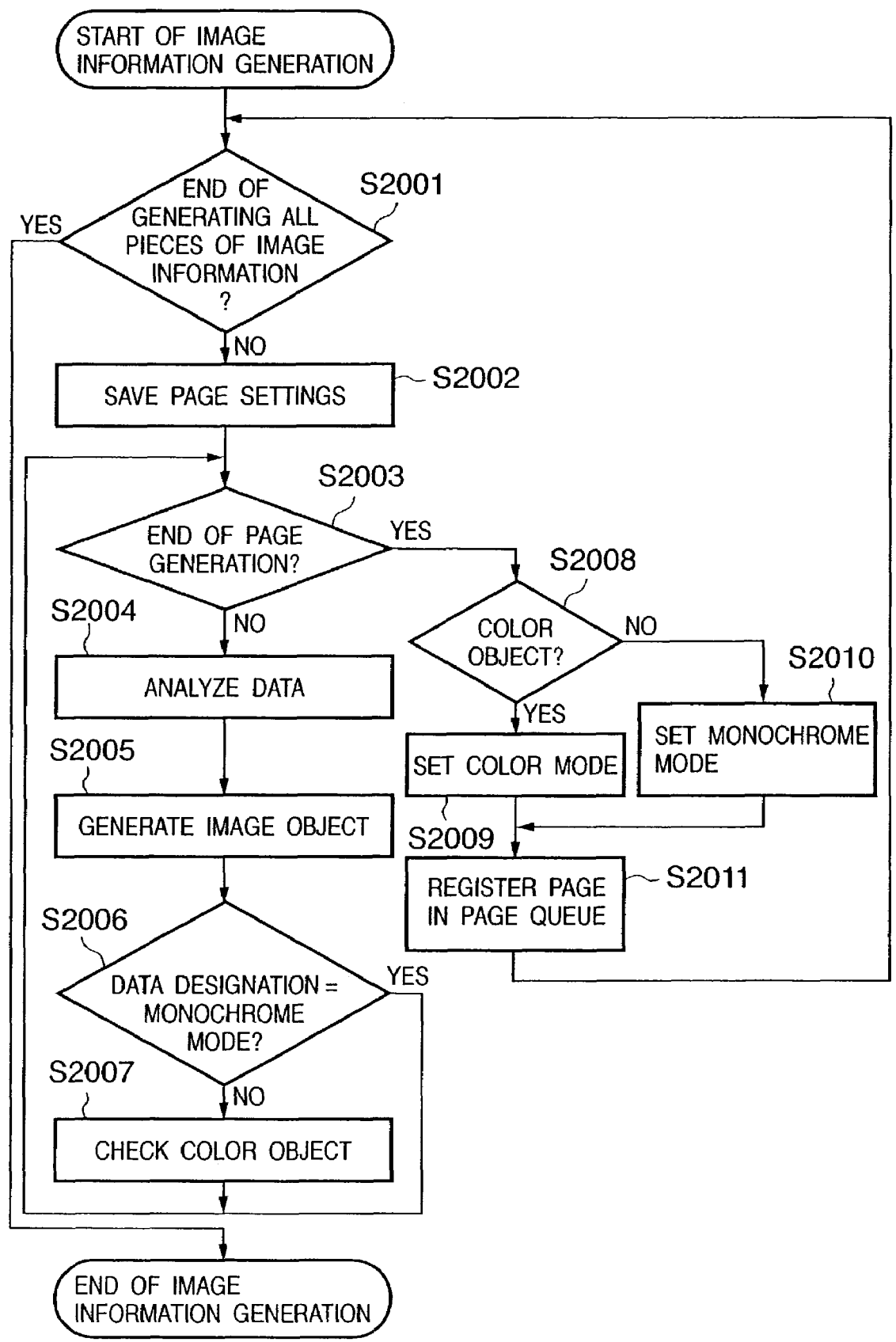
FIG. 12 is a flow chart showing processing steps in the image information generator and color/monochrome mode setting unit of the color laser beam printer according to the fifth embodiment.

FIG. 12 shows a processing flow in the image information generator 1037 and color/monochrome mode setting unit 1060. After data is received and the image information generator 1037 starts generating image information, whether pieces of image information of all pages have been generated is checked (step S2001). If pieces of image information of all pages have not been generated (NO in step S2001), pieces of setting information of each page such as the color mode, resolution, tone level, sheet size, and feed stage of a page designated from the panel or host computer are saved as attributes of a page to be generated (step S2002). Whether the page has been generated is then checked (step S2003). If the page has not been generated (NO in step S2003), data sent by PDL (Page Description Language) or the like is analyzed (step S2004), and an image object in the intermediate data format that designates a print position and shape is generated (step S2005).

Color/monochrome mode designation for data sent from the host computer 1001 is checked (step S2006). If the data designation does not represent the monochrome mode (NO in step S2006), whether the generated object contains color data is checked (step S2007). If the data designation represents the monochrome mode (YES in step S2006), the flow returns to step S2003. Processing from step S2004 to step S2007 is repeated till the end of page generation processing.

If the page has been generated (YES in step S2003), whether the page contains a color object is checked (step S2008). That is, the presence of an object determined in step S2007 to be a color object is checked.

If no object is determined in step S2007 to be a color object, or if the monochrome mode not subjected to the check in step S2007 is designated, the flow shifts from step S2008 to step S2010, and page information is set in the monochrome mode. To transfer control to the printing execution unit 1061, the page is registered in the page queue (step S2011). If a color object is determined in step S2008 to exist, the flow shifts to step S2009. In this case, since printing must be done in the color print mode, the printing apparatus engine unit 1039 is set in the color mode (step S2009), and the page is registered in the page queue (step S2011).

The above processing is repeated until all pieces of image information are generated (NO in step S2001). After processing shown in FIG. 12 ends, the color mode/monochrome mode representing whether to print in color or monochrome is set. Note that this mode setting is determined from image information.

Processing in the printing execution unit 1061 will be explained with reference to the flow chart of FIG. 13.

Whether a page whose image information has been generated exists is checked by referring to the page queue (step S4001). If no page exists in the page queue (NO in step S4001), the check in step S4001 is repeated until a page is generated. If a page exists in the page queue (YES in step S4001), a page to be printed next is selected from the page queue (step S4002), and the flow shifts to print mode decision/setting processing (step S4003). Processing in step S4003 is processing by the print mode decision unit 1062.

Figure 14:
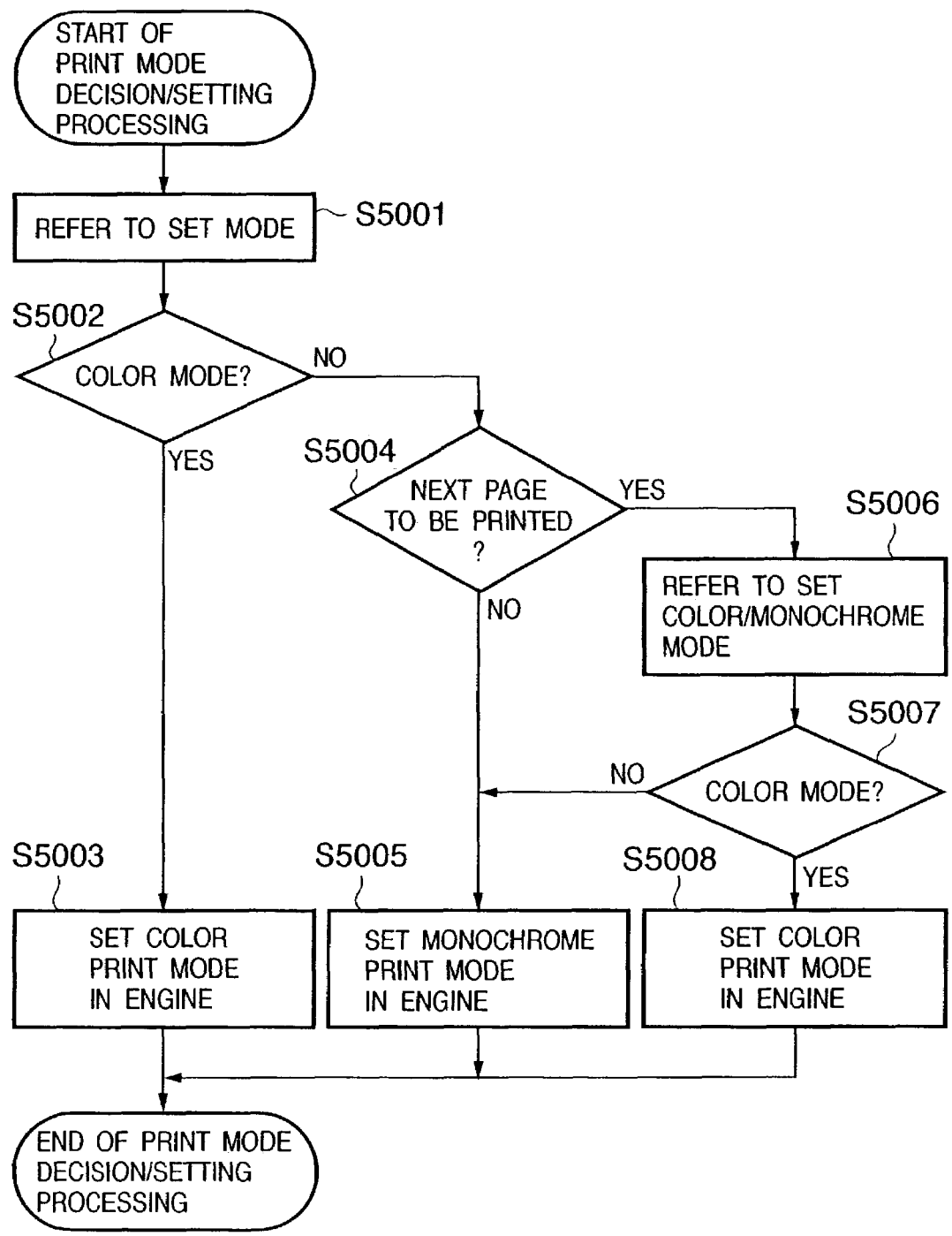
FIG. 14 is a flow chart showing processing steps in the print mode decision unit of the color laser beam printer according to the fifth embodiment.

Processing in the print mode decision unit 1062 will be described with reference to the flow chart of FIG. 14. The fifth embodiment adopts an algorithm of deciding a color or monochrome print mode by referring to information of one succeeding page which waits for the start of printing upon the completion of generating image information.

After print mode decision/setting processing starts, which of the color and monochrome modes has been set for a selected page in image information generation is referred to (step S5001). For the color mode (YES in step S5002), the page can only be printed in the color print mode. The color print mode is set in the engine unit 1039 via the engine I/F 1040 (step S5003), and print mode decision/setting processing ends.

For the monochrome mode (NO in step S5002), whether image information of a page next to the selected page has been generated is checked by referring to the page queue (step S5004). If no next page exists in the page queue (NO in step S5004), the monochrome print mode is set in the engine unit 1039 via the engine I/F 1040 (step S5005), and print mode decision/setting processing ends.

If the next page exists in the page queue (YES in step S5004), which of the color and monochrome modes has been set for the next page by the color/monochrome mode setting unit 1060 in image information generation is checked (step S5006). If the color mode has been set (YES in step S5007), the color print mode is set in the engine unit 1039 (step S5008), and print mode decision/setting processing ends. If the monochrome mode has been set (NO in step S5007), the monochrome print mode is set in the engine unit 1039 (step S5005), and print mode decision/setting processing ends.

Figure 13:
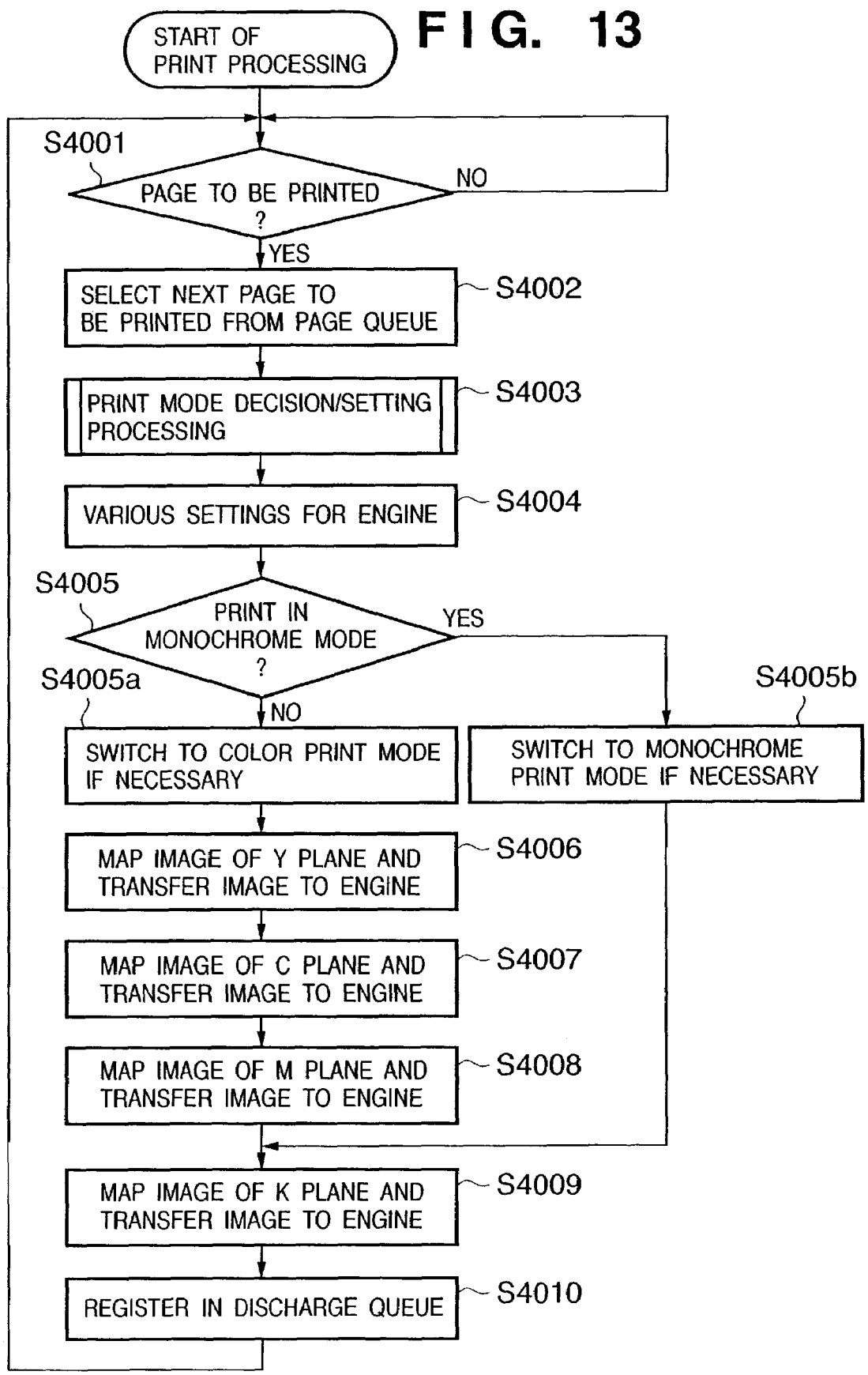
FIG. 13 is a flow chart showing processing steps in the printing execution unit of the color laser beam printer according to the fifth embodiment.

Referring back to processing in FIG. 13, various settings such as feed stage setting are performed in the engine unit 1039 (step S4004). If the color print mode is designated to perform printing in step S4003 (NO in step S4005), color images are mapped at Y, C, M, and K timings and transferred to the engine unit 1039 (steps S4006, S4007, S4008, and S4009). At this time, if an immediately preceding page is printed in the monochrome print mode, the print mode is switched to the color print mode (step S4005*a*).

If image information is monochrome, no Y, C, or M object exists, and no image is mapped/transferred at the Y, C, or M timing. Hence, if the monochrome print mode is designated to perform printing (YES in step S4005), only a monochrome image is mapped at the K timing and transferred to the engine unit 1039 (step S4009). At this time, if an immediately preceding page is printed in the color print mode, the print mode is switched to the monochrome print mode (step S4005*b*).

In order to monitor whether discharge is completed without any error, the page is registered in a discharge queue (step S4010). The flow then returns to processing starting from step S4001 in order to process the next page.

Although not shown, a predetermined time is required from steps S4006 to S4009 due to a timing at which an image is transferred to the engine. This results in a time interval before the timing in step S4003 for each page. The next page accumulated in the page queue is checked at the setting timing in step S4003.

Figure 15:
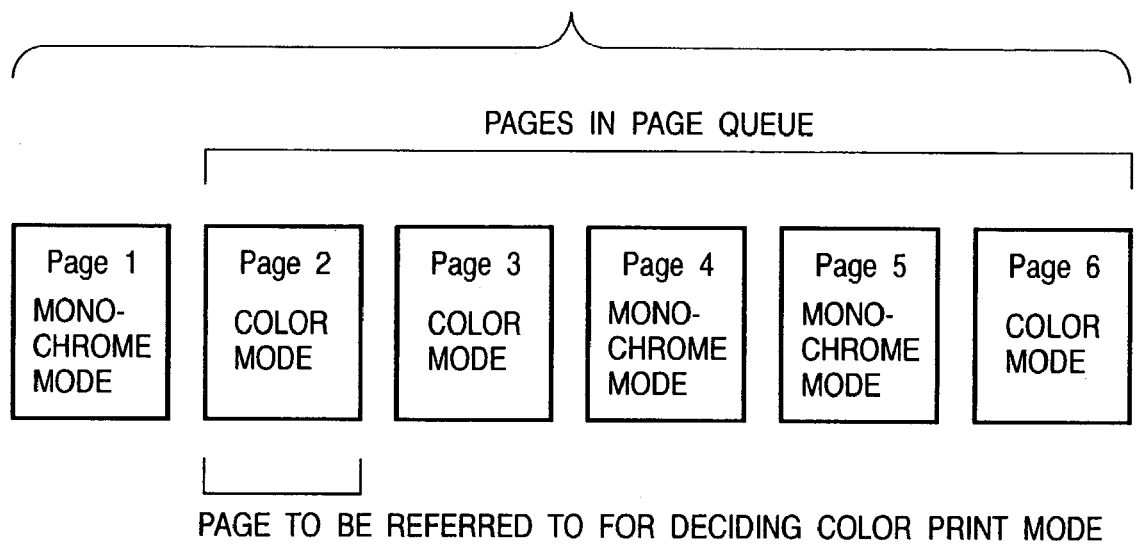
FIG. 15 is a view for explaining the operation of the print mode decision unit of the color laser beam printer according to the fifth embodiment.
Figure 16:
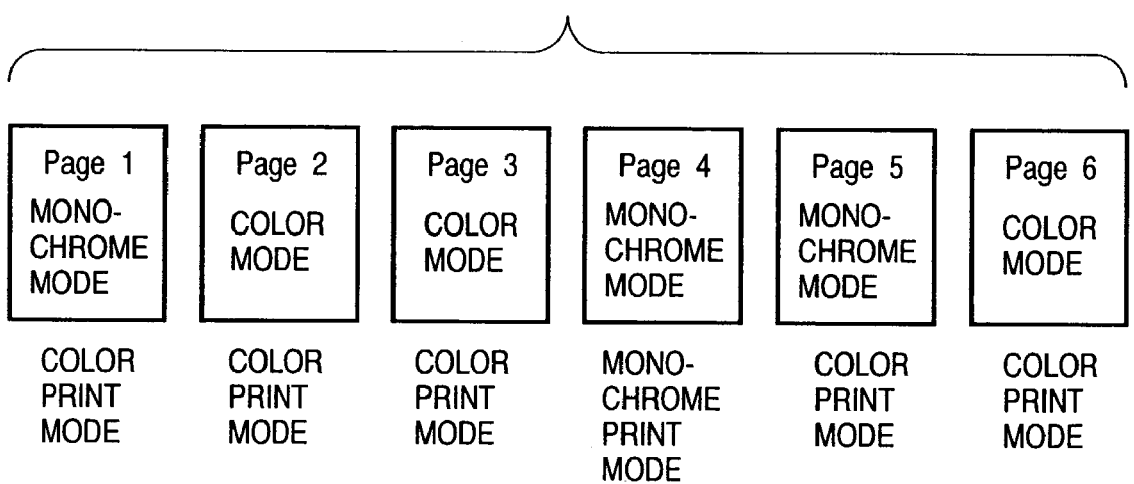
FIG. 16 is a view for explaining the operation of the print mode decision unit of the color laser beam printer according to the fifth embodiment.

A setting example of the print mode according to the fifth embodiment described above will be explained with reference to FIG. 15. In FIG. 15, each rectangle represents one page, and a mode decided by the color/monochrome mode setting unit 1060 upon generating each image information is described in each rectangle. At the start of printing Page 1, pieces of image information up to Page 6 have been generated and registered in the page queue, as shown in FIG. 15. In this case, the print mode decision unit 1062 designates the color print mode for Page 1 because the color mode is designated for the next page Page 2. As a result, respective pages are printed in print modes designated below page frames in FIG. 16. Upon the completion of discharge, pages are deleted from the discharge queue in accordance with an end notification for each page from the engine unit 1039. Print mode switching processing occurs between Page 4 and Page 5 in accordance with the above-described processing, as shown in FIG. 16.

If an error occurs, continuous driving of the scanner motor or maintenance of the fixing unit at a high temperature degrades components in a printing apparatus such as a laser printer. To prevent this, a specific time for continuous printing exists, and when, e.g., setting operation for the next page exceeds the specific time, the engine unit 1039 temporarily stops. This situation is, e.g., generation of an error such as jam or toner shortage. If image information generation takes a long time, page creation may delay, failing to execute printing before a continuous printing timing. Also in this case, the engine unit 1039 stops.

To cope with the stop of the engine unit, the printing apparatus according to the fifth embodiment monitors the completion of discharge, detects a page which has been output before the stop of the engine and a page which has not been output yet, and performs again processing from print mode setting for a page which has not been output yet. Processing in the discharge completion monitoring unit 1063 will be explained with reference to the flow chart of FIG. 21.

After discharge completion monitoring starts at the same time as power-on, the error state of the printer is checked (step S12001). If no error occurs (NO in step S12001), processing in step S12001 is repeated to monitor an error. Upon generation of an error such as the absence of any sheet on a selected feed stage, jam, toner shortage, the end of the service life of the drum, or a failure in discharge due to a discharge port full of sheets (YES in step S12001), whether pages remain in the discharge queue is checked (step S12002). Note that the case for YES in step S12001 includes not only generation of an error but also a case wherein page creation processing exceeds a specific time.

If pages remain in the discharge queue (YES in step S12002), pages registered in the discharge queue are read out and selected from a new one (step S12003), and set again in the page queue (step S12004). The flow returns to step S12002 to perform processing of returning all pages left in the discharge queue to the page queue. If no page remains in the discharge queue (NO in step S12002), print processing restarts (step S12005), and the flow returns to processing in step S12001 again. In this case, print processing interrupts during the course of step S4001 to S4010, and the engine unit 1039 temporarily stops. Thus, print processing restarts, a page left in the page queue is processed again, processing from step S4001 is executed, and print mode setting in step S4003 is also done again.

As described above, according to the fifth embodiment, frequent switching between the color and monochrome print modes can be prevented, and high throughput can be maintained by referring to image information of a succeeding page and determining a print mode. When the same print mode continues, a proper print mode is decided to perform printing, which can minimize degradation of each engine component.

If the engine unit 1039 temporarily stops due to an error, the print mode is set again. This can prevent unwanted print mode switching in page setting owing to printing in a previously set print mode when the engine unit temporarily stops in a state in which a page assigned the monochrome mode is set in the color print mode.

Sixth Embodiment

In the fifth embodiment, a page accumulated in the page queue is referred to regardless of the timing in order to decide the color print mode. It is also possible to calculate print mode decision limit time (limit time within which the print mode switching start timing does not influence the throughput) for switching between the color and monochrome print modes within the shortest time during continuous printing, and to decide a print mode after waiting for accumulation of a page in the page queue by the time.

The arrangement of a color laser beam printer and the operation of a printer controller according to the sixth embodiment are almost the same as those in the fifth embodiment except print mode decision/setting processing (step S4003) in FIG. 13.

Figure 17:
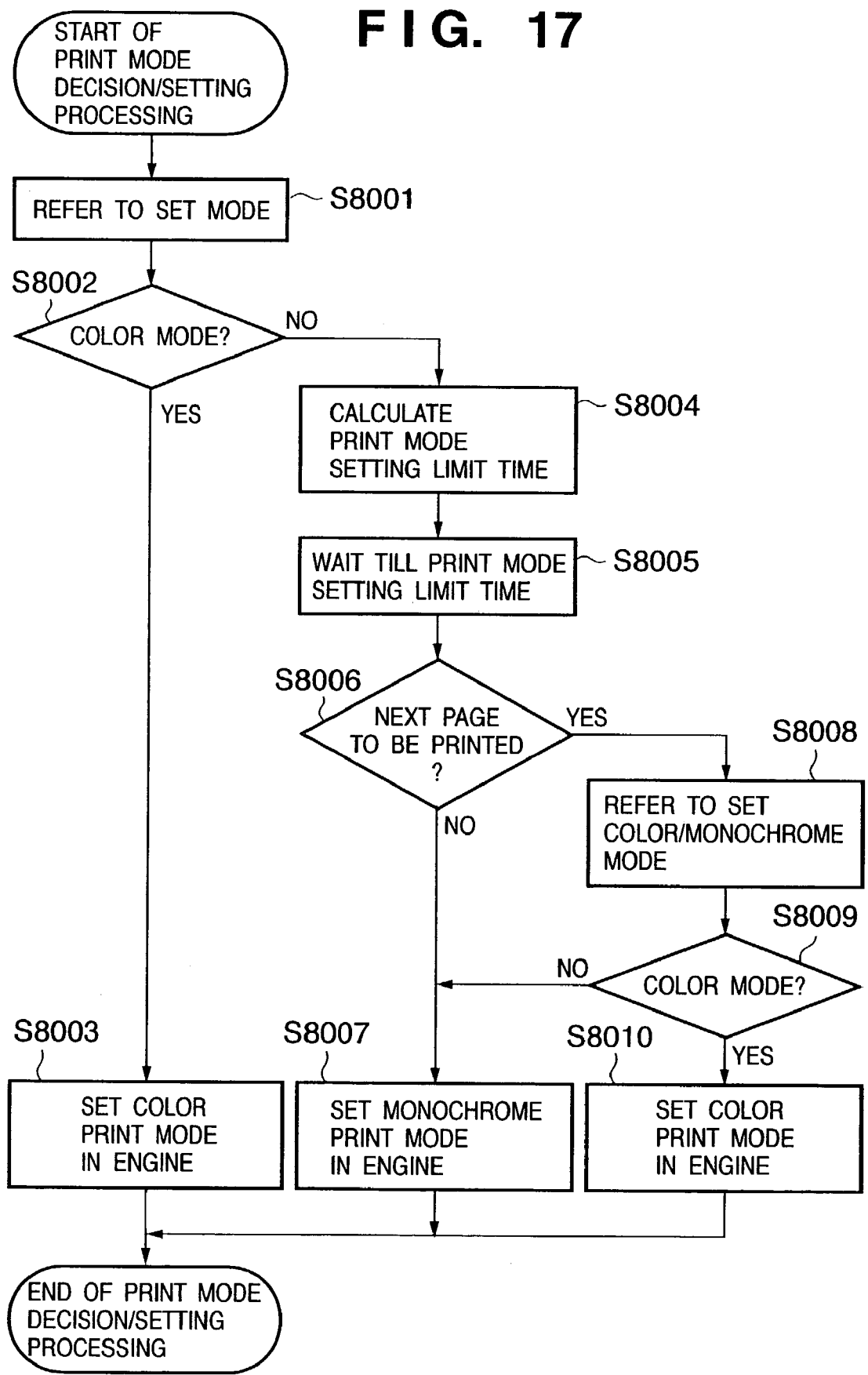
FIG. 17 is a flow chart showing processing steps in the print mode decision unit of a color laser beam printer according to the sixth embodiment.

The processing flow of a print mode decision unit 1062 according to the sixth embodiment will be described with reference to FIG. 17. The sixth embodiment also adopts an algorithm of deciding a color or monochrome print mode by referring to information of one succeeding page which waits for the start of printing upon the completion of generating image information.

After print mode decision/setting processing starts, which of the color and monochrome modes has been set for a selected page in image information generation is referred to (step S8001). For the color mode (YES in step S8002), the page can only be printed in the color print mode. The color print mode is set in an engine unit 1039 (step S8003), and print mode decision/setting processing ends.

For the monochrome mode (NO in step S8002), in order to calculate a print mode settable time, various pieces of information of the engine unit 1039 such as the feed timing of a sheet for a preceding page and the current operation state are acquired. A print mode settable limit time is calculated from the acquired information (step S8004). The flow waits till the limit time (step S8005). Whether image information of a page next to the selected page has been generated is checked by referring to the page queue (step S8006). In FIG. 17, the print mode settable limit time is calculated every time a page in the monochrome mode is detected. It is also possible to calculate the limit time only once and use the calculation result in subsequent processing. Alternatively, the limit time may be calculated depending on the time when the flow reaches processing in step S8004 or every time engine operation changes in accordance with the sheet size or the like.

If no next page exists (NO in step S8006), the monochrome print mode is set in the engine unit 1039 (step S8007), and print mode decision/setting processing ends. If the next page exists in the page queue (YES in step S8006), which of the color and monochrome modes has been set for the next page by a color/monochrome mode setting unit 1060 is checked (step S8008). If the color mode has been set (YES in step S8009), the color print mode is set in the engine unit 1039 (step S8010), and print mode decision/setting processing ends. If the monochrome mode has been set (NO in step S8009), the monochrome print mode is set in the engine unit 1039 (step S8007), and print mode decision/setting processing ends.

Referring back to processing in FIG. 13, the same processing as that in the fifth embodiment is performed. Switching from the color print mode to the monochrome print mode occurs only when switching is determined necessary. For designation before the print mode setting limit time, operation necessary for switching can be achieved within the shortest time. Image information of a subsequent page can be generated during the wait time. The sixth embodiment can cope with even data which takes a long time for processing a subsequent page.

As described above, according to the sixth embodiment, decision of the color mode waits till the print mode switching limit time for the image object of a succeeding page in which the print mode can be switched. The throughput can be more reliably maintained, and accurate print mode switching can be realized even if image information generation processing for a succeeding page takes a long time.

Seventh Embodiment

In the fifth embodiment, the color print mode is decided by referring to the color/monochrome mode of a succeeding page. The print mode can also be decided by referring to the print mode of a previously printed page and/or the color/monochrome mode. In the seventh embodiment, this print mode decision method will be described.

Also in the seventh embodiment, the arrangement of a color laser beam printer and the operation of a printer controller are almost the same as those in the fifth embodiment except print mode decision/setting processing in FIG. 13.

Figure 18:
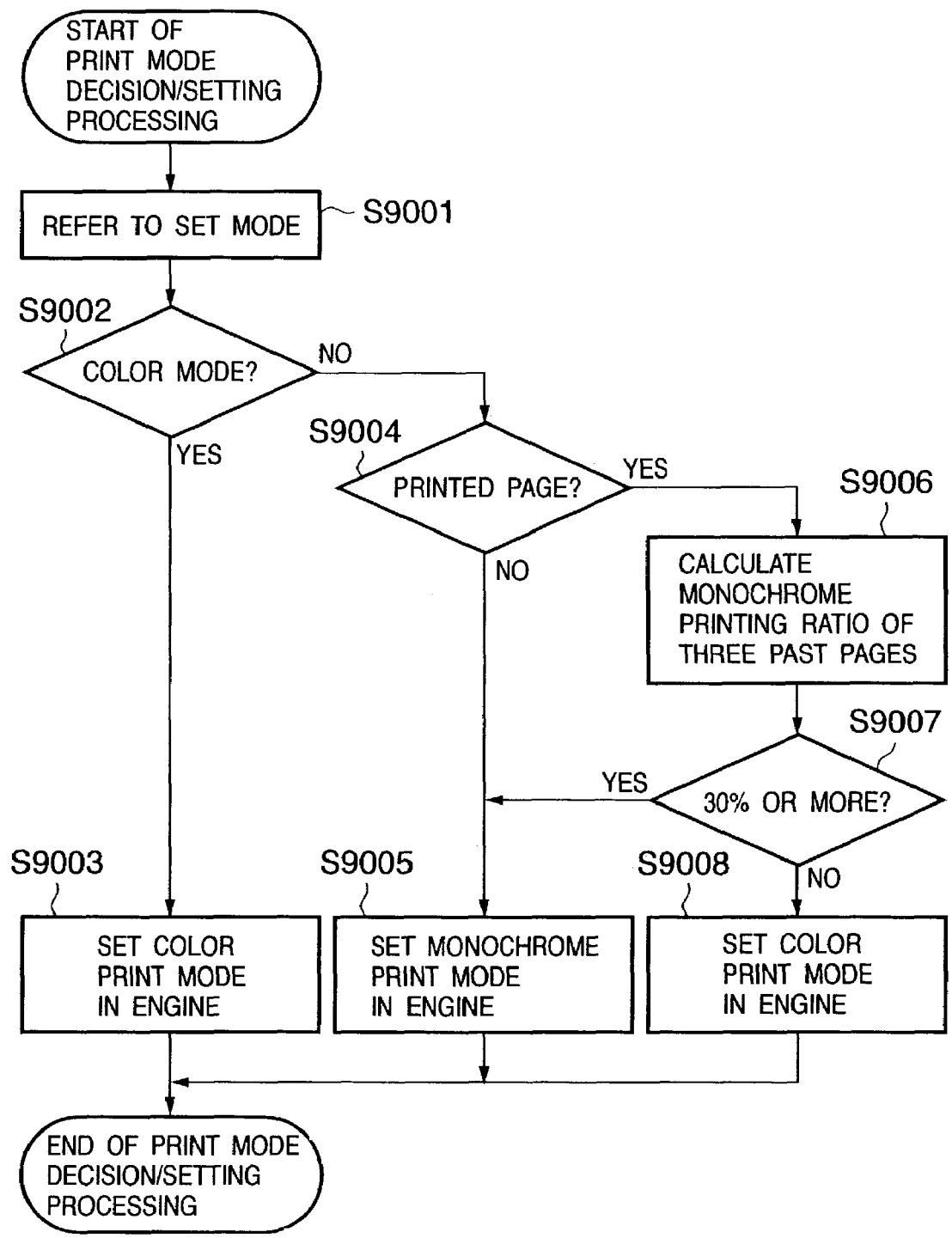
FIG. 18 is a flow chart showing processing steps in the print mode decision unit of a color laser beam printer according to the seventh embodiment.

FIG. 18 shows the processing flow of a print mode decision unit according to the seventh embodiment. The seventh embodiment employs an algorithm of calculating the ratio of the monochrome print mode of a page by referring to pieces of information of three preceding pages which have been printed or are being printed upon the completion of setting a print mode, and deciding a color or monochrome print mode by using the calculation result. In the following description, the print mode of a page is decided by referring to the print mode of a preceding page whose print process has been determined. Alternatively, a color/monochrome mode determined for a preceding page may be referred to, or a combination of a print mode and color/monochrome mode may be referred to.

After print mode decision/setting processing starts, which of the color and monochrome modes has been set for a selected page in image information generation is referred to (step S9001). For the color mode (YES in step S9002), the page can only be printed in the color print mode. The color print mode is set in an engine unit 1039 (step S9003), and print mode decision/setting processing ends.

For the monochrome mode (NO in step S9002), whether a page which has been printed or is being printed upon the completion of setting a print mode exists is checked (step S9004). If no such page exists (NO in step S9004), the monochrome print mode set in image information generation is set in the engine unit 1039 (step S9005), and print mode decision/setting processing ends.

If a page which has been printed exists in step S9004 (YES in step S9004), the ratio of the monochrome print mode is calculated by referring to the print modes of three pages (step S9006). If the ratio of the monochrome print mode is lower than, e.g., 30% (NO in step S9007), the color print mode is set in the engine unit 1039 (step S9008), and print mode decision/setting processing ends. If the ratio is equal to or higher than 30% (YES in step S9007), the monochrome print mode is set in the engine unit 1039 (step S9005), and print mode decision/setting processing ends.

Referring back to processing in FIG. 13, the same processing as that in the fifth embodiment is performed.

Figure 19:
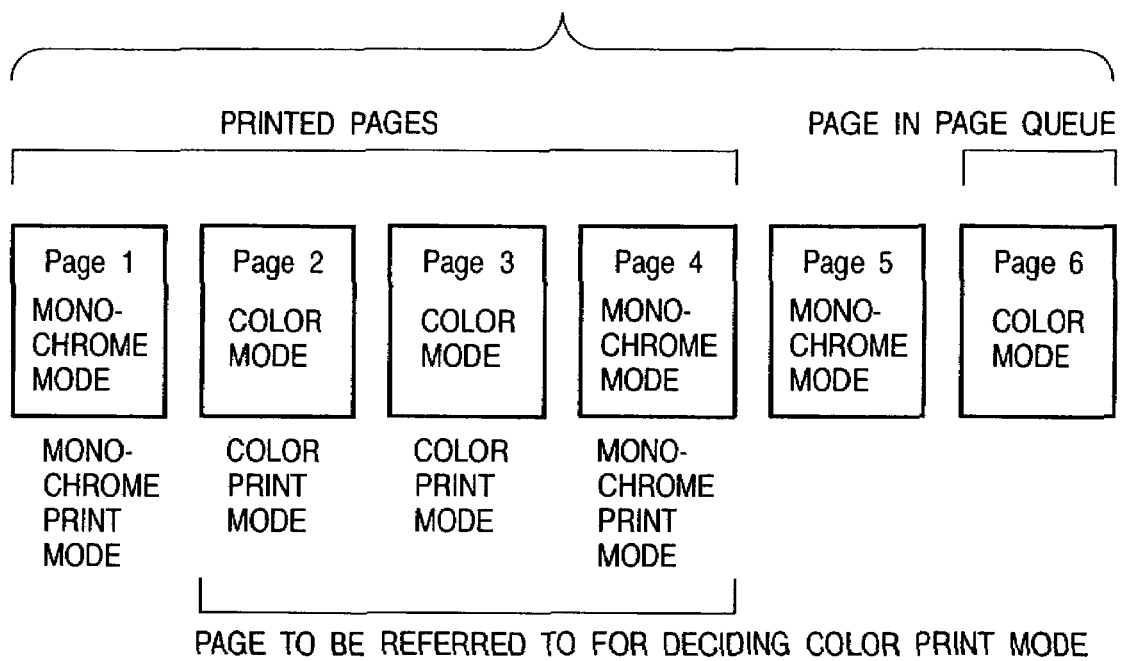
FIG. 19 is a view for explaining the operation of the print mode decision unit of the color laser beam printer according to the seventh embodiment.
Figure 20:
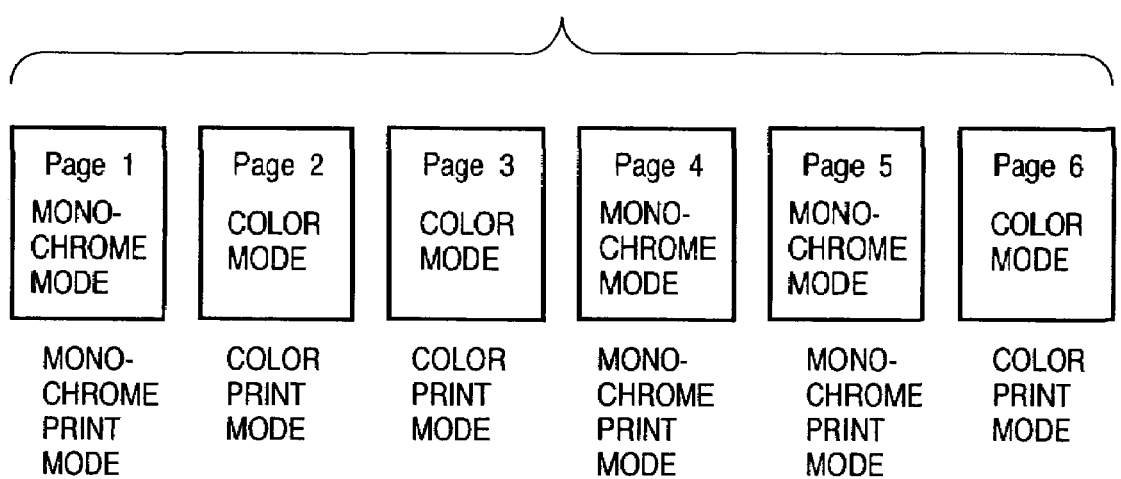
FIG. 20 is a view for explaining the operation of the print mode decision unit of the color laser beam printer according to the seventh embodiment.

Assume that the print modes of up to Page 4 have been set and these pages have been printed when deciding the print mode of Page 5 in FIG. 19. In FIG. 19, each rectangle represents one page, and a mode decided upon generating each image information is described within each frame. An actually decided print mode is described outside the frame.

Monochrome printing occupies ⅓ by referring to the print modes of three preceding pages Page 2, Page 3, and Page 4. The ratio is 30% or more, and the monochrome print mode is designated for Page 5. A print mode described below each page frame is designated for each page, and then the page is printed.

As described above, according to the seventh embodiment, the actual operation status of the engine unit 1039 can be obtained by referring to printed pages. A mode for use can be predicted from the use status of the printing apparatus, and frequency switching can be prevented such that a print mode used many times is set as much as possible.

The use of the ratio of the monochrome and color print modes can realize fine setting such that the switching criterion quantitatively takes numerical form and switching is so set as to be performed at a proper ratio in consideration of the degree of wear and the influence of switching in terms of the characteristics of the engine unit 1039 by pretest before shipping a product.

The seventh embodiment uses information on the print modes of three preceding pages. Alternatively, information after cartridge exchange or the first power-on operation may be held and exploited.

In the seventh embodiment, the print mode is referred to. Alternatively, the print mode of a target page may be decided by referring to the ratio of the color and monochrome modes of preceding pages. The print mode of a target page may be decided by referring to a combination of the ratio of the print modes of preceding pages and the ratio of the color and monochrome modes.

In the seventh embodiment, the ratio of the print mode is applied to a printed page. Also, a future printing status can be predicted by applying the ratio of the print mode to the color/monochrome mode of a page accumulated in the page queue.

As described above, according to the seventh embodiment, an actual engine operation state can be obtained by referring to a printed page. A mode for use can be predicted from the use status of the printing apparatus, and frequent switching can be prevented such that a print mode used many times is set as much as possible.

The use of the ratio of the monochrome and color print modes can realize fine setting such that the switching criterion quantitatively takes numerical form and its value is calculated from engine characteristics and the like.

Eighth Embodiment

In the fifth embodiment, the print mode of a current page is decided by referring to the color/monochrome mode of a succeeding page. The print mode of a succeeding page may be decided at the same time as the print mode of the current page. In the eighth embodiment, this method will be described.

Also in the eighth embodiment, the arrangement of a color laser beam printer and the operation of a printer controller are almost the same as those in the fifth embodiment except print mode decision/setting processing in FIG. 13.

Figure 22:
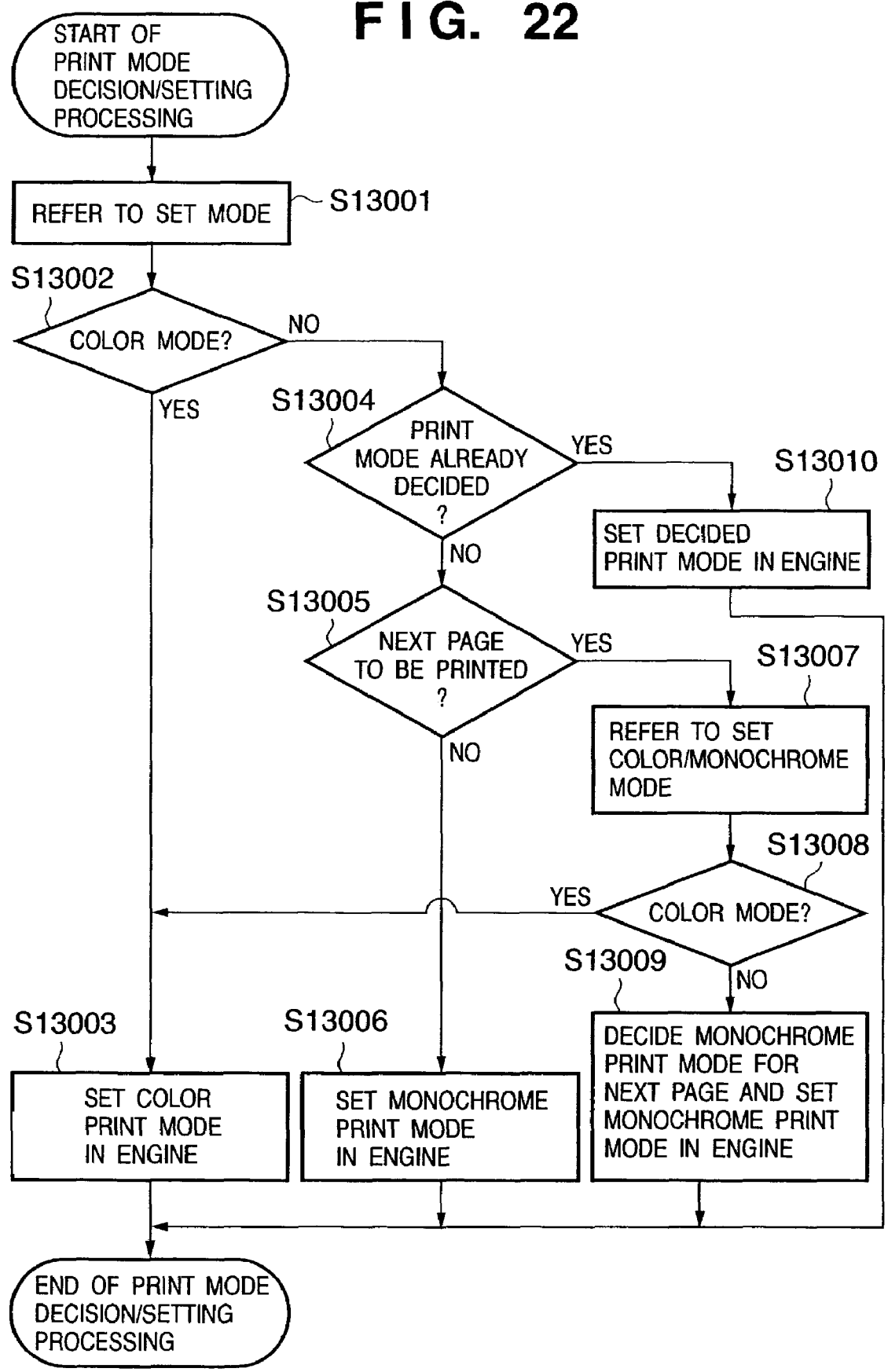
FIG. 22 is a flow chart showing processing steps in the print mode decision unit of a color laser beam printer according to the eighth embodiment.

FIG. 22 shows the processing flow of a print mode decision unit according to the eighth embodiment. Similar to the fifth embodiment, the eighth embodiment employs an algorithm of deciding a color or monochrome print mode by referring to information of one succeeding page which waits for the start of printing upon the completion of generating image information. An algorithm of deciding a print mode in advance in accordance with the situation is also applied to the referred page.

After print mode decision/setting processing starts, which of the color and monochrome modes has been set for a selected page in image information generation is referred to (step S13001). If the color mode has been set (YES in step S13002), the page can only be printed in the color print mode. The color print mode is set in an engine unit 1039 (step S13003), and print mode decision/setting processing ends.

For the monochrome mode (NO in step S13002), whether the print mode of the selected page has been decided is checked (step S13004). If the print mode has been decided (YES in step S13004), the set print mode is set in the engine unit 1039 (step S13010). If the print mode of the selected page has not been decided (NO in step S13004), whether image information of a page next to the selected page has been generated is checked by referring to the page queue (step S13005).

If image information of the next page has not been generated (NO in step S13005), the monochrome print mode set in image information generation is directly set in the engine unit 1039 (step S13006), and print mode decision/setting processing ends. If image information of the next page exists (YES in step S13005), which of the color and monochrome modes has been set for the next page is checked (step S13007). If the color mode has been set for the next page (YES in step S13008), the color print mode is set in the engine unit 1039 (step S13003), and print mode decision/setting processing ends. If the monochrome mode has been set (NO in step S13008), the monochrome print mode is decided as the print mode of the next page, and also set as the print mode of the current page in the engine unit 1039 (step S13009). Print mode decision/setting processing then ends.

Figure 23:
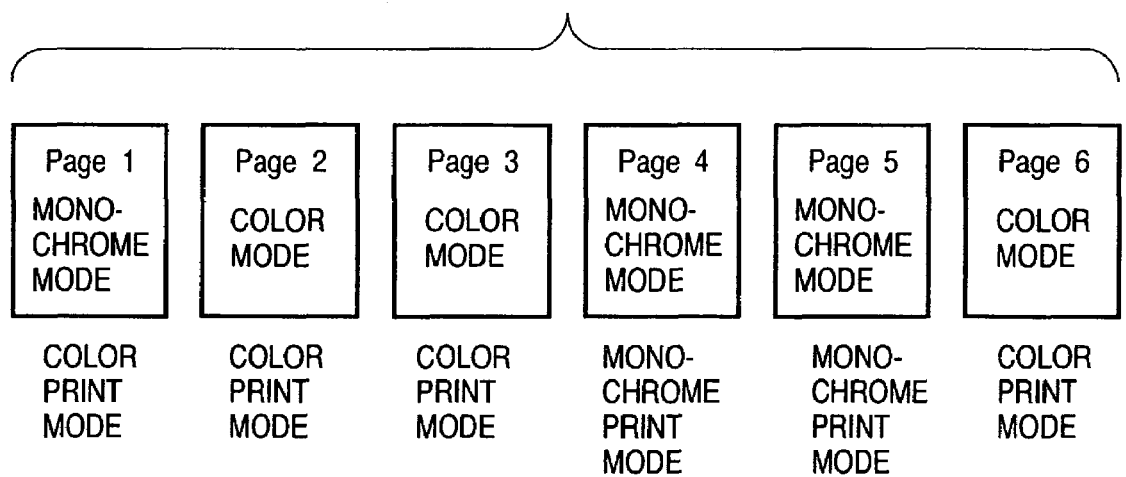
FIG. 23 is a view for explaining the operation of the print mode decision unit of the color laser beam printer according to the eighth embodiment.

Similar to the fifth embodiment, assume that the pieces of image information of up to Page 6 have been generated in the page queue in printing Page 1, as shown in FIG. 15. Since the color mode is designated for the next page Page 2, the color print mode is also designated for Page 1. When the monochrome print mode is decided for Page 4, the monochrome print mode is also decided as the print mode of the next page Page 5. Hence, the print mode of each page is decided as shown below each page frame in FIG. 23, and the page is printed.

As described above, the next print mode is permanently decided from a predetermined combination of the print mode setting of a current page and the color/monochrome mode of a succeeding page. Finer print mode designation according to the combination can be achieved.

Ninth Embodiment

In the fifth embodiment, the color print mode is decided by referring to the color/monochrome mode of a succeeding page. The print mode can also be decided by referring to the print mode of a previously printed page when image information of a succeeding page is not generated. The ninth embodiment adopts this method.

Also in the ninth embodiment, the arrangement of a color laser beam printer and the operation of a printer controller are almost the same as those in the fifth embodiment except print mode decision/setting processing in FIG. 13.

Figure 24:
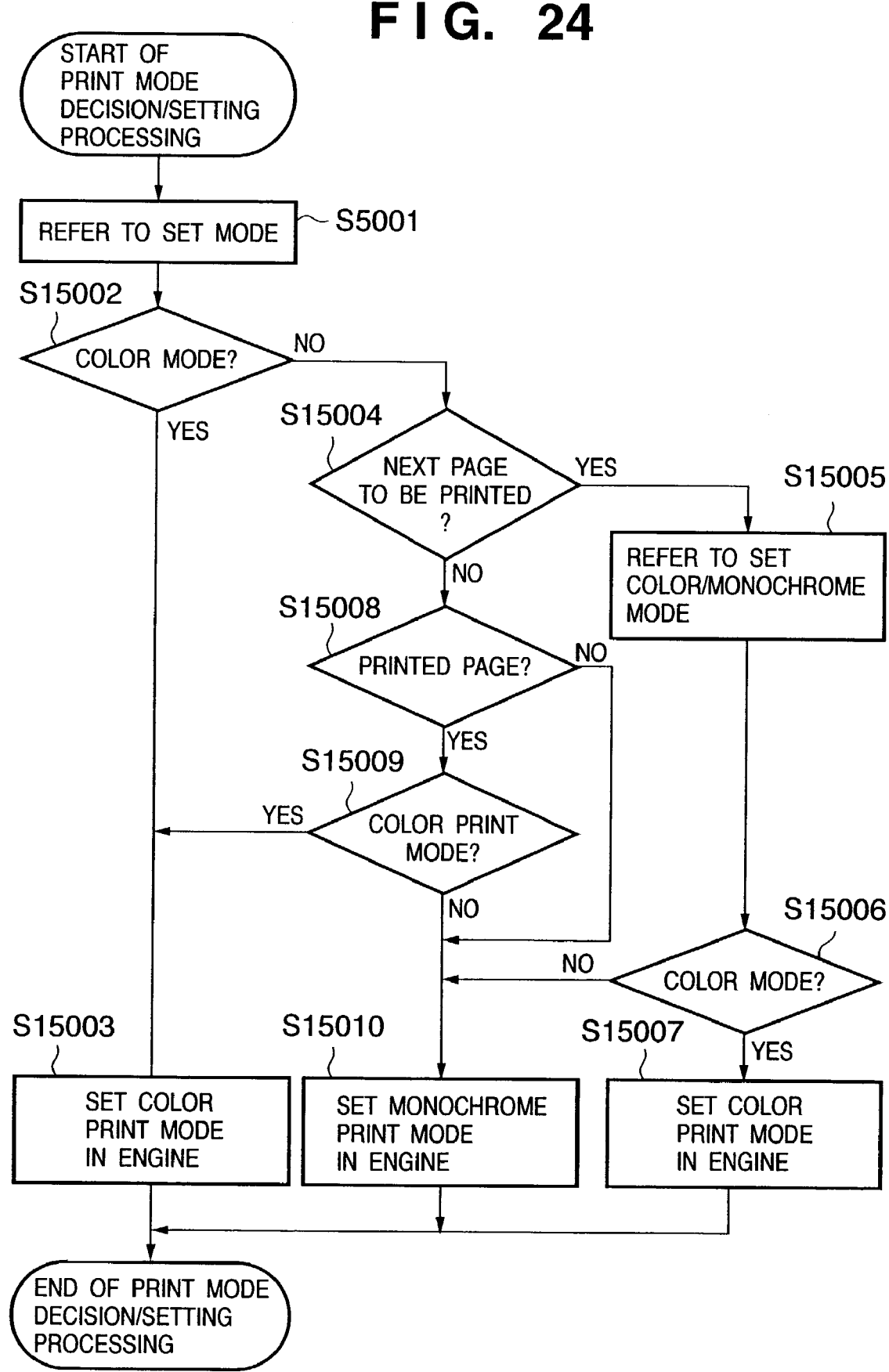
FIG. 24 is a flow chart showing processing steps in the print mode decision unit of a color laser beam printer according to the ninth embodiment.

FIG. 24 shows the processing flow of a print mode decision unit according to the ninth embodiment. Similar to the fifth embodiment, the ninth embodiment adopts an algorithm of deciding a color or monochrome print mode by referring to information of one succeeding page which waits for the start of printing upon the completion of generating image information. Further, an algorithm of deciding a print mode by referring to the print mode of a previously printed page is applied to a case wherein image information of a succeeding page has not been generated.

After print mode decision/setting processing starts, which of the color and monochrome modes has been set for a selected page in image information generation is referred to (step S15001). If the color mode has been set (YES in step S15002), the page can only be printed in the color print mode. The color print mode is set in an engine unit 1039 (step S15003), and print mode decision/setting processing ends.

For the monochrome mode (NO in step S15002), whether image information of a page next to the selected page has been generated is checked by referring to the page queue (step S15004). If image information of the next page exists (YES in step S15004), which of the color and monochrome modes has been set for the next page is checked (step S15005). For the color mode (YES in step S15006), the color print mode is set in the engine unit 1039 (step S15007), and print mode decision/setting processing ends. For the monochrome mode, the monochrome print mode set in image information generation is set in the engine unit 1039 (step S15010), and print mode decision/setting processing ends.

If no next page exists (NO in step S15004), the setting of the print mode ends, and whether a page which has been printed or is being printed exists is checked (step S15008). If no such page exists (NO in step S15008), the monochrome print mode set in image information generation is set in the engine unit 1039 (step S15010), and print mode decision/setting processing ends. If such a page exists (YES in step S15008), whether the print mode of one preceding page is the color print mode is checked (step S15009). For the color print mode (YES in step S15009), the color print mode is set in the engine unit 1039 (step S15003), and print mode decision/setting processing ends. For the monochrome print mode (NO in step S15009), the monochrome print mode is set in the engine unit 1039 (step S15010), and print mode decision/setting processing ends.

According to the ninth embodiment, when image information of a succeeding page is not generated, information of the succeeding page and information of a previously printed page are combined by referring to the print mode of the previously printed page. Even if the final page is monochrome, it can be printed without switching the print mode. Printing can be done without decreasing the throughput.

10th Embodiment

In the ninth embodiment, the color print mode is decided by referring to the color/monochrome mode of a succeeding page. Further, the print mode is decided in accordance with the situation by simultaneously referring to the print mode of a printed page. It is also possible to set a print mode switching pattern in advance and designate a print mode in accordance with the pattern. In the 10th embodiment, this method will be described.

The arrangement of a color laser beam printer and the operation of a printer controller according to the 10th embodiment are almost the same as those in the ninth embodiment except print mode decision/setting processing in FIG. 24.

Figure 25:
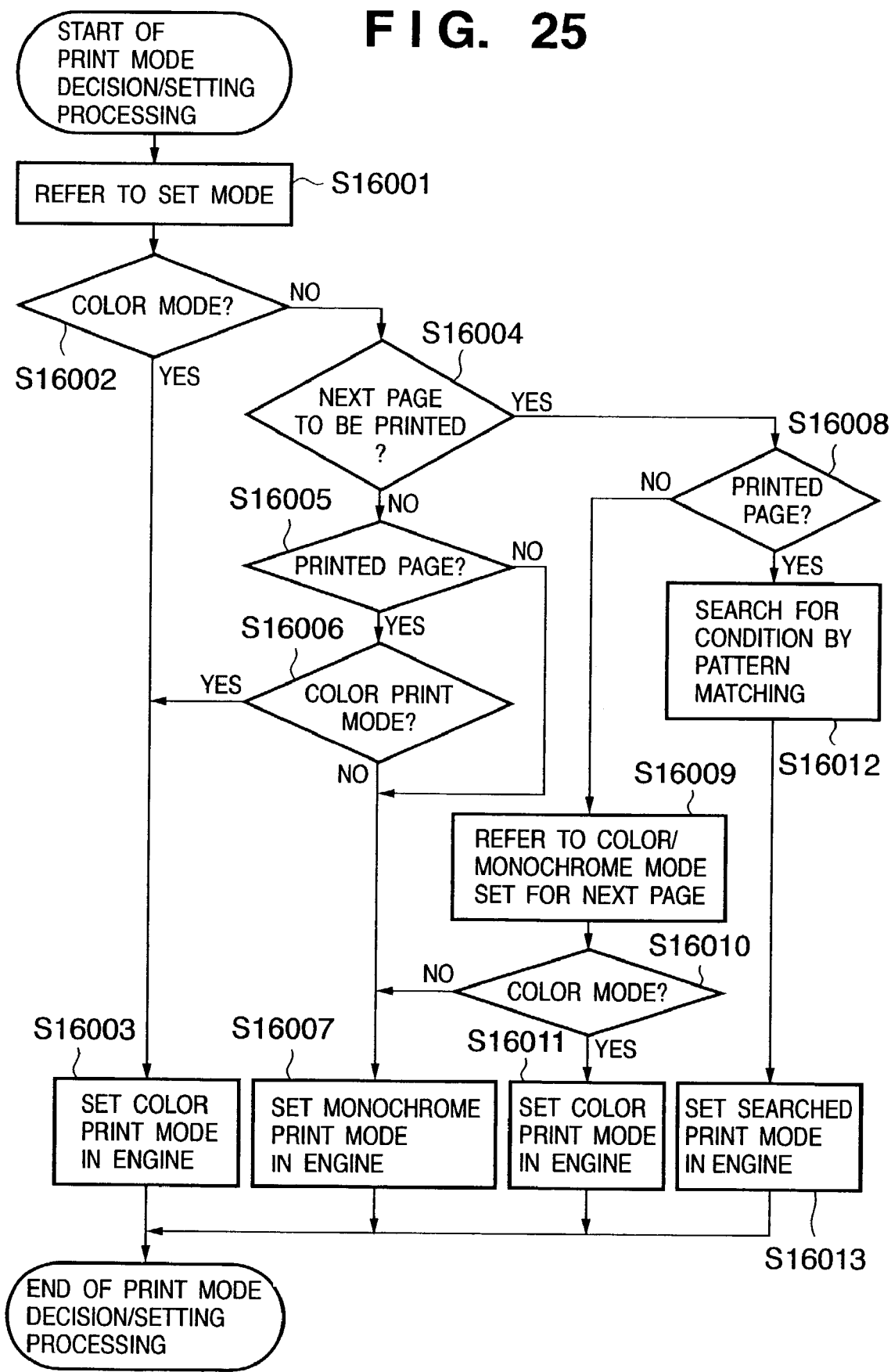
FIG. 25 is a flow chart showing processing steps in the print mode decision unit of a color laser beam printer according to the 10th embodiment.

FIG. 25 shows the processing flow of a print mode decision unit according to the 10th embodiment. In addition to the algorithm of the ninth embodiment, the 10th embodiment adopts an algorithm of setting a pattern in advance and deciding a print mode in accordance with the print mode setting pattern in the presence of a previously printed page and a succeeding page which waits for the start of printing upon the completion of generating image information.

After print mode decision/setting processing starts, which of the color and monochrome modes has been set for a selected page in image information generation is checked (step S16001). For the color mode (YES in step S16002), the page can only be printed in the color print mode. The color print mode is set in an engine unit 1039 (step S16003), and print mode decision/setting processing ends.

For the monochrome mode (NO in step S16002), whether image information of a page next to the selected page has been generated is checked by referring to the page queue (step S16004). If image information of the next page does not exist (NO in step S16004), whether a page which has been printed or is being printed upon the completion of setting a print mode exists is checked (step S16005). If no such page exists (NO in step S16005), the monochrome print mode set in image information generation is set in the engine unit 1039 (step S16007), and print mode decision/setting processing ends.

If a page which precedes the target page and completes print mode setting exists (YES in step S16005), whether the print mode used to print one preceding page is the color print mode is checked (step S16006). For the color print mode (YES in step S16006), the color print mode is set in the engine unit 1039 (step S16003), and print mode decision/setting processing ends. For the monochrome mode (NO in step S16006), the monochrome print mode is set in the engine unit 1039 (step S16007), and print mode decision/setting processing ends.

In step S16004, whether image information of the next page has been generated is checked by referring to the page queue. If image information is determined to have been generated (YES in step S16004), whether a page which has been printed or is being printed upon the completion of setting a print mode exists is checked (step S16008). If no such page exists (NO in step S16008), which of the color and monochrome modes has been set for the next page is checked (step S16010). If the color mode has been set (YES in step S16010), the color print mode is set in the engine unit 1039 (step S16011), and print mode decision/setting processing ends. If the color mode has not been set (NO in step S16010), the monochrome print mode is set in the engine unit 1039 (step S16007), and print mode decision/setting processing ends.

Figure 26:
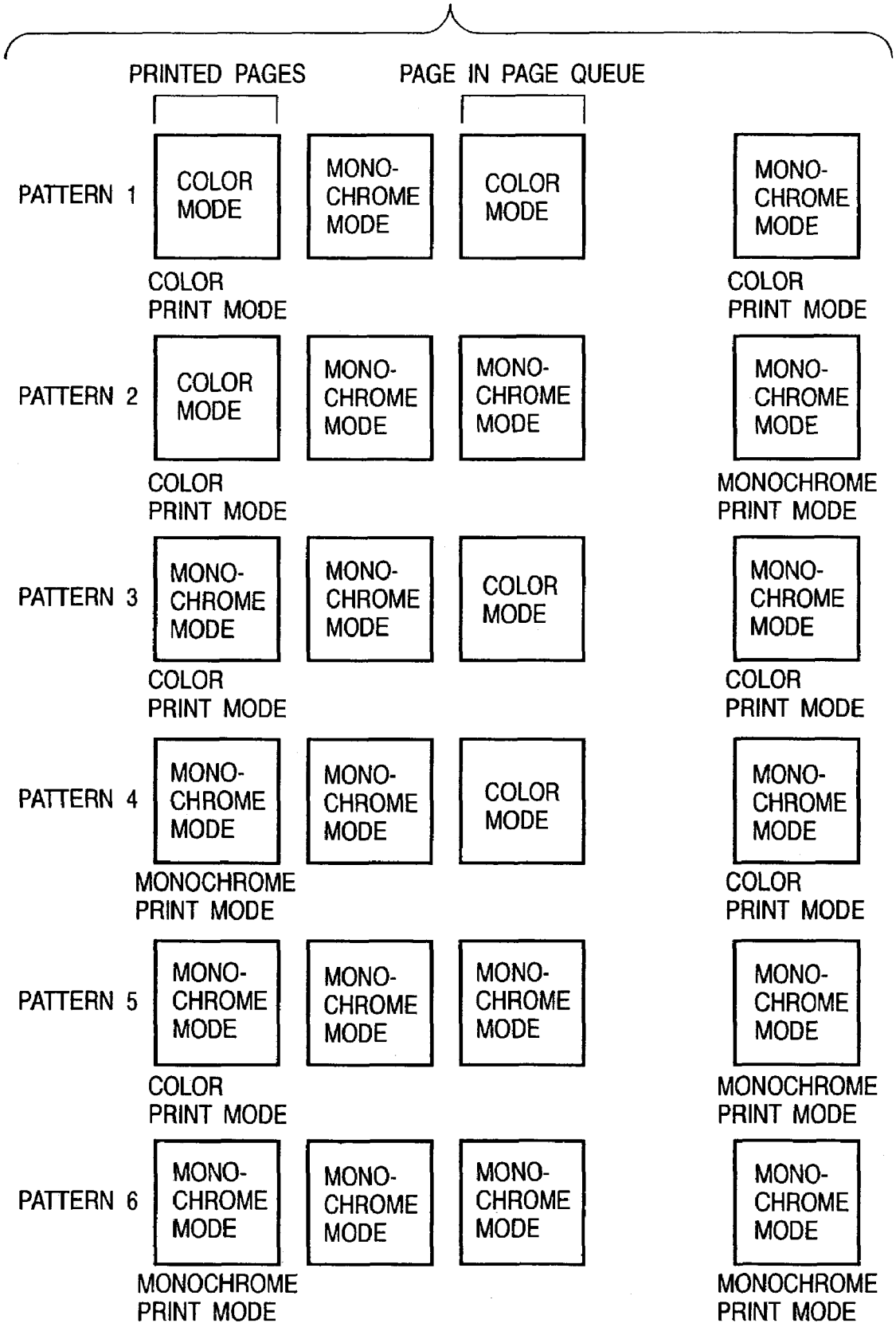
FIG. 26 is a view for explaining pattern matching operation of the print mode decision unit of the color laser beam printer according to the 10th embodiment.

If the printed page exists in step S16008, designation of a color/monochrome mode for one subsequent page, the print mode of one preceding printed page, and a color/monochrome mode determined for original image information as shown in FIG. 26 are referred to. Patterns are searched for the same pattern (step S16012), the print mode is set in the engine unit 1039 in accordance with the result (right designation in FIG. 26), and print mode decision/setting processing ends.

According to the 10th embodiment, an assumed print mode switching pattern is set in advance, and the print mode is designated in accordance with the pattern. The degree of wear and the influence of switching are examined in accordance with the switching pattern in terms of the characteristics of the engine unit 1039 before shipping a product. Settings are embedded every pattern so as to appropriately switch the print mode, realizing finer setting.

The control according to the fifth to 10th embodiments enables setting which puts importance on the throughput, setting which suppresses the wear of expendables, and flexible setting which balances them, achieving finer print mode designation. For example, by referring to the past print mode in the seventh embodiment, print mode setting can be dynamically changed. In the eighth embodiment, the print mode of a succeeding page can also be decided at the same time as that of the current page. The 10th embodiment can cope with various combinations by patterning combinations of print modes, and color and monochrome modes. Further, finer flexible print mode designation can be performed by pattern matching during printing with a combination.

The system may be so constituted as to allow the user to perform setting/registration of the ratio value and the number of past pages to be referred to in the seventh embodiment, setting/registration of a combination pattern used to decide the print mode of the next pattern in the ninth embodiment, and setting/registration of a switching pattern or the like in the 10th embodiment.

Figure 21:
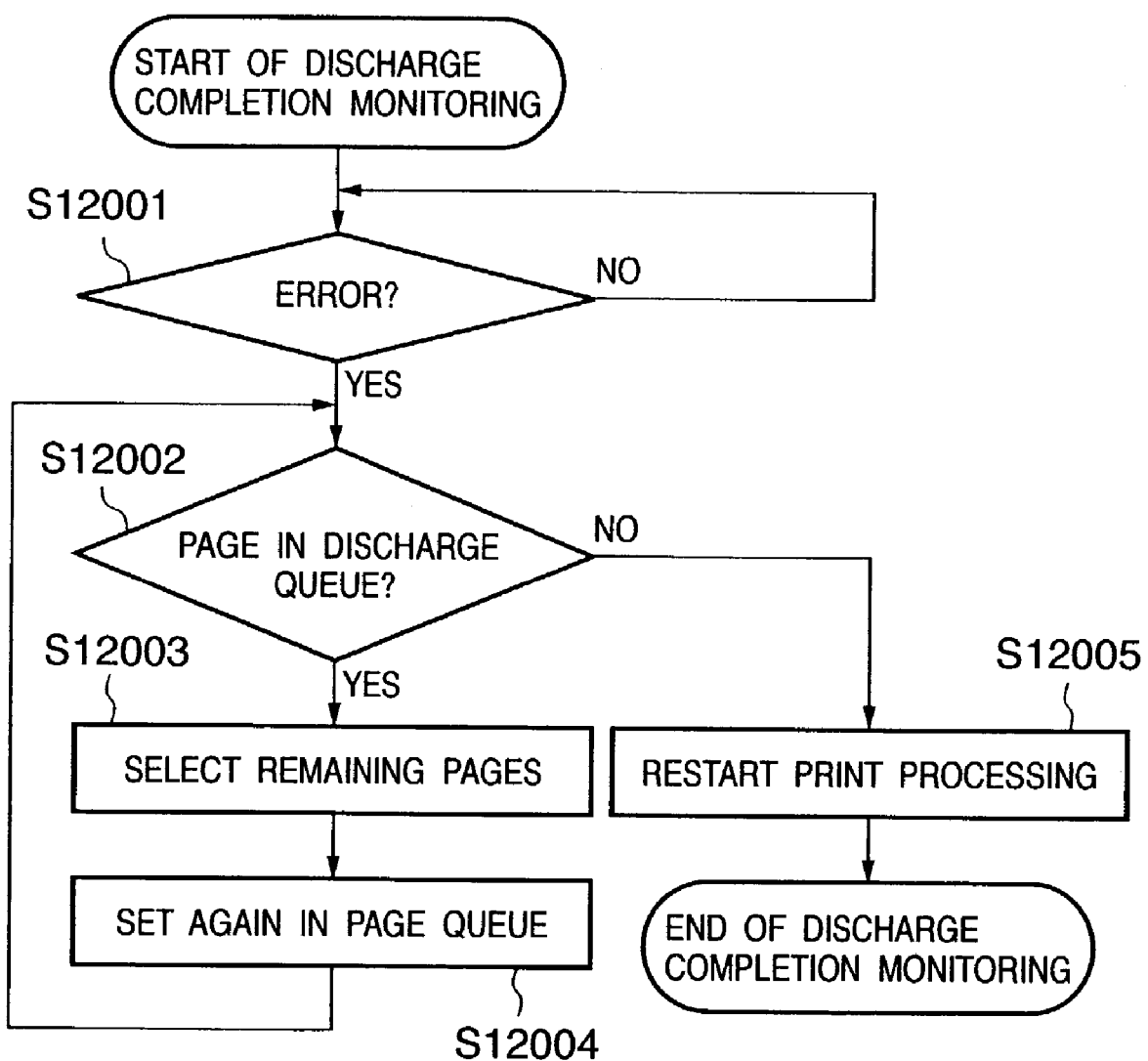
FIG. 21 is a flow chart for explaining the operation of the discharge completion monitoring unit of the color laser beam printer according to the fifth embodiment.

It is apparent that discharge completion monitoring processing described in the fifth embodiment with reference to FIG. 21 can be applied to each of the sixth to 10th embodiments. Unwanted switching can be advantageously suppressed by preventing continuous use of a print mode set for a page during printing even upon engine-off.

As described above, the present invention realizes print mode switching processing which satisfies both the service life of a unit and the throughput of print processing.

11th Embodiment

Figure 27:
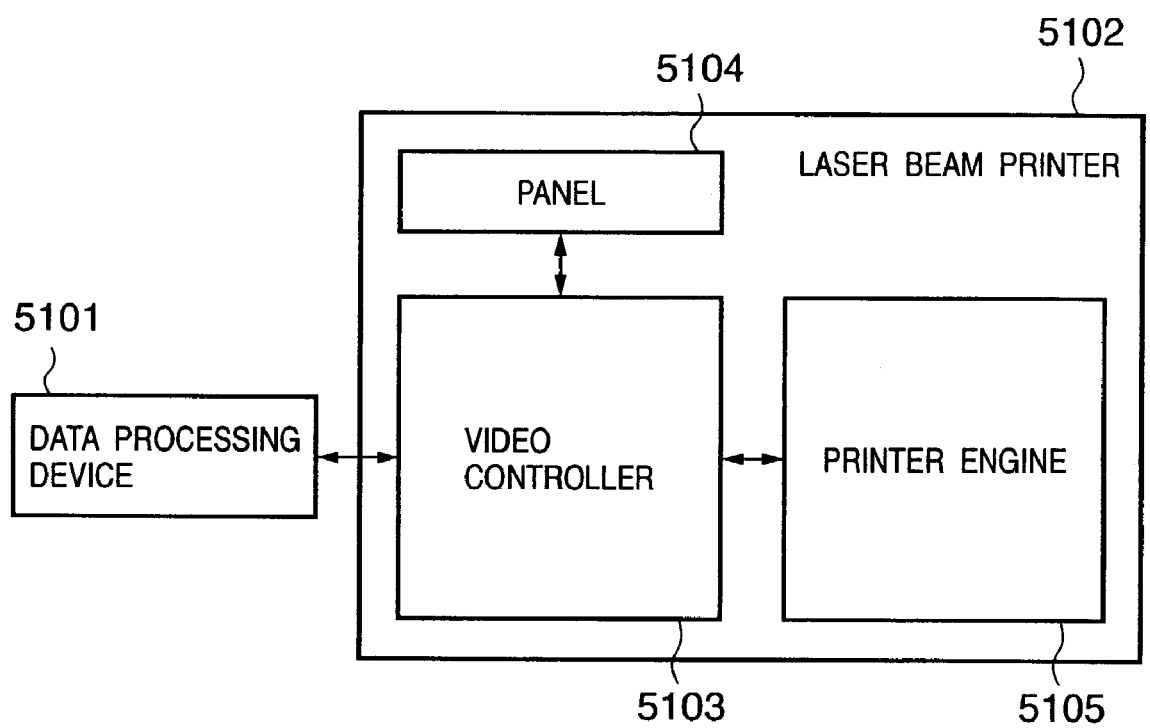
FIG. 27 is a block diagram showing the schematic configuration of an image printing system to which a printer according to the 11th embodiment of the present invention can be applied.

FIG. 27 is a block diagram showing the schematic configuration of an image printing system to which a printer according to the 11th embodiment of the present invention can be applied.

In FIG. 27, a data processing device 5101 is constituted by, e.g., a computer, and functions as an image information supply source or printer control device. In the 11th embodiment, a laser beam printer (printer) is used as a printer 5102. The printer applied in the 11th embodiment is not limited to the laser beam printer, and may be another printing type printer such as an inkjet printer.

A video controller 5103 generates raster data for each page on the basis of image information (e.g., ESC code or page description language) supplied from the data processing device 5101. The video controller 5103 sends the raster data to a printer engine 5105.

The printer engine 5105 forms a latent image on a photosensitive drum on the basis of the raster data supplied from the video controller 5103. The latent image is transferred and fixed (electrophotography) on a print medium, thereby printing the image.

A panel 5104 is used as a user interface. The user operates the panel 5104 to designate a desired operation. The panel 5104 displays the processing contents of the printer 5102 and a warning content to the user.

Figure 28:
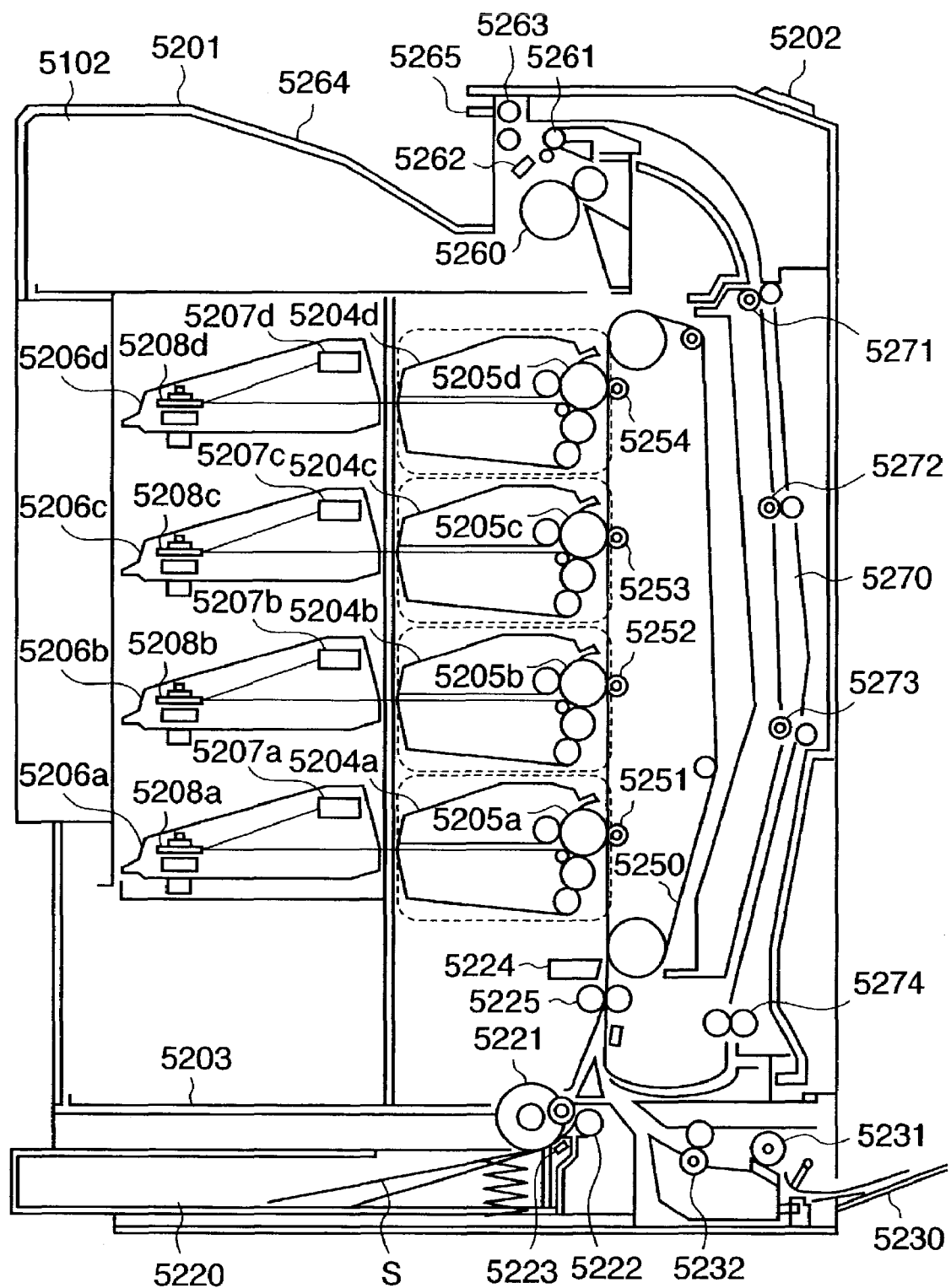
FIG. 28 is a schematic sectional view showing an example of the printer shown in FIG. 27.

FIG. 28 is a schematic sectional view showing an example of the printer shown in FIG. 27. FIG. 28 corresponds to, e.g., a tandem color printer.

In FIG. 28, reference numeral 5201 denotes a printer housing; and 5202, an operation panel on which switches for allowing the user to give various instructions, an LED display or LCD display for displaying messages, printer setting contents, and the like are arranged. The operation panel 5202 is an example of the panel 5104 shown in FIG. 27.

Reference numeral 5203 denotes a board storage unit which stores a board constituting the electronic circuit portions of the video controller 5103 and printer engine 5105; and 5220, a sheet cassette which holds sheets (print media) S and has a mechanism of electrically detecting a sheet size by a partition (not shown).

Reference numeral 5221 denotes a cassette clutch having a cam which picks up one uppermost sheet from the sheets S stacked in the sheet cassette 5220 and conveying the picked sheet S to a feed roller 5222 by a driving force transmitted from a driving means (not shown). This cam intermittently rotates every feed, and feeds one sheet S in correspondence with one rotation. Reference numeral 5223 denotes a sheet sensor which detects the number of sheets S held in the sheet cassette 5220.

The feed roller 5222 conveys the leading end of the sheet S to a registration shutter 5224. The registration shutter 5224 presses the sheet S to stop feed.

Reference numeral 5230 denotes a manual feed tray; and 5231, a manual feed clutch. The manual feed clutch 5231 is used to convey the leading end of the sheet S to a manual feed roller 5232, and the manual feed roller 5232 is used to convey the leading end of the sheet S to the registration shutter 5224. The sheet S used to print an image is fed from a selected one of the sheet cassette 5220 and manual feed tray 5230.

The printer engine 5105 communicates with the video controller 5103 in accordance with a predetermined communication protocol. The printer engine 5105 selects either one of the sheet cassette 5220 and manual feed tray 5230 in accordance with an instruction from the video controller 5103, and conveys a sheet S to the registration shutter 5224 by a corresponding feed means in accordance with a printing start instruction. Note that the printer engine 5105 includes a feed means, a mechanism concerning an electrophotographic process such as latent image formation, transfer, and fixing, a discharge means, and control means therefor.

Reference numerals 5204a, 5204b, 5204c, and 5204d denote image printing units having photosensitive drums 5205a, 5205b, 5205c, and 5205d, toner holding portions, and the like. The image printing units 5204a to 5204d form toner images on the sheet S by the electrophotographic process.

Reference numerals 5206a, 5206b, 5206c, and 5206d denote laser scanners which supply pieces of image information by laser beams to the image printing units. A sheet convey belt 5250 for conveying the sheet S is stretched flat by a plurality of rotational rollers 5251 to 5254 in the sheet convey direction (upward from a lower portion in FIG. 28) with respect to the image printing units 5204a, 5204b, 5204c, and 5204d. At the uppermost stream portion, the sheet is electrostatically chucked to the sheet convey belt 5250 by a biased attraction roller 5225. The four photosensitive drums 5205a, 5205b, 5205c, and 5205d are arranged straight so as to face the belt convey surface, constituting an image forming means. Each of the image printing units 5204a, 5204b, 5204c, and 5204d comprises a charging unit and developing unit sequentially around the photosensitive drum.

In the laser scanners 5206a, 5206b, 5206c, and 5206d, reference numerals 5207a, 5207b, 5207c, and 5207d denote lasers which drive internal semiconductor lasers and emit laser beams in accordance with image signals (/VIDEO signals) sent from the video controller 5103. Laser beams emitted by the lasers 5207a, 5207b, 5207c, and 5207d are scanned by polygon mirrors (rotary polygon mirrors) 5208a, 5208b, 5208c, and 5208d, and form latent images on the photosensitive drums 5205a, 5205b, 5205c, and 5205d.

Reference numeral 5260 denotes a fixing unit which thermally fixes, to the print sheet S, toner images formed on the sheet S by the image printing units 5204a, 5204b, 5204c, and 5204d; 5261, a convey roller which discharges and conveys the sheet S; 5262, a discharge sensor which detects the discharge state of the sheet S; 5263, a discharge roller & double-sided printing convey path switching roller which conveys the sheet S in the discharge direction, if the convey instruction for the sheet S is "discharge", directly discharges the sheet S to a discharge tray 5264, if the convey instruction is "double-sided convey", reverses the rotational direction immediately after the trailing end of the sheet S passes through the discharge sensor 5262, and conveys the sheet S to a double-sided printing convey path 5270 by switchback; and 5265, a discharged-sheet stack amount sensor which detects the number of sheets S stacked on the discharge tray 5264.

On the double-sided printing convey path 5270, the sheet S which is conveyed for double-sided printing by the discharge roller & double-sided printing convey path switching roller 5263 is conveyed again to the registration shutter 5224 by double-sided convey rollers 5271 to 5274, and waits for a convey instruction to the image printing units 5204a, 5204b, 5204c, and 5204d.

Note that the printer engine of the 11th embodiment is a mechanism which suffers restrictions such that a sheet cannot temporarily stand by on the double-sided printing convey path or sheets cannot be alternately and continuously fed from the double-sided printing convey path and feed tray due to the mechanical structure. More specifically, the printer engine of the 11th embodiment cannot temporarily stop conveyance of a print sheet having undergone single-sided printing on the double-sided printing convey path during image print processing while a fed print sheet is conveyed. To continuously perform double-sided print processing by a highest-speed printing sequence (e.g., double-sided print processing is scheduled to a 4-page double-sided sequence, like example ① in FIG. 32), sheets conveyed within the apparatus must be discharged at a predetermined page interval.

Note that the printer 5102 can be further equipped with optional units such as an optional cassette and envelope feeder.

Figure 29:
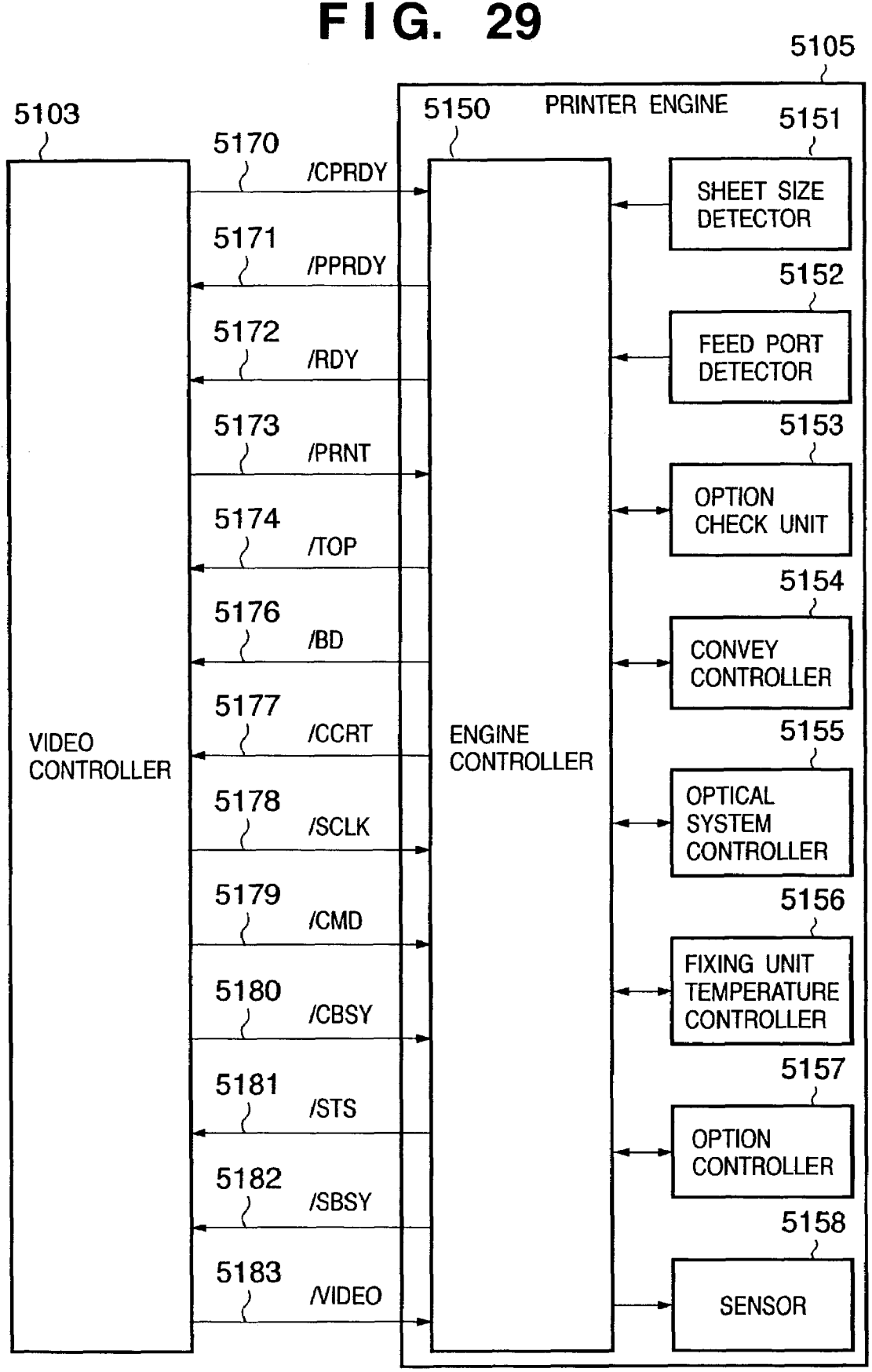
FIG. 29 is a block diagram showing an arrangement of a printer and a video interface which connects the video controller and printer engine shown in FIG. 27.

FIG. 29 is a block diagram showing an arrangement of the printer engine 5105 and a video interface which connects the video controller 5103 and printer engine 5105 shown in FIG. 27.

In FIG. 29, the video controller 5103 executes communication (including reception of image information) with a plurality of data processing devices 5101, generation (mapping) of raster data based on received image information, and control of the printer engine 5105.

An engine controller 5150 controls units 5151 to 5158 within the printer engine 5105 on the basis of control signals supplied from the video controller 5103.

The outline of the units 5151 to 5158 will be described. The sheet size detector 5151 detects the size of a sheet stacked in the sheet cassette 5220 or another optional cassette (not shown) and notifies the engine controller 5150 of the sheet size.

The feed port detector 5152 detects the presence/absence of the feed port of each of the sheet cassette 5220, manual feed tray 5230, optional cassette (not shown), and envelope feeder (not shown), and notifies the engine controller 5150 of the detection result.

The option check unit 5153 confirms the connection status of an option such as an optional cassette or envelope feeder. The convey controller 5154 controls sheet convey. The optical system controller 5155 controls the driving motors of the polygon mirrors 5208a, 5208b, 5208c, and 5208d, and optical systems such as the lasers 5207a, 5207b, 5207c, and 5207d.

The fixing unit temperature controller 5156 controls the temperature of a fixing unit 5260, and detects an error in the fixing unit 5260 or the like. The option controller 5157 controls an option such as an optional cassette or envelope feeder.

The sensor 5158 detects the presence/absence of a sheet on the convey path such as registration, discharge, double-sided printing, or reverse, and an environmental change (situation change) such as the outer temperature, the number of print pages, or the residual toner amount.

The outline of signals for a video interface which connects the video controller 5103 and engine controller 5150 will be explained.

Reference numeral 5170 denotes a /CPRDY signal representing that the video controller 5103 can communicate with the engine controller 5150; and 5171, a /PPRDY signal representing that the engine controller 5150 can communicate with the video controller 5103.

Reference numeral 5172 denotes a /RDY signal representing that the engine controller 5150 is in a printable state; 5173, a /PRNT signal with which the video controller 5103 issues a printing request to the engine controller 5150; and 5174, a /TOP signal functioning as a vertical sync signal which is output from the engine controller 5150 to the video controller 5103.

Reference numeral 5176 denotes a /BD signal functioning as a horizontal sync signal which is output from the engine controller 5150 to the video controller 5103; and 5178, a /SCLK signal which is a sync clock signal for serial communication.

Reference numeral 5179 denotes a /CMD signal which is a command signal for transmitting a command from the video controller 5103 to the engine controller 5150; 5180, a /CBSY signal which is a strobe signal for transmitting a command; and 5181, a /STS signal functioning as a signal which sends back a response (containing the internal status of the printer engine 5105) with respect to a command transmitted from the video controller 5103.

Reference numeral 5182 denotes a /SBSY signal which is a strobe signal for sending back a response such as status; and 5183, a /VIDEO signal which is raster data to be printed.

Reference numeral 5177 denotes a /CCRT (Condition Change Report) signal which becomes "TRUE" when a status not directly concerning the /RDY signal out of the statuses of the printer engine 5105, i.e., a status change not directly concerning whether to perform printing occurs (e.g., the temperature, the number of print pages, or the residual toner amount exceeds a reference value). The above-described signals may be simply referred to as signals.

Figure 30:
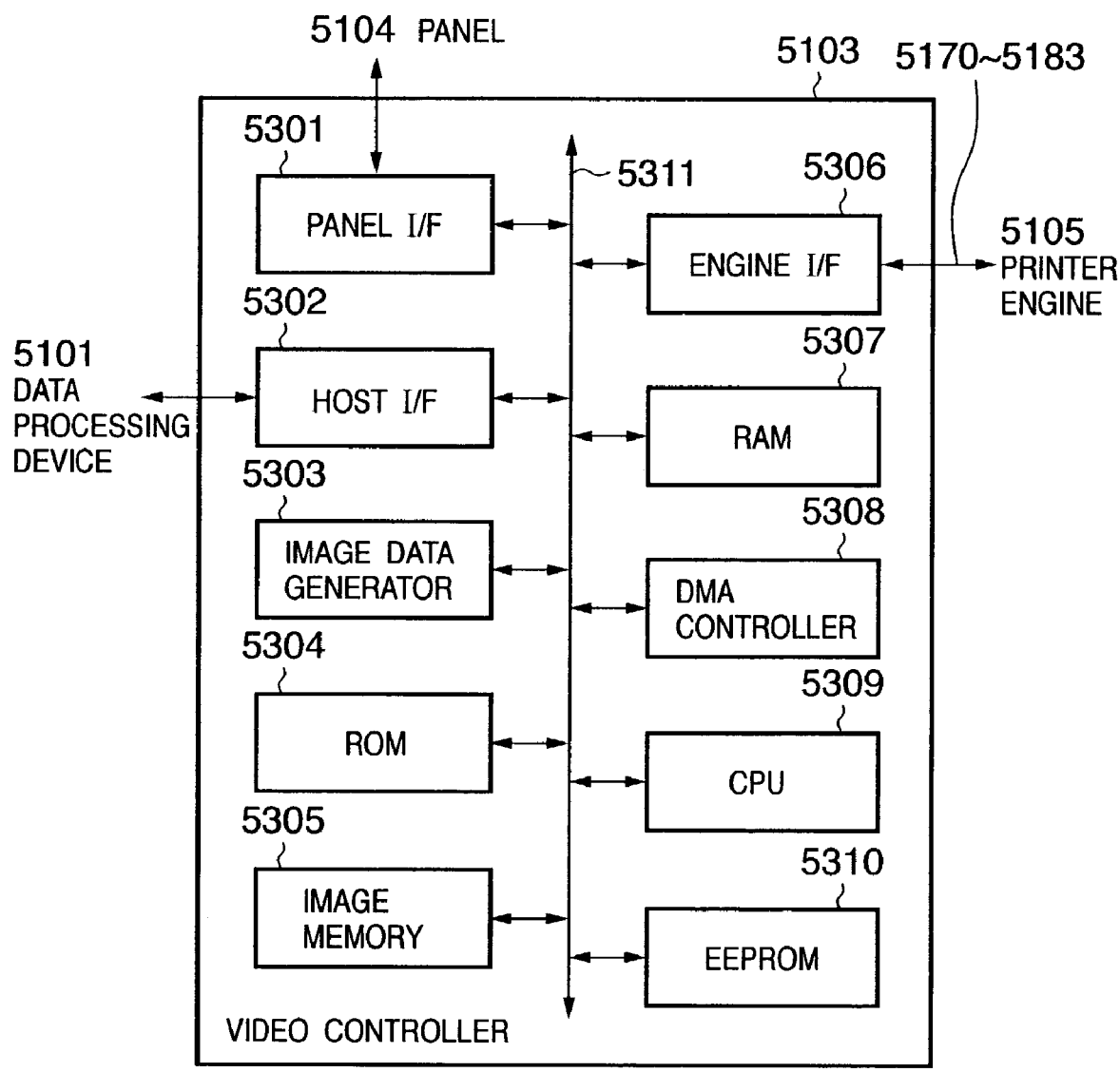
FIG. 30 is a block diagram showing an arrangement of the video controller shown in FIG. 27.

FIG. 30 is a block diagram showing an arrangement of the video controller 5103 shown in FIG. 27.

In FIG. 30, reference numeral 5301 denotes a panel interface which performs data communication with the panel 5104; and 5309, a CPU which controls a device connected to a CPU bus 5311 on the basis of a control program code held in a ROM 5304, and can confirm contents set and designated by the user on the panel 5104 via the panel interface 5301.

Reference numeral 5302 denotes a host interface which bidirectionally communicates with the data processing device 5101 such as a host computer via a network; and 5306, an engine interface which communicates with the printer engine 5105. The CPU 5309 can control the signals 5170, 5173, 5175, 5178, 5179, and 5180 via the engine interface 5306, and recognize the states of the signals 5171, 5172, 5174, 5176, 5177, 5181, and 5182, i.e., the state of the printer engine 5105.

Reference numeral 5303 denotes an image data generator which generates (rasterizes) raster data supplied to the printer engine 5105 on the basis of image information supplied from the data processing device 5101; and 5305, an image memory which temporarily holds generated raster data.

Reference numeral 5307 denotes a RAM which functions as a temporary memory used by a CPU 5309; 5310, an EEPROM which holds control information such as a density correction table; 5308, a DMA controller which transfers raster data in the image memory 5305 to an engine interface 5306 in accordance with an instruction from the CPU 5309; and 5311, a CPU bus which includes address, data, and control buses.

The panel interface 5301, host interface 5302, image data generator 5303, ROM 5304, image memory 5305, engine interface 5306, RAM 5307, DMA controller 5308, CPU 5309, and EEPROM 5310 can access all devices connected to the CPU bus 5311.

Figure 31:
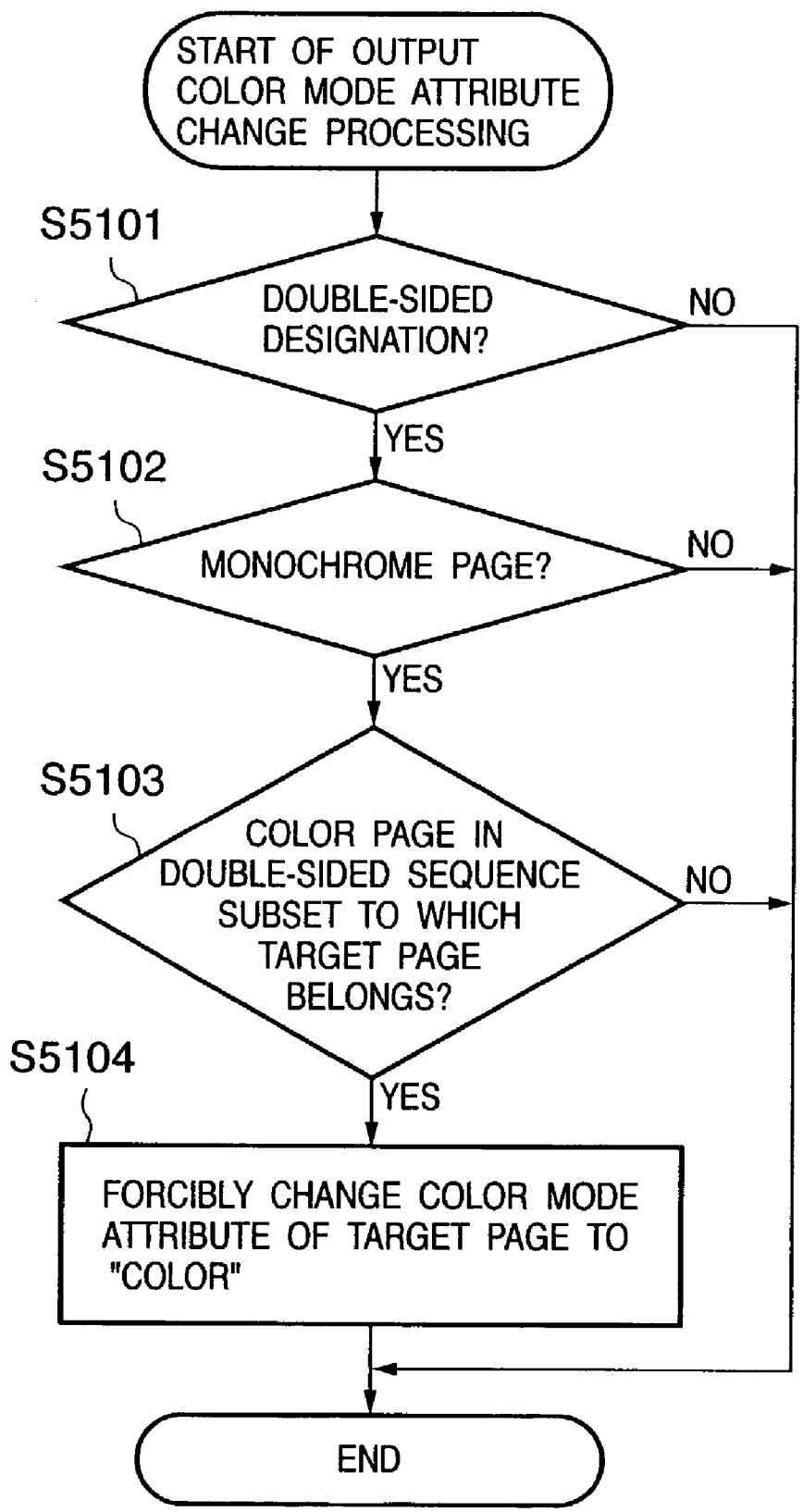
FIG. 31 is a flow chart showing an example of data processing procedures according to the 11th embodiment.

FIG. 31 is a flow chart showing an example of data processing procedures according to the 11th embodiment. These procedures correspond to output color mode attribute change processing procedures in the video controller 5103 by the printer engine 5105 which cannot switch the color mode because a sheet exists on the double-sided printing convey path in double-sided printing. Reference symbols S5101 to S5104 denote steps. Each procedure is executed by the CPU 5309 on the basis of a control program held in the ROM 5304 shown in FIG. 30. The procedures are executed for each page after data analysis processing for data received by the data processing device 5101 via the host interface 5302.

After output color mode attribute change processing starts, the CPU 5309 checks in step S5101 whether the current page is a page subjected to double-sided designation. If NO in step S5101, the processing ends without changing the output color mode attribute.

If YES in step S5101, whether the page is a monochrome-designated page is checked in step S5102. If NO in step S5102, the processing ends without changing the output color mode attribute.

If YES in step S5102, whether the double-sided sequence subset to which the page belongs contains a color-designated page is checked in step S5103.

The double-sided sequence subset means a page subset such as a 4-page type or 2-page type subset obtained when a double-sided sequence is divided at a position where no sheet exists on the double-sided printing convey path.

If NO in step S5103, the processing ends without changing the output color mode attribute.

If YES in step S5103, the color mode attribute of the page is forcibly changed to the color print mode in step S5104, and output color mode attribute change processing ends.

FIG. 32 is a view showing an example of a double-sided printing sequence pattern in the printer according to the present invention. FIG. 32 corresponds to an example of a sequence pattern which can be scheduled in double-sided printing for the printer engine 5105 that cannot switch the color mode because a sheet exists on the double-sided printing convey path in double-sided printing.

The sequence pattern example as shown in FIG. 32 is a special sequence pattern formed under restrictions such that a sheet cannot temporarily stand by on the double-sided printing convey path or sheets cannot be alternately and continuously fed from the double-sided printing convey path and feed tray due to the mechanical structure.

The difference between conditions for forming a sequence with a 4-page type pattern in example ① and a 2-page type pattern in example ② is the difference in schedulable sheet size restriction or the difference in time taken for rendering processing of a page to be scheduled (drawing object rasterizing processing).

At this time, if the sheet size is large or the rendering time of a page to be scheduled is long, pages are scheduled such that sheets circulate by the number of sheets smaller than a circulable number of sheets on the double-sided printing convey path, like example ②, suppressing a decrease in printing throughput.

As shown in FIG. 32, in double-sided printing for four pages: page P1 to page P4 (P1 to P4), the pages are scheduled into, e.g., the following sequence pattern in consideration of the attribute and rendering time of pages to be scheduled.

In example ①, pages are scheduled into a 4-page type double-sided sequence. The order in the 4-page sequence is P2→P4→P1→P3.

In example ②, pages are scheduled into a 2-page type double-sided sequence. The order in the 2-page sequence is P2→P1→P4→P3.

After the double-sided sequence is scheduled in the above way, processing shown in FIG. 31 is applied to decide a color mode in output of each double-sided sequence subset.

Figure 33:
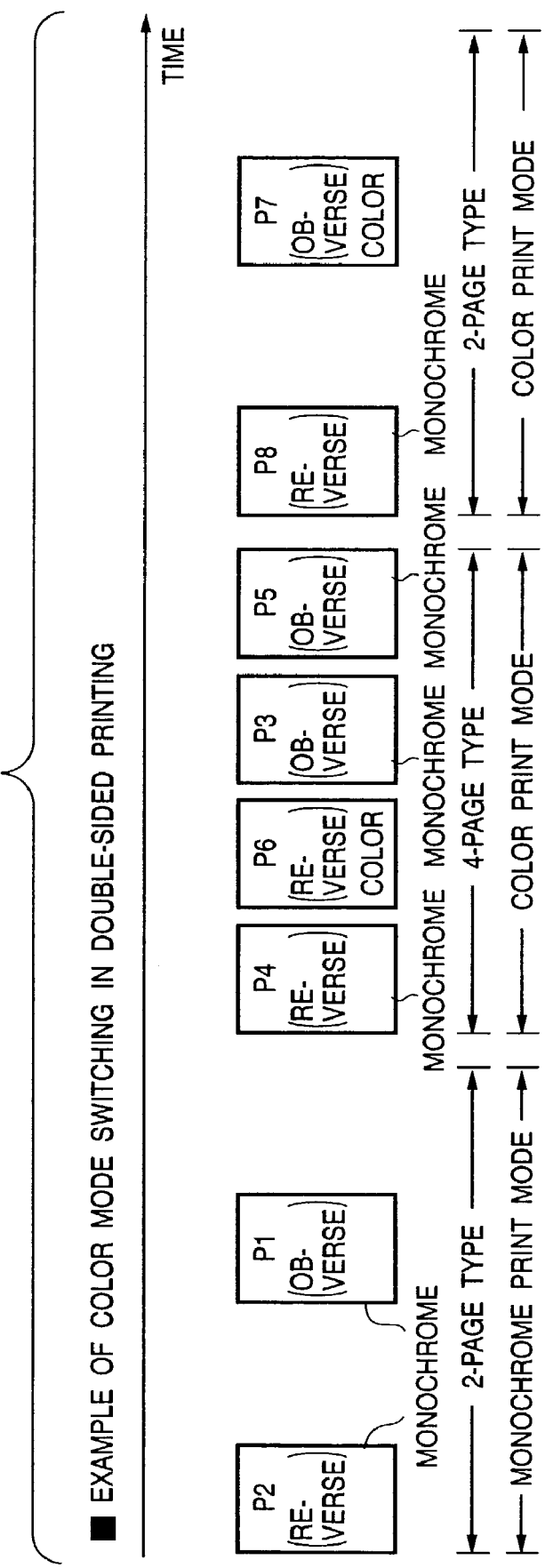
FIG. 33 is a view for explaining a print mode switching sequence state in the printer according to the 11th embodiment.

FIG. 33 is a view for explaining a print mode switching sequence state in the printer according to the present invention. FIG. 33 corresponds to an example of the result of performing output color mode attribute change processing for a scheduled double-sided sequence.

In the example of FIG. 33, 8-page double-sided print data is scheduled into a double-sided sequence by double-sided scheduling processing such that the first two pages (P2 and P1) are scheduled into the 2-page type; four succeeding pages (P4, P6, P3, and P5), into the 4-page type; and the last two pages (P8 and P7), into the 2-page type.

Output color mode attribute change processing shown in the flow chart of FIG. 31 is executed for this double-sided sequence. The first two pages (P2 and P1) are monochrome pages, and their color mode attributes keep the monochrome print mode without any change. Four succeeding pages (P4, P6, P3, and P5) contain color-designated page P6, and the color mode attributes of pages P4, P3, and P5 as monochrome pages are changed to the color print mode. The last two pages (P8 and P7) contain color-designated page P7, and the color mode attribute of page P8 as a monochrome page is changed to the color print mode.

In this fashion, output color mode attribute change processing is performed for each double-sided sequence subset after double-sided sequence scheduling. In scheduling a double-sided sequence, the sequence need not be divided into, e.g., 2-page type sequences with a low throughput by faithfully complying with a color mode designated for original data.

In scheduling a double-sided sequence, a double-sided sequence which ignores a color mode designated for original data and is made up of only other conditions is formed. Output color mode attribute change processing is done for the formed double-sided sequence. Even a special sequence under restrictions on the printer engine can prevent color mode switching within the subset.

FIGS. 34, 35, 36, and 37 are timing charts for explaining a print data processing state according to the 11th embodiment. FIGS. 34, 35, 36, and 37 correspond to some of processing examples in the printer when 4-page double-sided print data is received. Reference symbols S5201 to S5234 and S5301 to S5335 denote steps.

Figure 34:
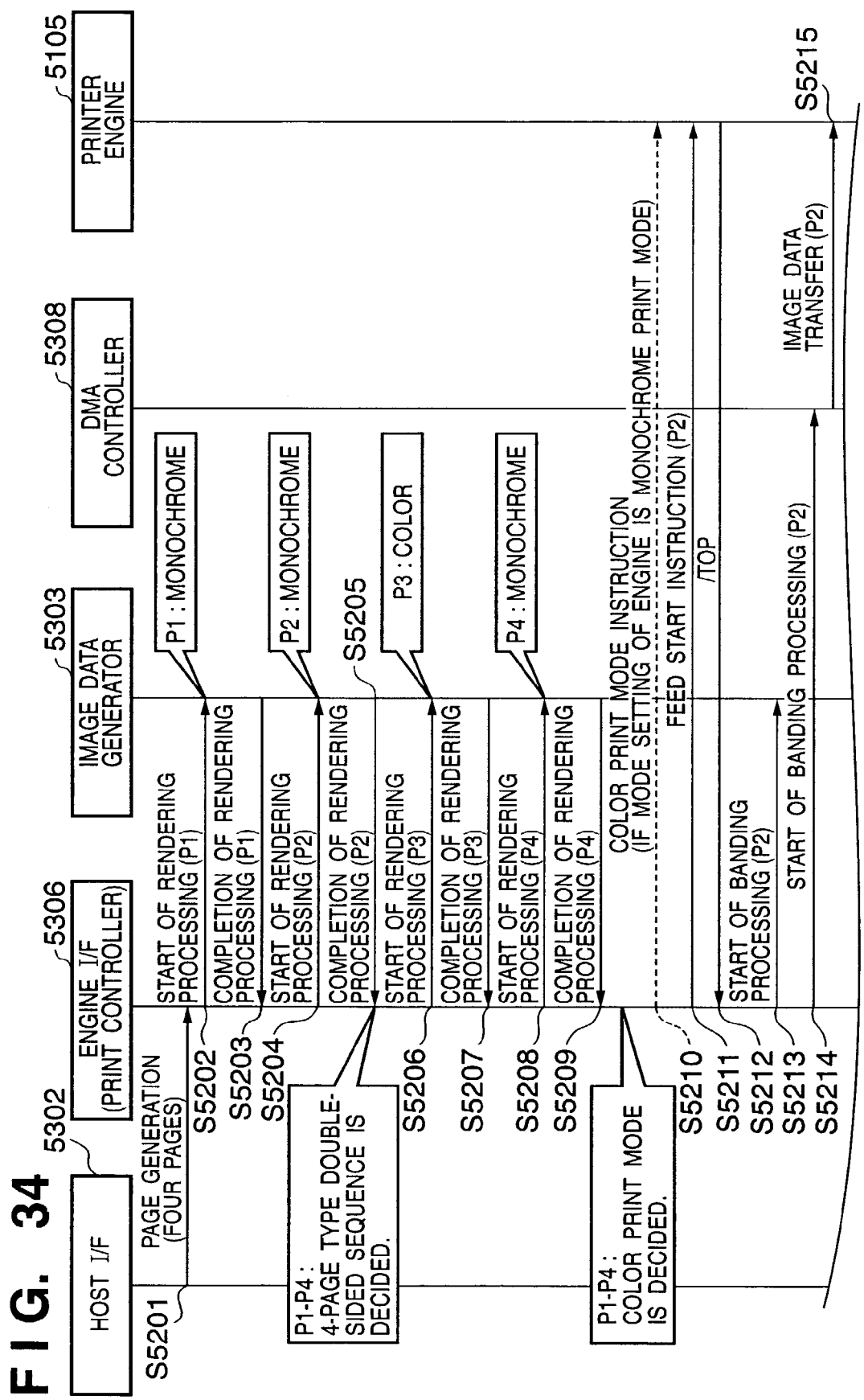
FIGS. 34 to 37 are timing charts for explaining a print data processing state according to the 11th embodiment.
Figure 35:
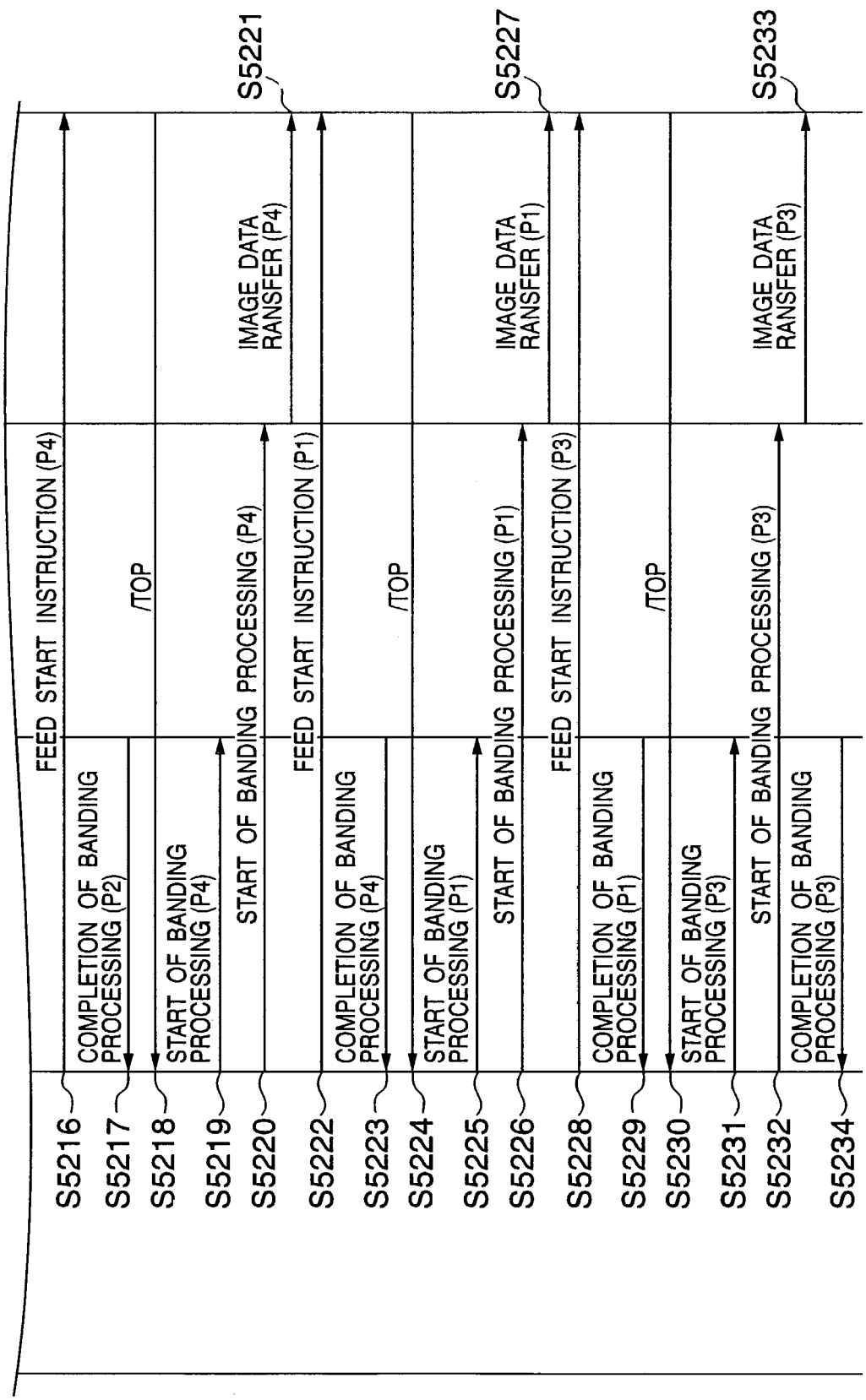

The example shown in FIGS. 34 and 35 concerns scheduling into a 4-page type double-sided sequence. The example shown in FIGS. 36 and 37 concerns scheduling into a 2-page type double-sided sequence.

In FIGS. 34 and 35, the printer 5102 receives 4-page double-sided print data from the host computer 5101. The CPU 5309 of the video controller 5103 then performs processing of interpreting PDL data and converting it into intermediate data (display list) and page attribute information. The printing controller of the engine I/F 5306 is notified by the host I/F 5302 that print data has been received (S5201). The printing controller of the engine I/F 5306 which has received the notification instructs the image data generator 5303 to start rendering processing for page P1 (S5202).

After the image data generator 5303 sends back a rendering processing completion notification for page P1 to the printing controller (S5203), the printing controller instructs the image data generator 5303 to start rendering processing for page P2 (S5204), and waits for a completion notification.

The image data generator 5303 sends back a rendering processing completion notification for page P2 to the printing controller (S5205), ending rendering processing of the two pages. For double-sided printing, the printing controller estimates the rendering processing times of subsequent pages P3 and P4, and checks whether pages P1 to P4 can be scheduled as a 4-page type double-sided sequence. In the example of FIGS. 34 and 35, it is determined that pages P1 to P4 can be scheduled into a 4-page type double-sided sequence. The printing order is page P2→page P4→page P1→page P3 (scheduling). After that, rendering processing is similarly executed for pages P3 and P4.

In step S5206, the printing controller instructs the image data generator 5303 to start rendering processing for page P3. After the image data generator 5303 sends back a rendering processing completion notification for page P3 to the printing controller (S5207), the printing controller instructs the image data generator 5303 to start rendering processing for page P4 (S5208).

After the image data generator 5303 sends back a rendering processing completion notification for page P4 to the printing controller (S5209), the printing controller performs output color mode attribute change processing for pages P1 to P4 decided as a double-sided sequence subset. If the subset contains a color-designated page, the color mode attribute of a monochrome page in the subset is changed to "color print mode".

In the example of FIGS. 34 and 35, page P3 is a color-designated page. The color mode attributes of the remaining monochrome pages P1, P2, and P4 are changed to "color print mode".

After the output color mode is decided for the subset of pages P1 to P4, the setting of the printer engine 5105 must be changed.

If the color mode of the printer engine 5105 is the same as the output color mode of the page subset to be printed, the current setting state need not be changed.

In step S5210, the printing controller issues a color print mode instruction for outputting the subset of pages P1 to P4 in "color print mode" when the mode setting of the printer engine 5105 is "monochrome print mode".

After the color print mode instruction, the printing controller issues a feed start instruction to the printer engine 5105 in accordance with the printing order. In step S5211, the printing controller issues a feed start instruction for page P2.

Note that the timings of steps S5210 and S5211 may be earlier in accordance with the estimation of the rendering processing times of pages P3 and P4 after sequence decision.

The double-sided sequence decision timing may be a timing after page generation in step S5201 by estimating the rendering time. Rendering processing may be sequentially performed in accordance with the page order.

After the feed start instruction for page P2, the printer engine 5105 outputs the /TOP signal 5174 serving as a vertical sync signal (S5212). The printing controller then issues, to the image data generator 5303 and DMA controller 5308, a banding processing start instruction for transmitting image data for each band to the printer engine 5105 (S5213 and S5214).

Upon reception of the banding processing start instruction, the DMA controller 5308 transfers image data to the printer engine 5105 while performing predetermined banding processing (S5215).

At the reception timing of the /TOP signal 5174 from the printer engine 5105, the printing controller issues a feed start instruction for page P4 as a page to be printed next (S5216).

The printing controller receives a banding completion notification for page P2 from the image data generator 5303 (S5217). After that, the printer engine 5105 outputs the /TOP signal 5174 for page P4, similar to page P2 (S5218). This processing is sequentially executed up to step S5234.

Figure 36:
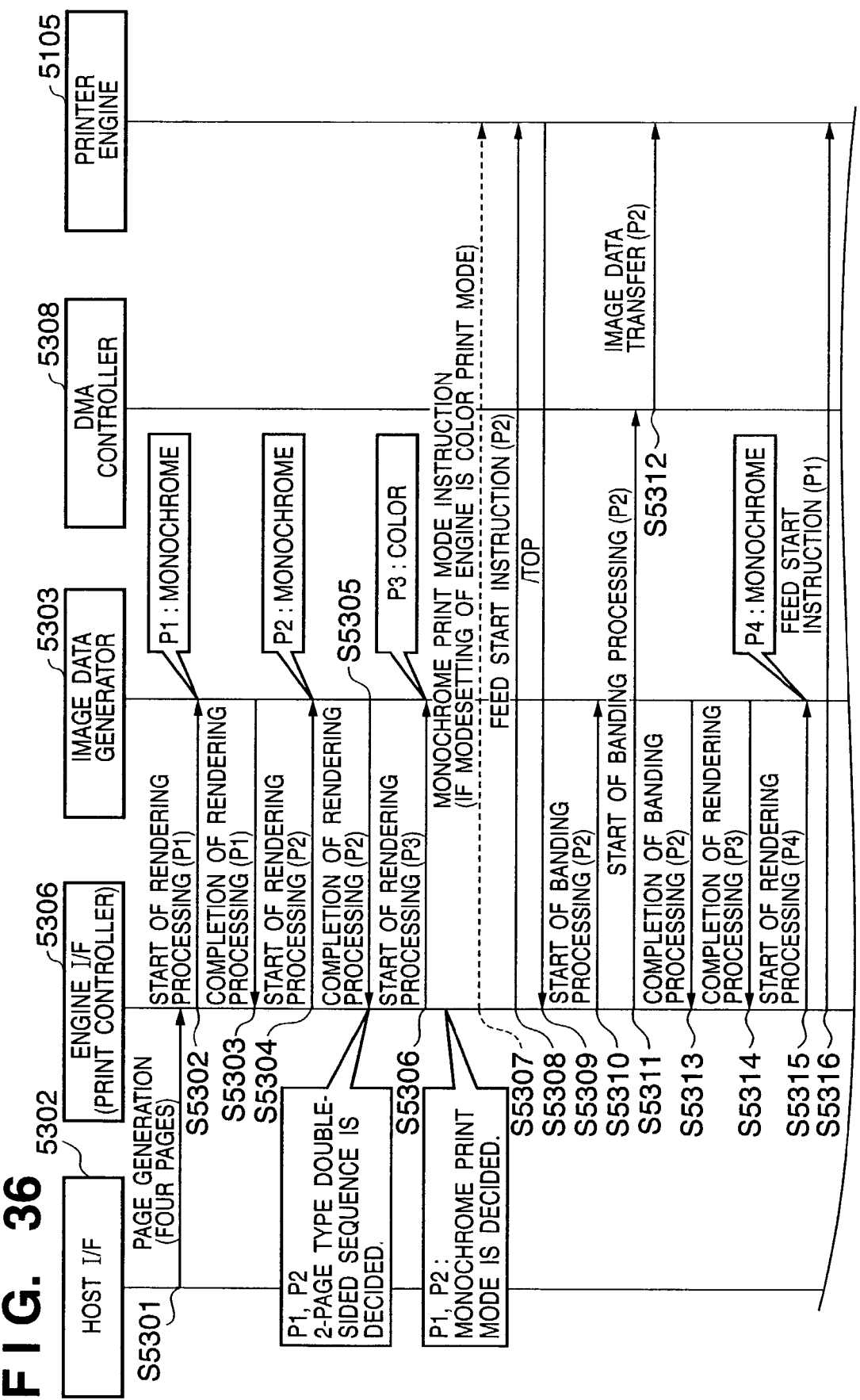
Figure 37:
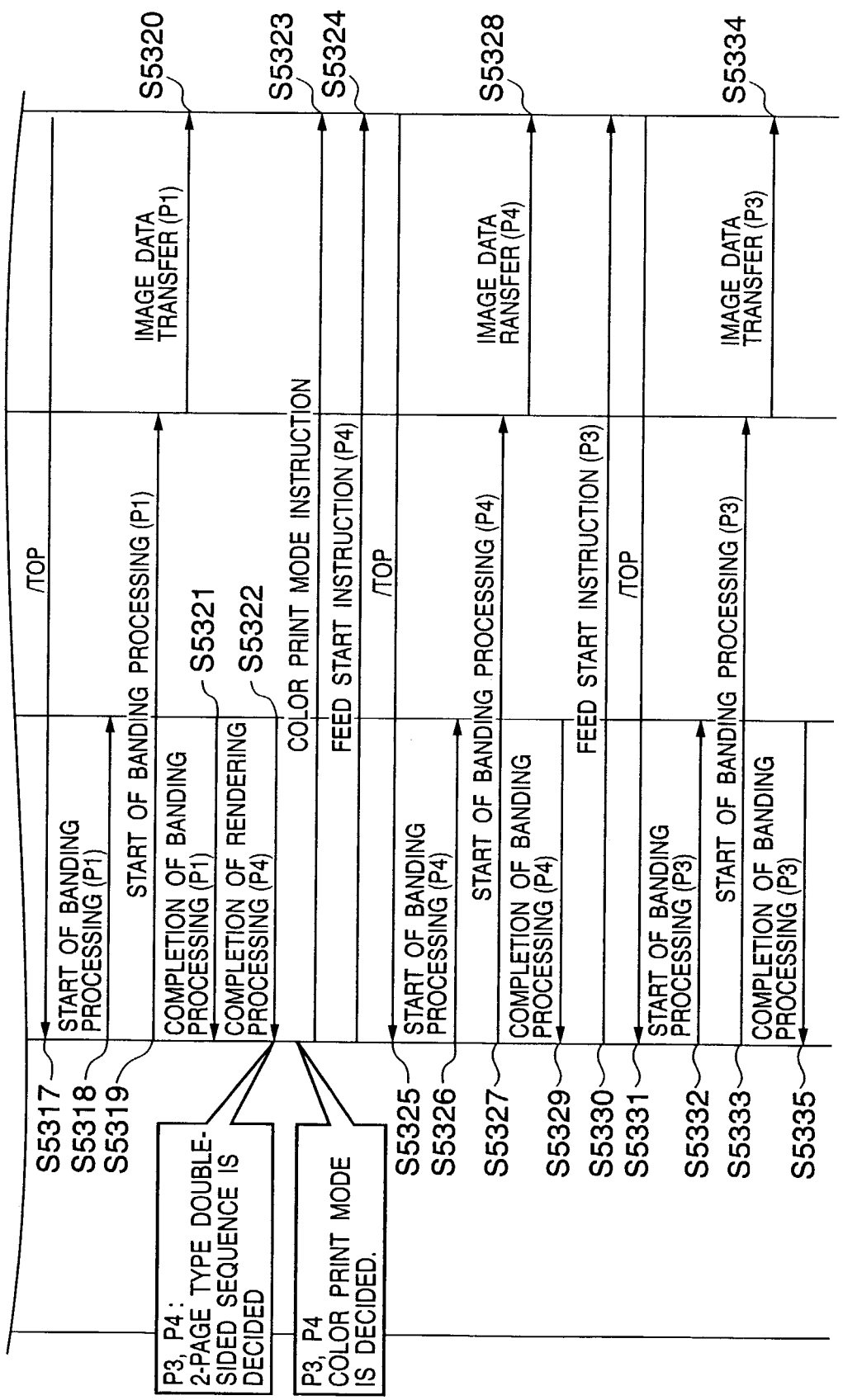

In FIGS. 36 and 37, the printer 5102 receives 4-page double-sided print data from the host computer 5101. The CPU 5309 of the video controller 5103 then performs processing of interpreting PDL data and converting it into intermediate data (display list) and page attribute information. The printing controller in the engine I/F 5306 is notified by the host I/F 5302 that print data has been received (S5301). The printing controller in the engine I/F 5306 which has received the notification instructs the image data generator 5303 to start rendering processing for page P1 (S5302). After the image data generator 5303 sends back a rendering processing completion notification for page P1 to the printing controller (S5303), the printing controller instructs the image data generator 5303 to start rendering processing for page P2 (S5304), and waits for a completion notification.

The image data generator 5303 sends back a rendering processing completion notification for page P2 to the printing controller (S5305), ending rendering processing of the two pages. For double-sided printing, the printing controller estimates the rendering processing times of subsequent pages P3 and P4, and checks whether pages P1 to P4 can be scheduled as a 4-page type double-sided sequence.

In the example of FIGS. 36 and 37, it is determined that pages P1 to P4 cannot be scheduled into a 4-page type double-sided sequence, and pages P1 to P4 are scheduled into 2-page type double-sided sequences. The subset of former two pages has a printing order of page P2→page P1, and the subset of latter two pages has a printing order of page P4→page P3 (scheduling)

In step S5306, the printing controller instructs the image data generator 5303 to start rendering processing for page P3. At the same time, in order to perform print processing for the subset of the former two pages (pages P2 and P1), the printing controller executes output color mode attribute change processing for pages P2 and P1. If the subset contains a color-designated page, the color mode attribute of a monochrome page in the subset is changed to the color print mode.

In the example of FIGS. 36 and 37, both pages P1 and P2 are monochrome, and their output color mode attributes keep the monochrome print mode without any change. After the output color mode is decided for the subset of pages P1 and P2, the setting of the printer engine 5105 must be changed.

If the color mode of the printer engine 5105 is the same as the output color mode of the page subset to be printed, the setting need not be changed.

In step S5307, the printing controller issues a monochrome print mode instruction in order to output the subset of pages P1 and P2 in the monochrome print mode when the mode setting of the printer engine 5105 is the color print mode.

After the "monochrome print mode" instruction, the printing controller issues a feed start instruction to the printer engine 5105 in accordance with the printing order. In step S5308, the printing controller issues a feed start instruction for page P2. After the feed start instruction for page P2, the printer engine 5105 outputs the /TOP signal 5174 (S5309). The printing controller then issues, to the image data generator 5303 and DMA controller 5308, a banding processing start instruction for transmitting image data for each band to the printer engine 5105 (S5310 and S5311).

Upon reception of the banding processing start instruction, the DMA controller 5308 transfers image data to the printer engine 5105 while performing predetermined banding processing (S5312). After image data transfer processing ends, the printing controller receives a banding processing completion notification for page P2 from the image data generator 5303 (S5313).

After the image data generator 5303 sends back a rendering processing completion notification for page P3 to the printing controller (S5314), the printing controller instructs the image data generator 5303 to start rendering processing for page P4 (S5315), and waits for a completion notification.

The printing controller issues a feed start instruction for page P1 serving as a page to be printed next (step S5316). The printer engine 5105 outputs the /TOP signal 5174 for page P1 (S5317), and the printing controller which has received the /TOP signal 5174 issues a banding processing start instruction to the image data generator 5303 and DMA controller 5308 (S5318 and S5319).

Upon reception of the banding processing start instruction, the DMA controller 5308 transfers image data to the printer engine 5105 while performing predetermined banding processing (S5320). After image data transfer processing ends, the printing controller receives a banding processing completion notification for page P1 from the image data generator 5303 (S5321).

After the image data generator 5303 sends back a rendering processing completion notification for page P4 to the printing controller (S5322), the printing controller performs double-sided scheduling for the remaining pages P3 and P4.

If no succeeding page exists, pages P3 and P4 are scheduled into a 2-page type double-sided sequence. The printing controller executes output color mode attribute change processing for pages P3 and P4. If the subset contains a color-designated page, the color mode attribute of a monochrome page in the subset is changed to "color print mode".

In the example of FIGS. 36 and 37, page P3 is color. The color mode attribute of monochrome page P4 is changed to "color print mode". After "color print mode" is decided as the output color mode for pages P3 and P4, the setting of the printer engine 5105 must be changed.

In this case, the color mode of the printer engine 5105 is set to "monochrome print mode" in order to print pages P1 and P2. Thus, the printing controller instructs the printer engine 5105 of "color print mode" in step S5323.

As for page P4, the printing controller issues a feed start instruction to the printer engine 5105 (step S5324). After the feed start instruction for page P4, the printer engine 5105 outputs the /TOP signal 5174 (S5325). The printing controller then issues, to the image data generator 5303 and DMA controller 5308, a banding processing start instruction for transmitting image data for each band to the printer engine 5105 (S5326 and S5327).

Upon reception of the banding processing start instruction, the DMA controller 5308 transfers image data to the printer engine 5105 while performing predetermined banding processing (S5328).

The printing controller receives a banding completion notification for page P4 from the image data generator 5303 (S5329). Processes from issuing of a feed start instruction (S5330) to step S5335 are sequentially performed for page P4.

12th Embodiment

In the 11th embodiment, if the page subset contains even one color-designated page, the color mode attributes of the remaining monochrome pages are changed to "color print mode" in order to make the color mode attributes of pages within a double-sided sequence subset coincide with each other in a printer engine which cannot switch the print mode while a sheet exists on the double-sided printing convey path in double-sided printing. Also in a printer engine having a mechanism (to be referred to as a 2-page formation mode hereinafter) of conveying print media two by two in printing and forming images on two pages at a time, the color mode attribute of a monochrome page may be changed to "color print mode" in the presence of a color-designated page in a page subset in order to make color mode attributes coincide with each other within a 2-page subset scheduled as the 2-page formation mode. In the 12th embodiment, the control for an image forming apparatus will be described.

Figure 38:
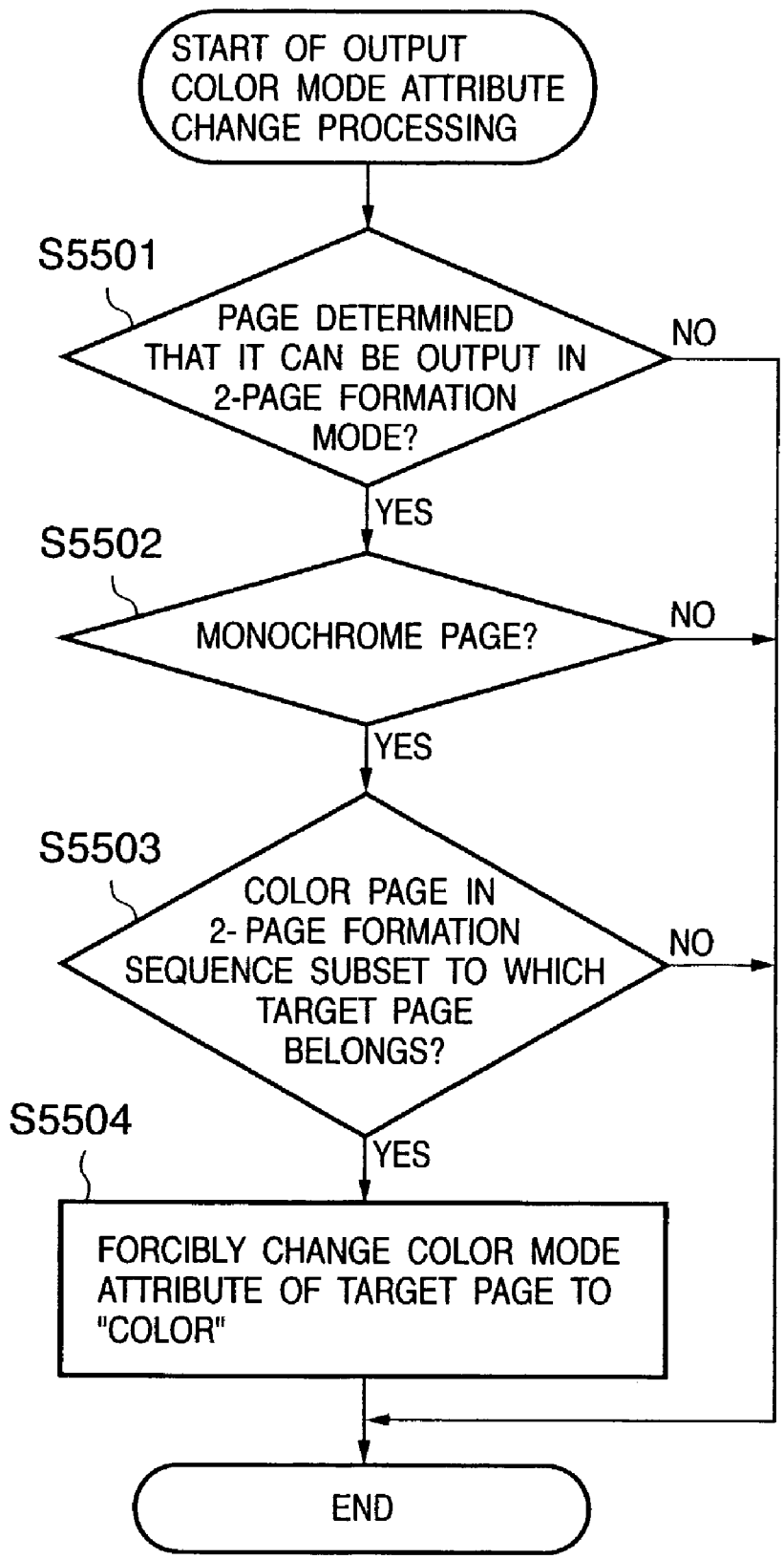
FIG. 38 is a flow chart showing an example of data processing procedures according to the 12th embodiment.

FIG. 38 is a flow chart showing an example of data processing procedures according to the 12th embodiment. These procedures correspond to output color mode attribute change processing procedures in a video controller 5103 by, e.g., a printer engine having the 2-page formation mechanism. These procedures are executed by a CPU 5309 on the basis of a control program held in a ROM 5304, and done for each page after data analysis processing for data received from a data processing device 5101 via a host interface 5302.

After output color mode attribute change processing starts, the CPU 5309 checks in step S5501 whether the current page is a page determined that it can be output in the 2-page formation mode. If NO in step S5501, the processing ends without changing the output color mode attribute.

If YES in step S5501, whether the page is a monochrome-designated page is checked in step S5502. If NO in step S5502, the processing ends without changing the output color mode attribute.

If YES in step S5502, whether the 2-page formation sequence subset to which the page belongs contains a color-designated page is checked in step S5503. The 2-page formation sequence subset is a page subset such as a 1-page formation mode or 2-page formation mode divided every image formation. If NO in step S5503, the processing ends without changing the output color mode attribute.

If YES in step S5503, the color mode attribute of the page is forcibly changed to "color print mode" in step S5504, and output color mode attribute change processing ends.

FIG. 39 is a view for explaining a print mode switching sequence state according to the 12th embodiment. FIG. 39 corresponds to an example of the result of performing output color mode attribute change processing shown in FIG. 38 for a scheduled image formation mode.

In example ①  of FIG. 39, the first two pages P1 and P2 out of single-sided print data of four pages are scheduled into the 2-page formation mode by single-sided scheduling processing, and two subsequent pages P3 and P4 are also scheduled into the 2-page formation mode. In output color mode attribute change processing performed for this sequence, the first two pages P1 and P2 are monochrome pages, and their color mode attributes keep the monochrome print mode without any change. The two subsequent pages P3 and P4 contain color-designated page P3, and the color mode attribute of monochrome page P4 is changed to the color print mode.

In example ② , each page out of single-sided print data of four pages is scheduled into the 1-page formation mode by single-sided scheduling processing. The color mode attribute need not be changed for the sequence in the 1-page formation mode, and data is printed in accordance with a color mode attribute designated for the data.

In example ③ , the first page P2 and next page P4 out of double-sided print data of eight pages are scheduled into the 1-page formation mode by double-sided scheduling processing. Two subsequent pages P1 and P6 and two subsequent pages P3 and P8 are scheduled into the 2-page formation mode, and page P5 and the final page P7 are scheduled into the 1-page formation mode.

By performing output color mode attribute change processing for the double-sided sequence which can be output with the highest throughput, the color mode attribute of monochrome page P8 in the subset containing color-designated page P3 out of sequence subsets in the 2-page formation mode is changed to the color print mode.

In this manner, also in a printer engine having the mechanism of conveying print media two by two in printing and forming images on two pages at a time, the color mode attribute of a monochrome page is changed to the color print mode in the presence of a color-designated page in a page subset in order to make color mode attributes coincide with each other within a 2-page subset scheduled as the 2-page formation mode. This increases the frequency of scheduling pages in the 2-page formation mode which maximizes the throughput. Consequently, a decrease in throughput by switching the monochrome/color print mode can be prevented.

13th Embodiment

In the 11th embodiment, color mode attribute change processing targets only a page assigned double-sided printing. Color mode attribute change processing may target a page assigned single-sided printing.

When a monochrome page sandwiched between color pages, a page in a monochrome page subset sandwiched between color pages, or a monochrome page which is subsequent to a color page and has no next page exists in print data containing only pages assigned single-sided printing or print data containing pages assigned double-sided printing and pages assigned single-sided printing, the color mode attribute of the monochrome page is changed to the color print mode. This can reduce switching between the monochrome and color print modes.

14th Embodiment

In the 12th embodiment, color mode attribute change processing targets only a page subset scheduled in the 2-page formation mode. Color mode attribute change processing may target a page scheduled in the 1-page formation mode.

When a page scheduled in the 1-page formation mode is a monochrome page sandwiched between color pages, a page in a monochrome page subset sandwiched between color pages, or a monochrome page which is subsequent to a color page and has no next page, the color mode attribute of the monochrome page is changed to the color print mode. This can reduce switching between the monochrome and color print modes.

15th Embodiment

In the 13th and 14th embodiments, the color mode attribute of a page is so forcibly changed as not to change the print process mode as much as possible. However, the color mode attribute of a page may be so controlled as not to be forcibly changed more than necessary if it can be estimated that the entire throughput is not influenced without switching from the monochrome print mode to the color print mode or from the color print mode to the monochrome print mode in consideration of the data processing time of rendering processing or the like, the standby time required to switch the feed stage in printing, and the like.

As described above, according to the above embodiments, if the page subset contains a color-designated page, the color mode attribute of a monochrome page in the subset is changed to the color print mode in order to make color mode attributes coincide with each other within the page subset divided at a position where no sheet exists on the double-sided printing convey path in a printer engine which cannot switch the print mode while a sheet exists on the double-sided printing convey path in double-sided printing. The double-sided sequence which has a maximum throughput can be implemented.

Also in a printer engine having the mechanism of conveying print media two by two in printing and forming images on two pages at a time, the color mode attribute of a monochrome page is changed to the color print mode in the presence of a color-designated page in a page subset in order to make color mode attributes coincide with each other within a 2-page subset scheduled as the 2-page formation mode. This increases the frequency of scheduling pages in the 2-page formation mode which maximizes the throughput.

As a result, even in a printer engine which undesirably decreases the throughput depending on the page layout of print data due to switching of the monochrome/color print mode, the schedule of a print sequence for print data containing monochrome and color pages can be optimized. A decrease in throughput can be suppressed, increasing the print data processing efficiency.

As has been described above, it is possible to limit print mode switching, suppress a decrease in throughput, and increase the print data processing efficiency when a printer with a printing mechanism which requires processing of temporarily stopping a print sequence in switching between the color and monochrome print modes processes print data containing pages assigned monochrome printing and pages assigned color printing, or print data containing pages assigned monochrome printing and pages assigned color printing in double-sided printing.

The object of the present invention is also achieved when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the new functions of the present invention, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, ROM, and EEPROM.

The functions of the above-described embodiments are realized when the computer executes the readout program codes. Also, the functions of the above-described embodiments are realized when an OS (Operating System) running on the computer performs part or all of actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the claims.

What is claimed is:

1. A printer having a full-color print process and a monochrome print process, comprising:
   color/monochrome discrimination means for discriminating whether an attribute of a target page to be printed is color or monochrome;
   first determination means for determining presence of an immediately preceding page which is successively printed before the target page determined to be monochrome by said color/monochrome discrimination means;
   second determination means for determining presence of a succeeding page which is successively printed after the target page determined to be monochrome by said color/monochrome discrimination means, and an attribute of the succeeding page; and
   print process decision means for setting number of pages in accordance with whether or not said first determination means has determined that the immediately preceding page is present, and deciding a print process for the target page on the basis of presence and attributes of subsequent pages corresponding to the number of pages that are determined by said second determination means.

2. The printer according to claim 1, wherein the attribute includes a print process, a size of a print medium used for printing, a type of print medium, or a combination of the print process, the size of the print medium, and the type of print medium.

3. The printer according to claim 1, wherein when said first determination means determines that the immediately preceding page exists and the print process of the immediately preceding page is monochrome printing, said print process decision means decides the monochrome print process as the print process of the page to be printed.

4. The printer according to claim 1, wherein when said second determination means determines that subsequent pages corresponding to the number of pages contain a full-color page, said print process decision means decides the full-color print process as the print process of the page to be printed.

5. The printer according to claim 1, wherein when said second determination means determines that subsequent pages corresponding to the number of pages do not exist but subsequent pages contain a full-color page, said print process decision means decides the full-color print process as the print process of the page to be printed.

6. The printer according to claim 2, wherein when second determination means determines that a subsequent page contains a change in the size of the print medium and/or a change in the type of print medium, said print process decision means decides the monochrome print process as the print process of the page to be printed.

7. The printer according to claim 2, wherein when said second determination means determines that subsequent pages corresponding to the number of pages contain a full-color page and the attribute does not change, said print process decision means decides the full color print process as the print process of the page to be printed.

8. The printer according to claim 1, wherein said print process decision means decides a print process in accordance with a user instruction.

9. The printer according to claim 1, wherein said print process decision means decides a print process in accordance with designation from a printer driver of a host device.

10. A method of controlling a printer having a full-color print process and a monochrome print process, comprising:
    the color/monochrome discrimination step of discriminating whether an attribute of a target page to be printed is color or monochrome;
    the first determination step of determining presence of an immediately preceding page which is successively printed before the target page determined to be monochrome in the color/monochrome discrimination step;
    the second determination step of determining presence of a succeeding page which is successively printed after the target page determined to be monochrome in the color/monochrome discrimination step, and an attribute of the succeeding page; and
    the print process decision step of setting number of pages in accordance with whether or not said first determination means has determined that the immediately preceding page is present, and deciding a print process for the page on the basis of presence and attributes of subsequent pages corresponding to the number of pages that are determined in the second determination step.

11. The method according to claim 10, wherein the attribute includes a print process, a size of a print medium used for printing, a type of print medium, or a combination of the print process, the size of the print medium, and the type of print medium.

12. The method according to claim 10, wherein when the presence of the immediately preceding page is determined in the first determination step and the print process of the immediately preceding page is determined to be monochrome printing, the monochrome print process is decided as the print process of the page to be printed in the print process decision step.

13. The method according to claim 10, wherein when subsequent pages corresponding to the number of pages are determined in the second determination step to contain a full-color page, the full-color print process is decided as the print process of the page to be printed in the print process decision step.

14. The method according to claim 10, wherein when subsequent pages corresponding to the number of pages are determined in the second determination step not to exist but subsequent pages are determined to contain a full-color page, the full-color print process is decided as the print process of the page to be printed in the print process decision step.

15. The method according to claim 11, wherein when a subsequent page is determined in the second determination step to contain a change in the size of the print medium and/or a change in the type of print medium, the monochrome print process is decided as the print process of the page to be printed in the print process decision step.

16. The method according to claim 11, wherein when subsequent pages corresponding to the number of pages are determined in the second determination step to contain a full-color page and the attribute is determined not to change, the full-color print process is decided as the print process of the page to be printed in the print process decision step.

17. The method according to claim 10, wherein a print process is decided in the print process decision step in accordance with a user instruction.

18. The method according to claim 10, wherein a print process is decided in the print process decision step in accordance with designation from a printer driver of a host device.

* * * * *

UNITED STATES PATENT AND TRADEMARK OFFICE
CERTIFICATE OF CORRECTION

| | | |
|---|---|---|
| PATENT NO. | : 7,365,865 B2 | Page 1 of 2 |
| APPLICATION NO. | : 10/368593 | |
| DATED | : April 29, 2008 | |
| INVENTOR(S) | : Hideyuki Kidani et al. | |

It is certified that error appears in the above-identified patent and that said Letters Patent is hereby corrected as shown below:

ON TITLE PAGE AT (56) U.S. PATENT DOCUMENTS

Insert: --2002/0054350    5/2002    Kakigi et al.--.

SHEET 35

FIG. 35, "RANSFER" (all three occurrences) should read --TRANSFER--.

SHEET 36

FIG. 36, "MODESETTING" should read --MODE SETTING--.

SHEET 37

FIG. 37, "RANFSER" should read --TRANSFER--.

COLUMN 6

Line 49, "to," should read --to--.

COLUMN 10

Line 62, "on" should read --in--.

COLUMN 12

Line 6, "switching," should read --switching--.

COLUMN 30

Line 60, "printed-when" should read --printed when--.

COLUMN 42

Line 12, "the/TOP" should read --the /TOP--; and
Line 60, "(scheduling)" should read --(scheduling).--.

UNITED STATES PATENT AND TRADEMARK OFFICE
CERTIFICATE OF CORRECTION

PATENT NO. : 7,365,865 B2
APPLICATION NO. : 10/368593
DATED : April 29, 2008
INVENTOR(S) : Hideyuki Kidani et al.

It is certified that error appears in the above-identified patent and that said Letters Patent is hereby corrected as shown below:

<u>COLUMN 48</u>

Line 29, "full color" should read --full-color--; and
Line 45, "step," should read --step;--.

Signed and Sealed this

Twenty-third Day of December, 2008

JON W. DUDAS
*Director of the United States Patent and Trademark Office*